(12) United States Patent
Shiraishi et al.

(10) Patent No.: US 6,597,378 B1
(45) Date of Patent: Jul. 22, 2003

(54) DISPLAY DEVICE, PORTABLE INFORMATION PROCESSING APPARATUS, INFORMATION STORAGE MEDIUM, AND ELECTRONIC APPARATUS

(75) Inventors: Atsushi Shiraishi, Suwa (JP); Roy Nakashima, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/487,819

(22) Filed: Jan. 18, 2000

(51) Int. Cl.$^7$ .................................................. G09G 5/00
(52) U.S. Cl. ..................... 345/764; 345/733; 345/751; 345/778; 345/810; 345/835
(58) Field of Search ................................ 345/764, 810, 345/835, 839, 963, 864, 778, 751, 752, 775, 733, 841, 779, 727, 728

(56) References Cited

U.S. PATENT DOCUMENTS 5,438,679 A * 8/1995 Inomata et al. ............... 714/47
5,592,605 A * 1/1997 Asuma et al. ............... 345/775
5,621,906 A * 4/1997 O'Neill et al. .............. 345/848
5,684,970 A * 11/1997 Asuma et al. ............... 345/775
5,896,133 A * 4/1999 Lynch et al. ................ 345/784
6,005,579 A * 12/1999 Sugiyama et al. .......... 345/855

* cited by examiner

*Primary Examiner*—John Cabeca
*Assistant Examiner*—Cuong T. Thai
(74) *Attorney, Agent, or Firm*—Mark P. Watson

(57) ABSTRACT

A display device including a display unit for displaying, on a menu screen, a plurality of types of information including first through N-th information having different attributes; a storage unit for storing first through N-th background screen character data for presenting first through N-th background display areas that respectively display icon information corresponding to the first through N-th information, and first through N-th icon information corresponding to the first and N-th information; and a control unit for performing control to create the first through N-th background display areas on the menu screen on an area by area basis, based on the first through N-th background screen character data, and to display the icon information on an area by area basis.

28 Claims, 70 Drawing Sheets

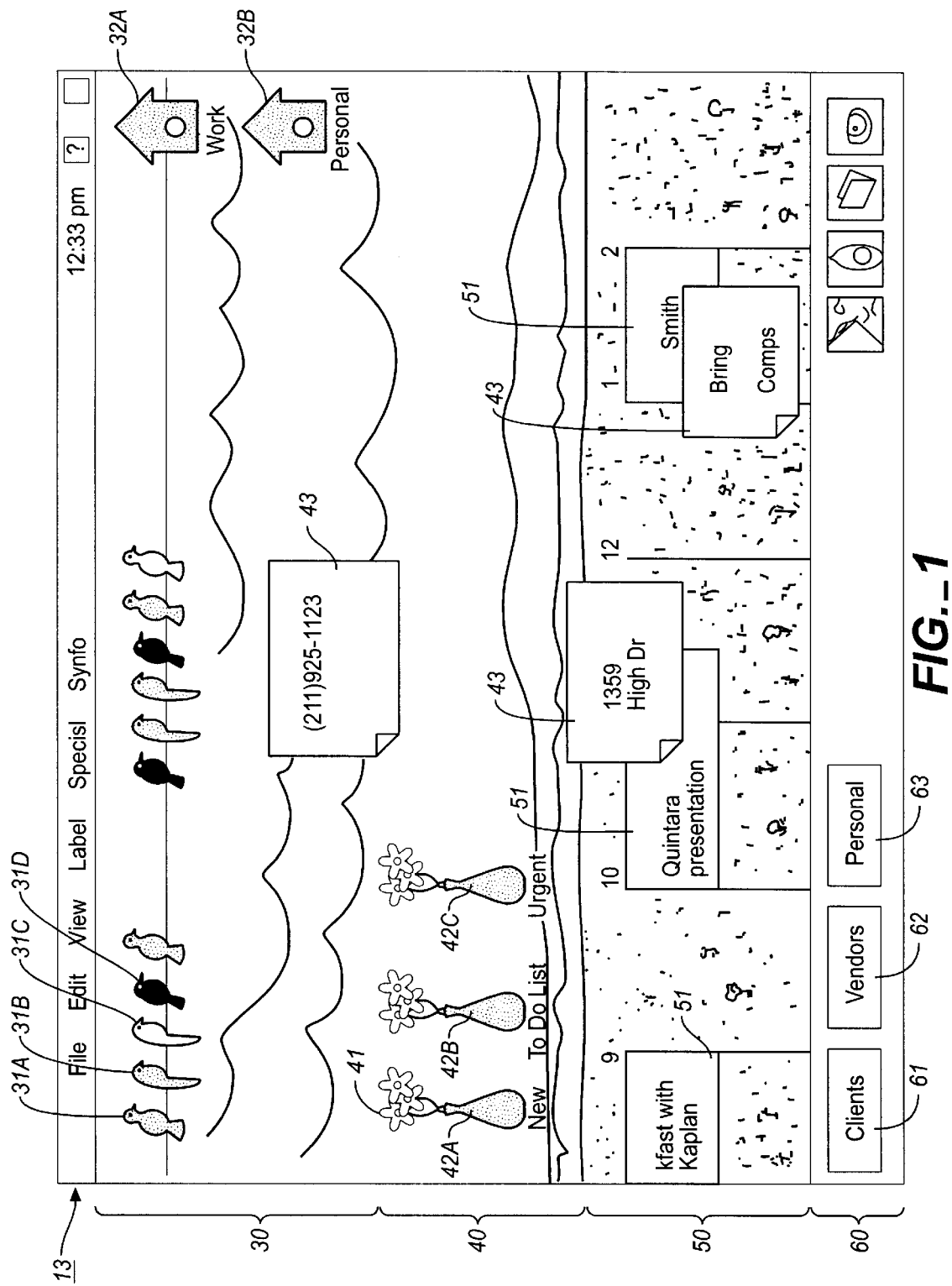
FIG._1

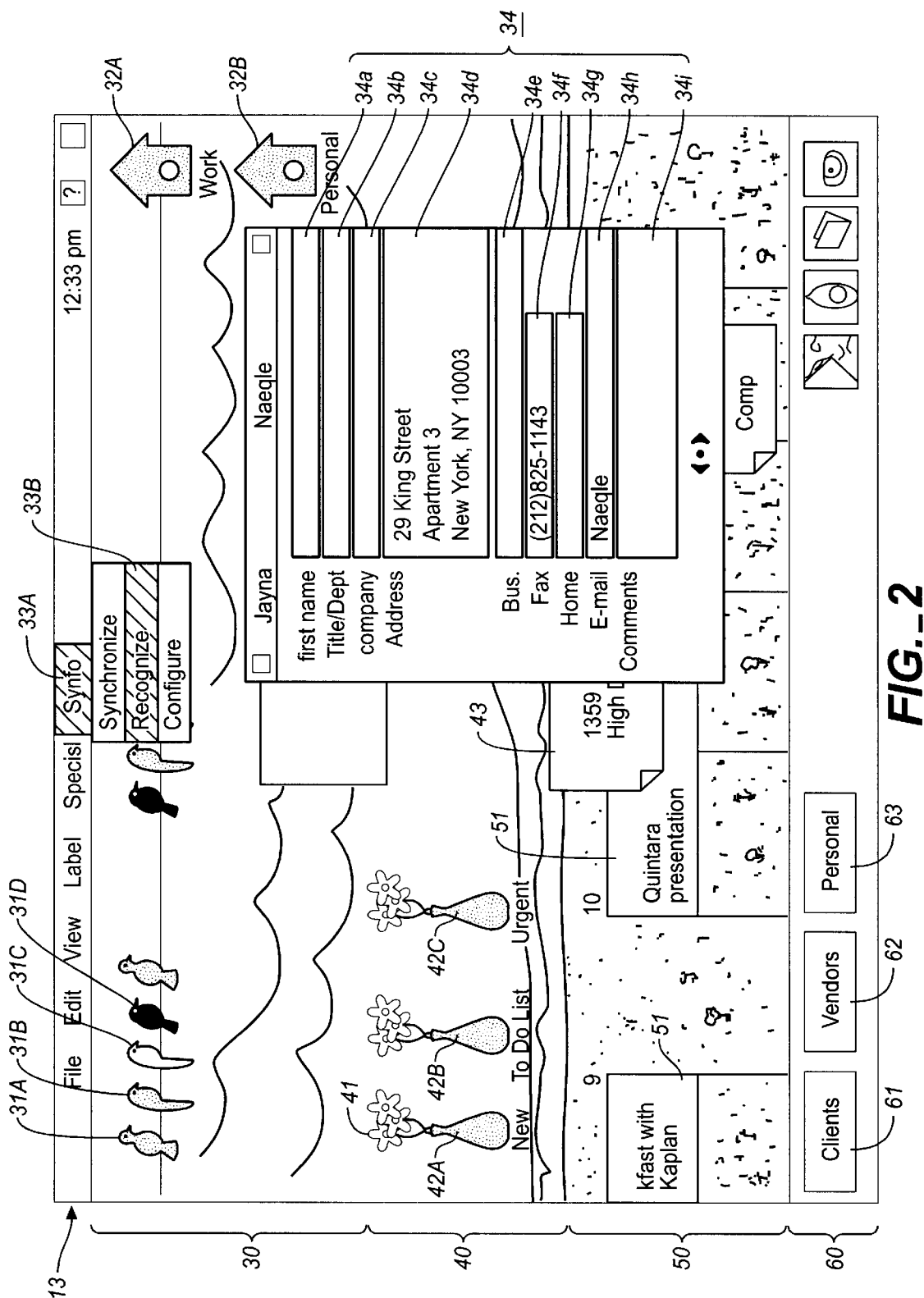
FIG._2

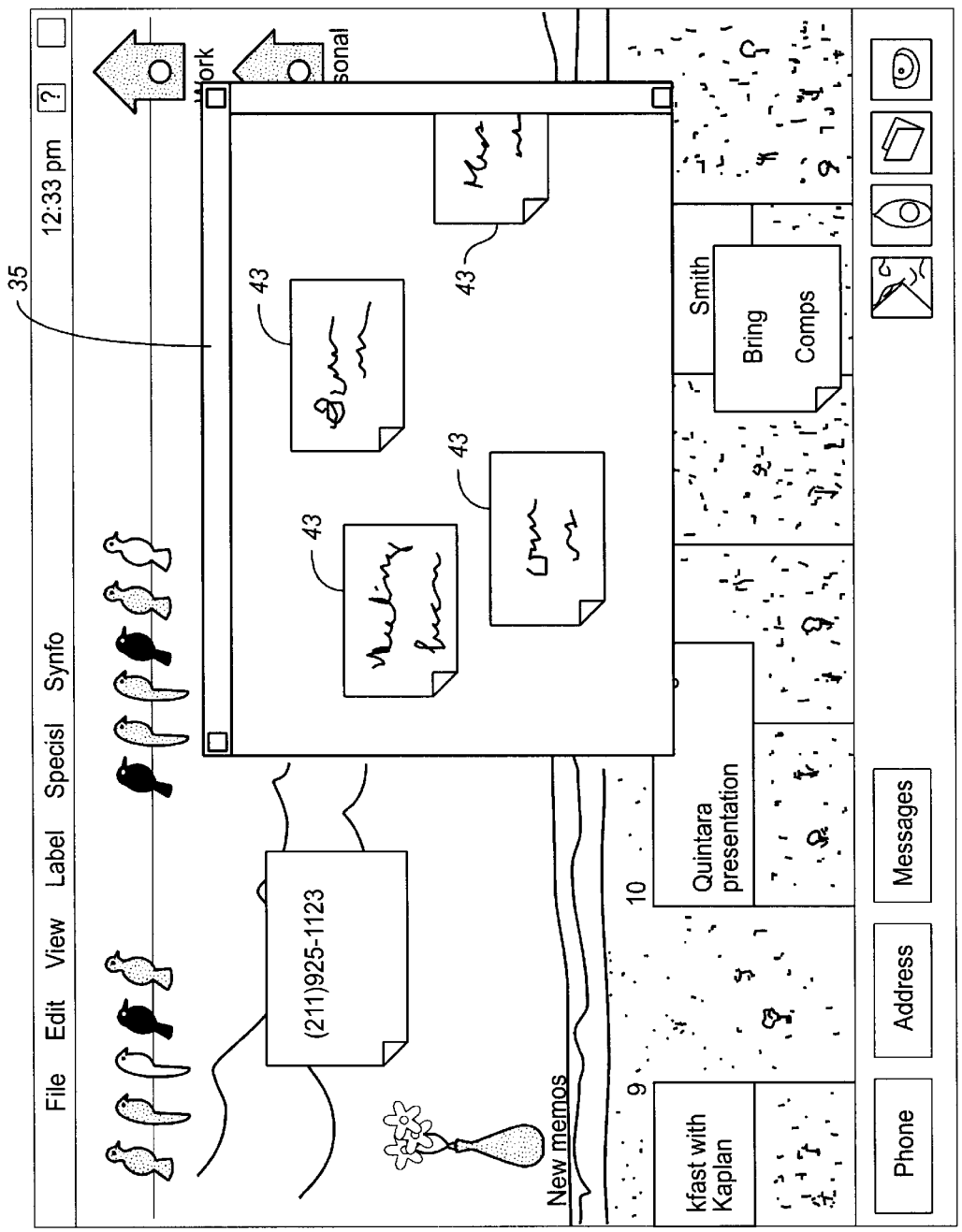
FIG._3

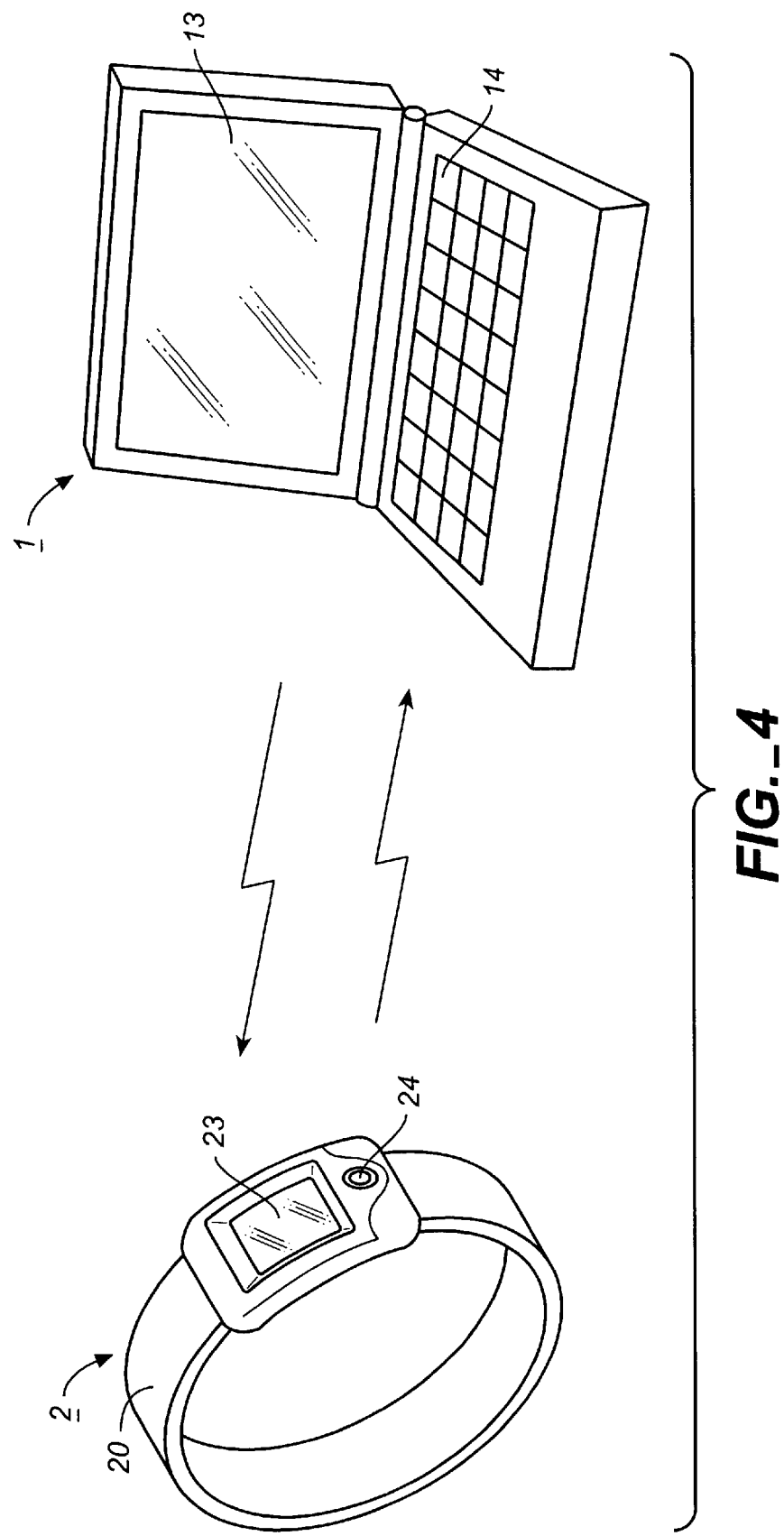
FIG._4

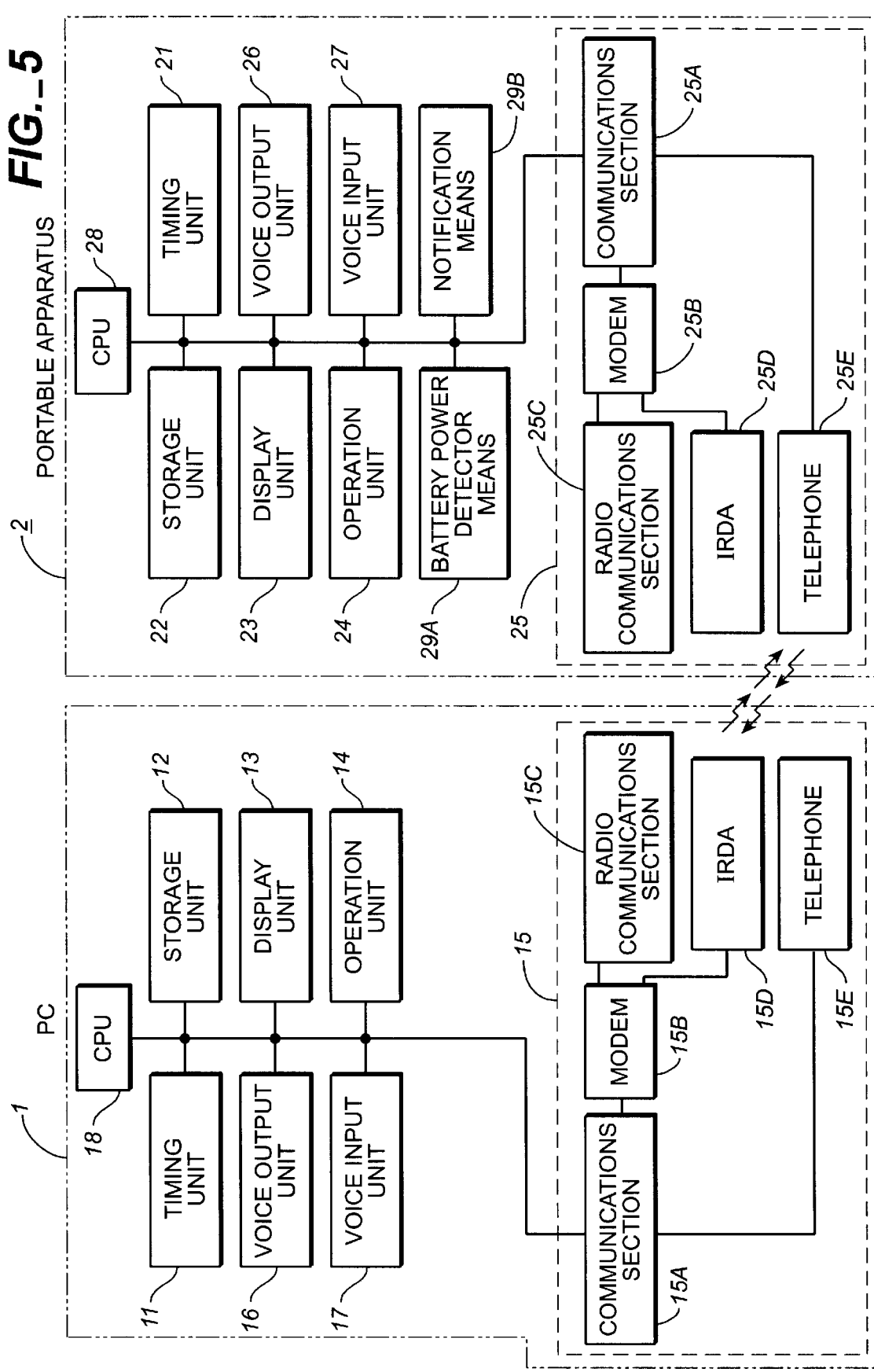

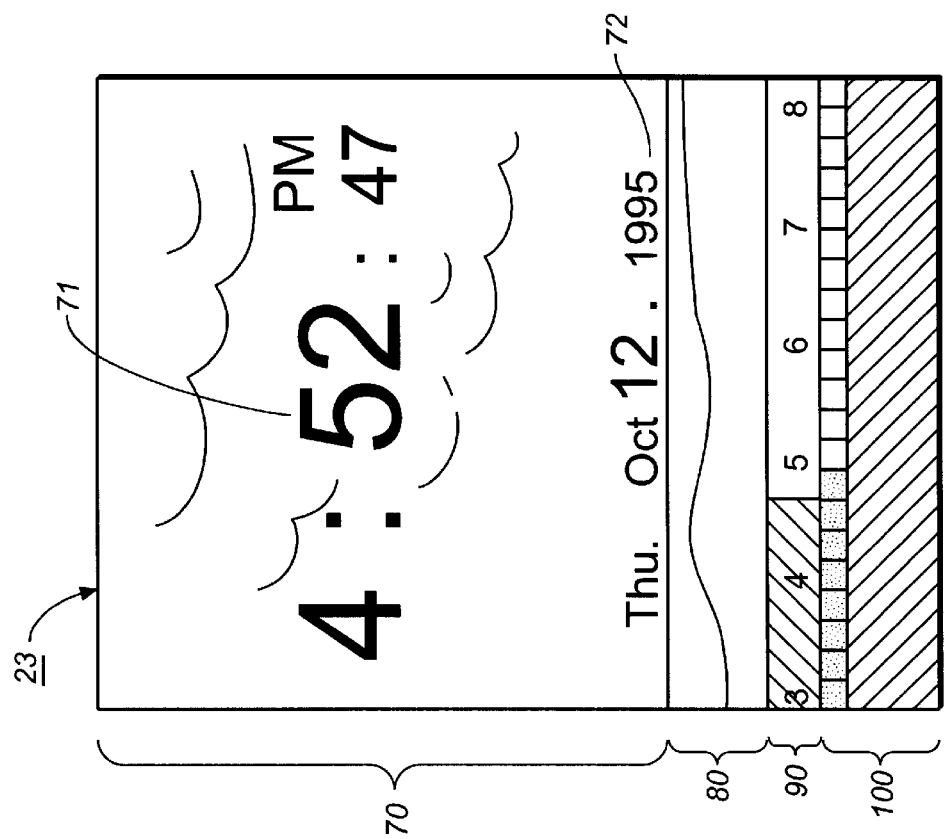
FIG._7
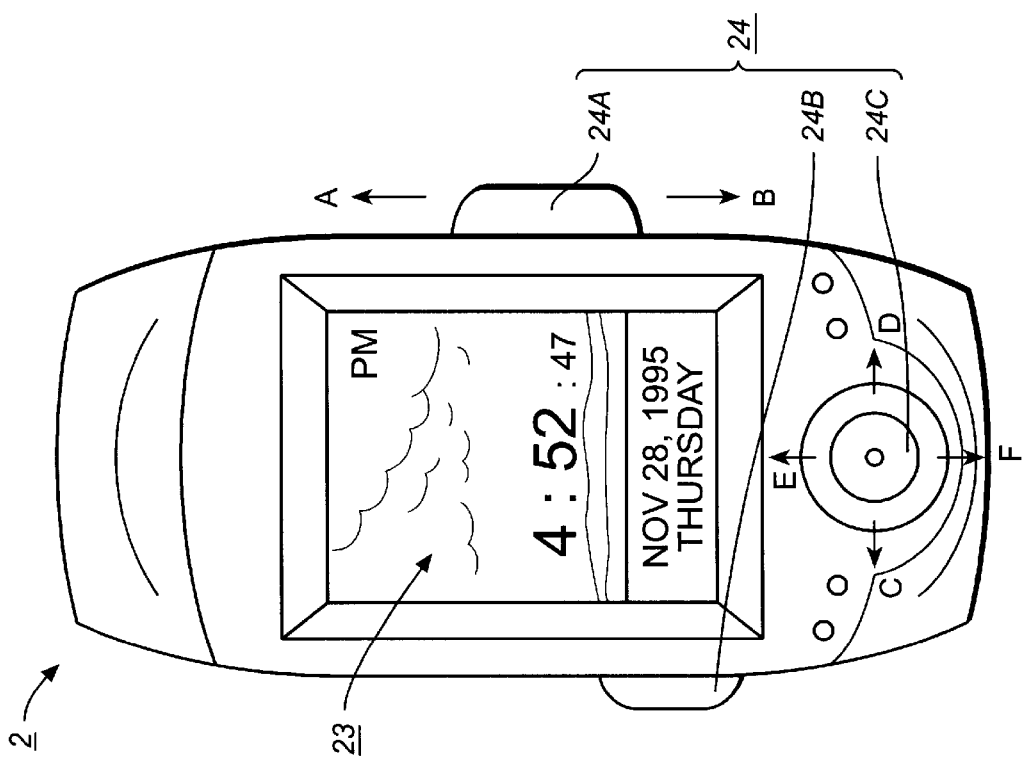
FIG._6

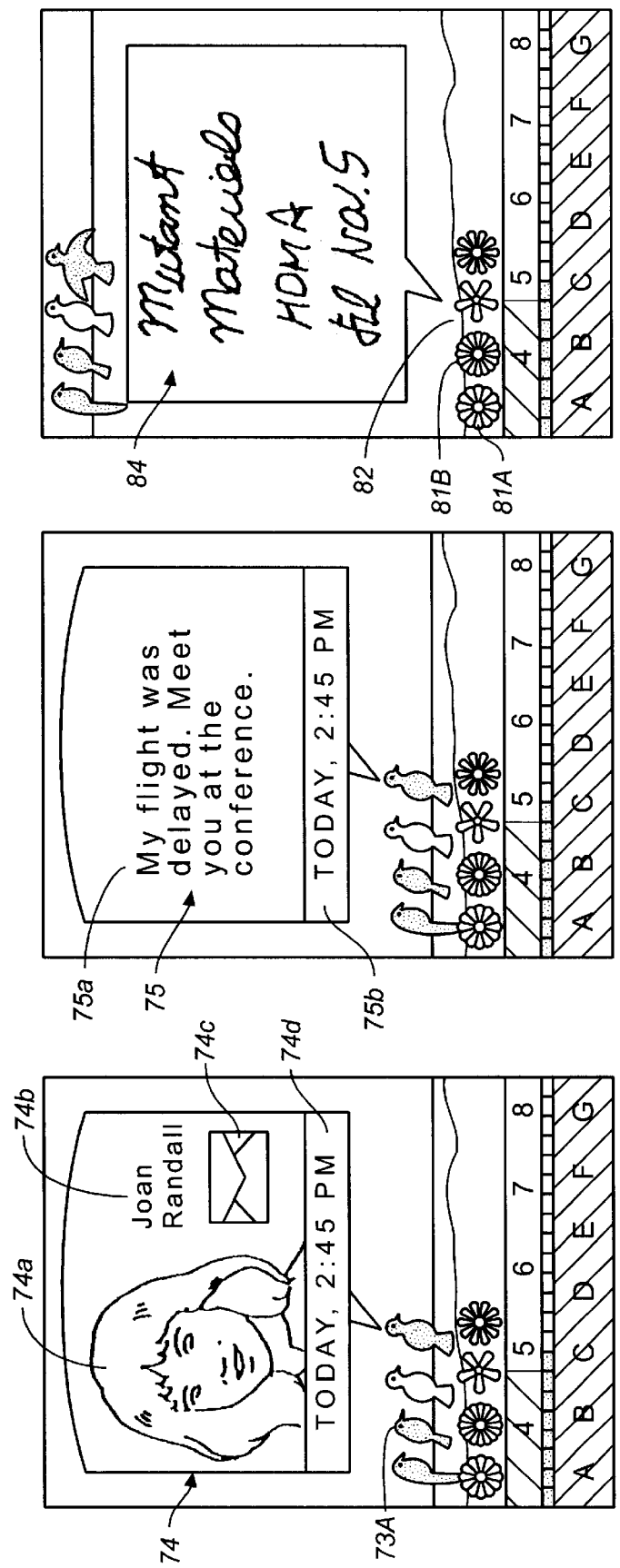

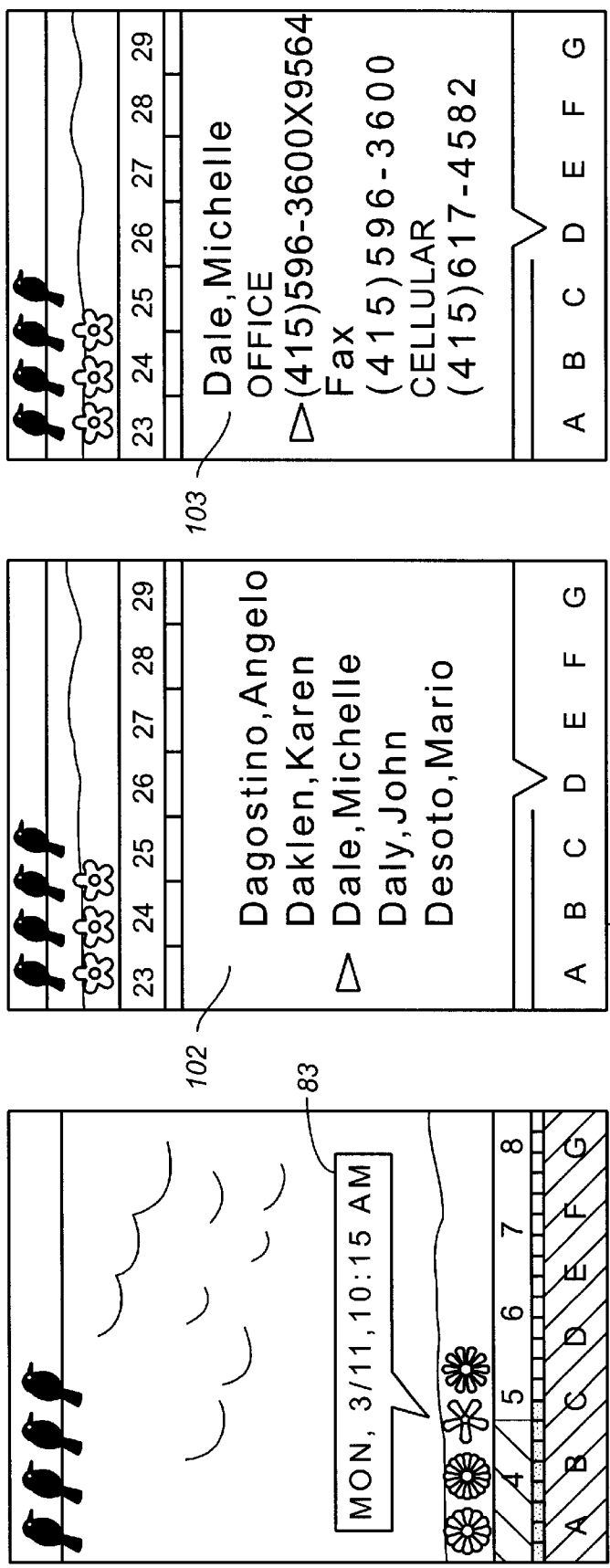

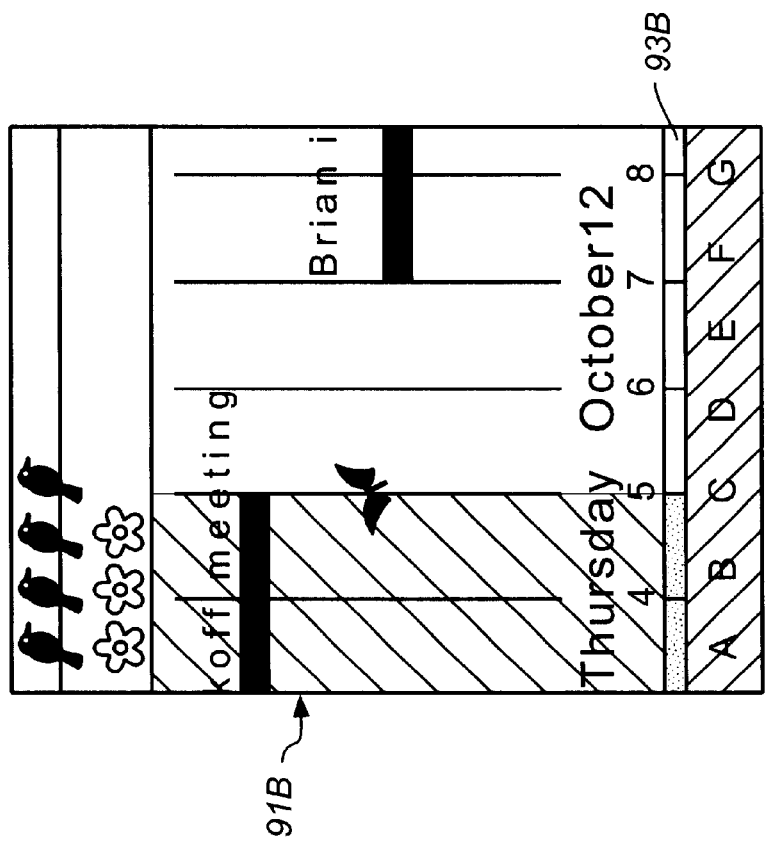
FIG._9B
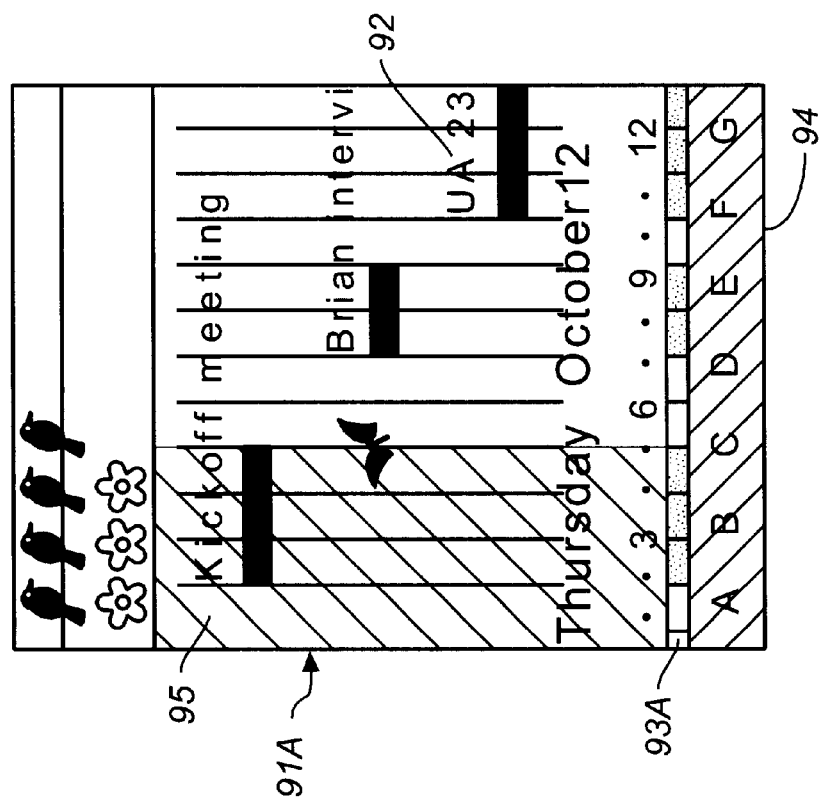
FIG._9A

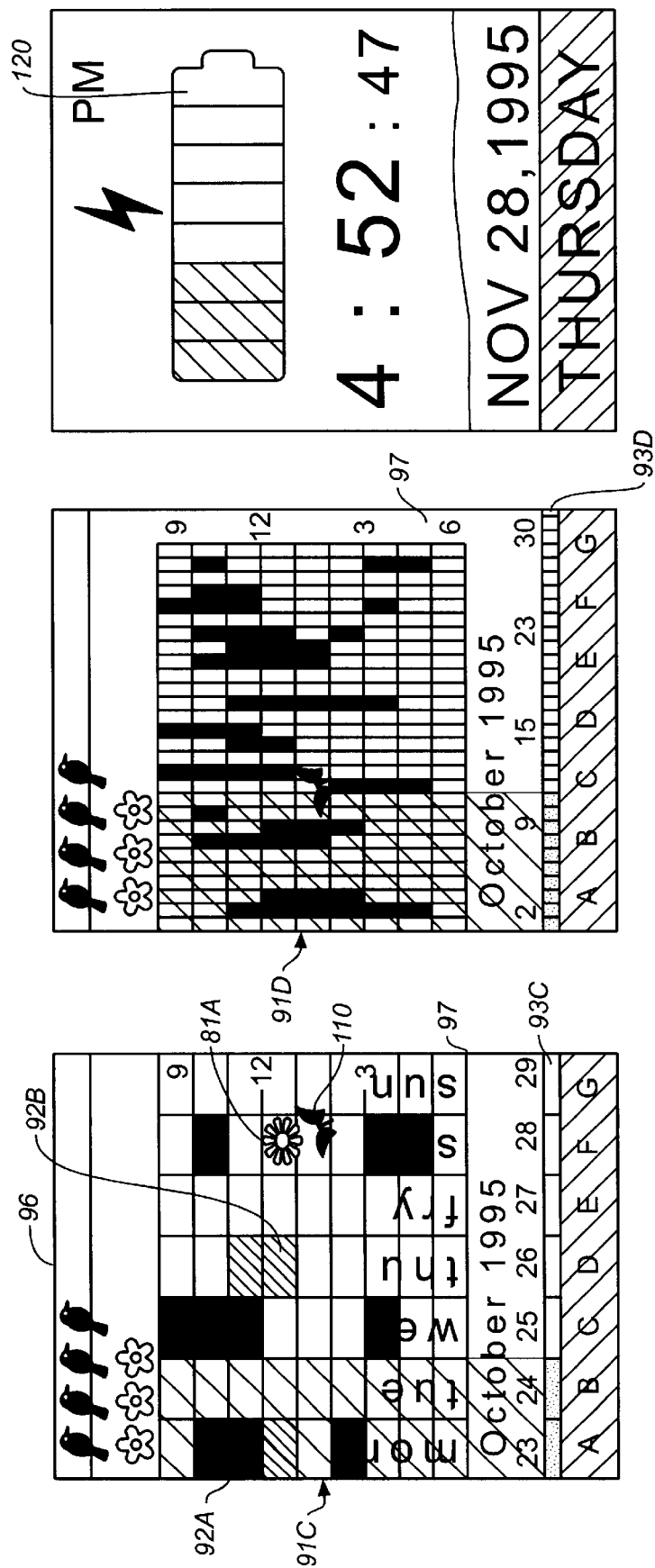

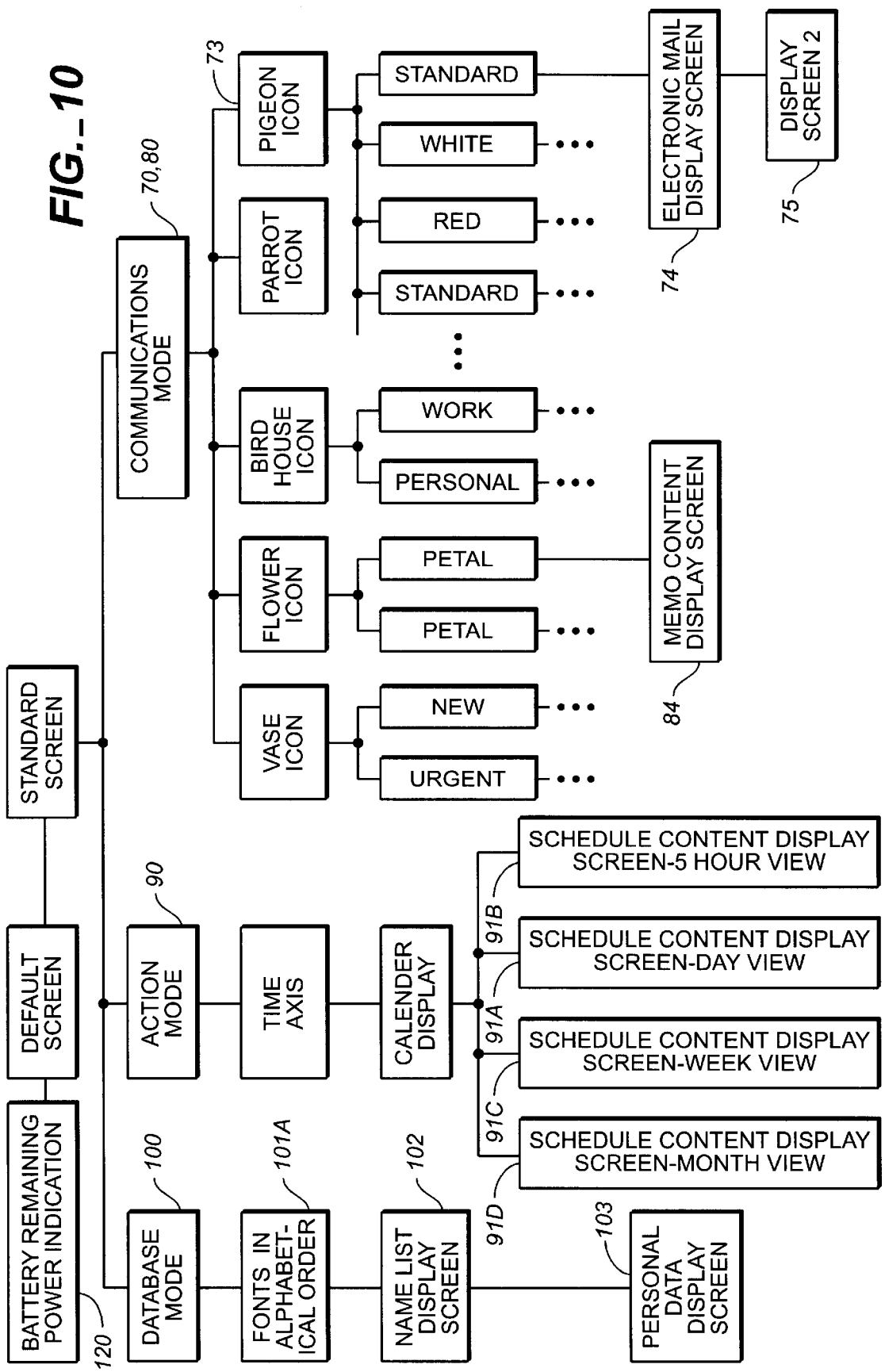

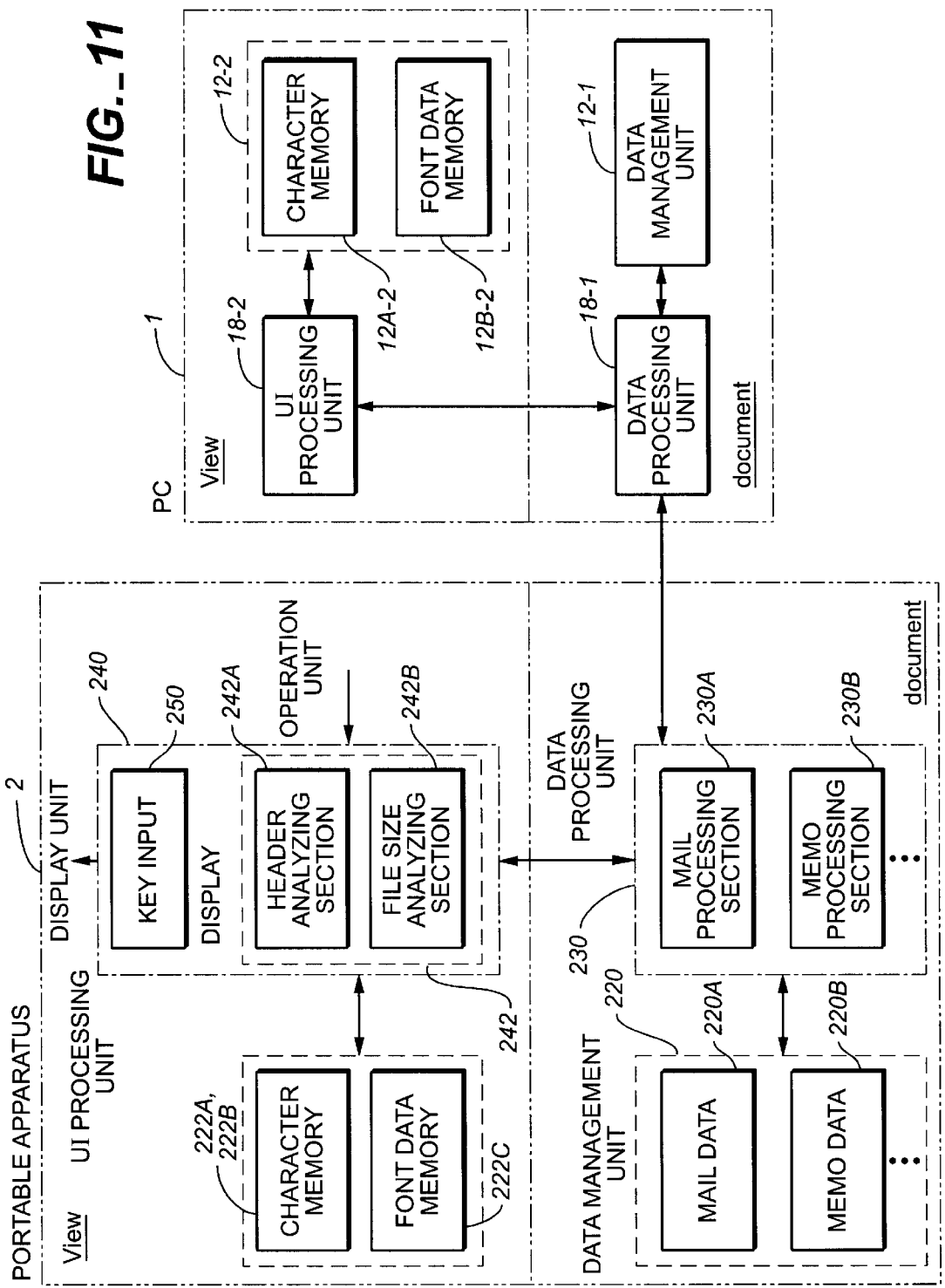

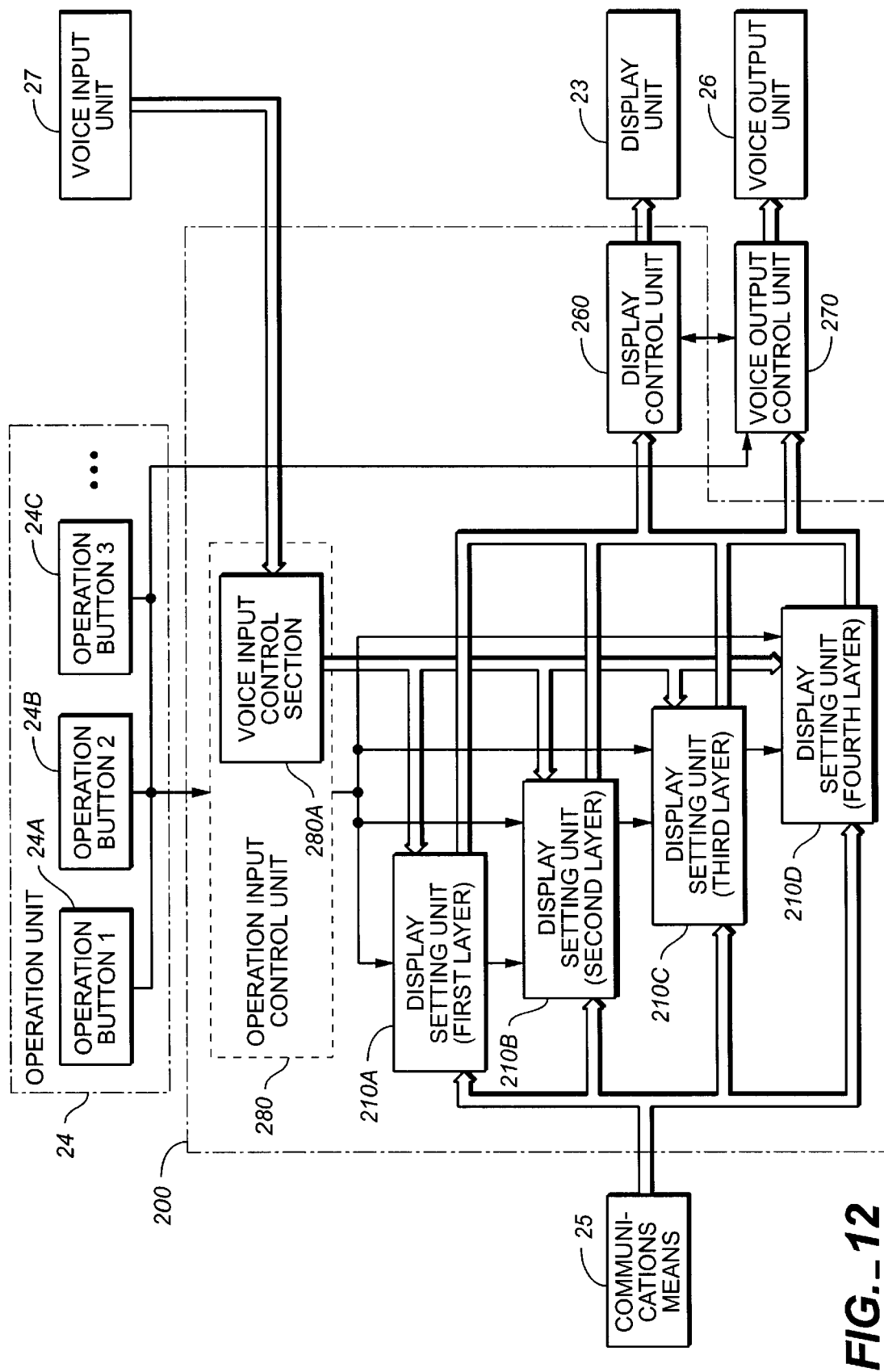
FIG._12

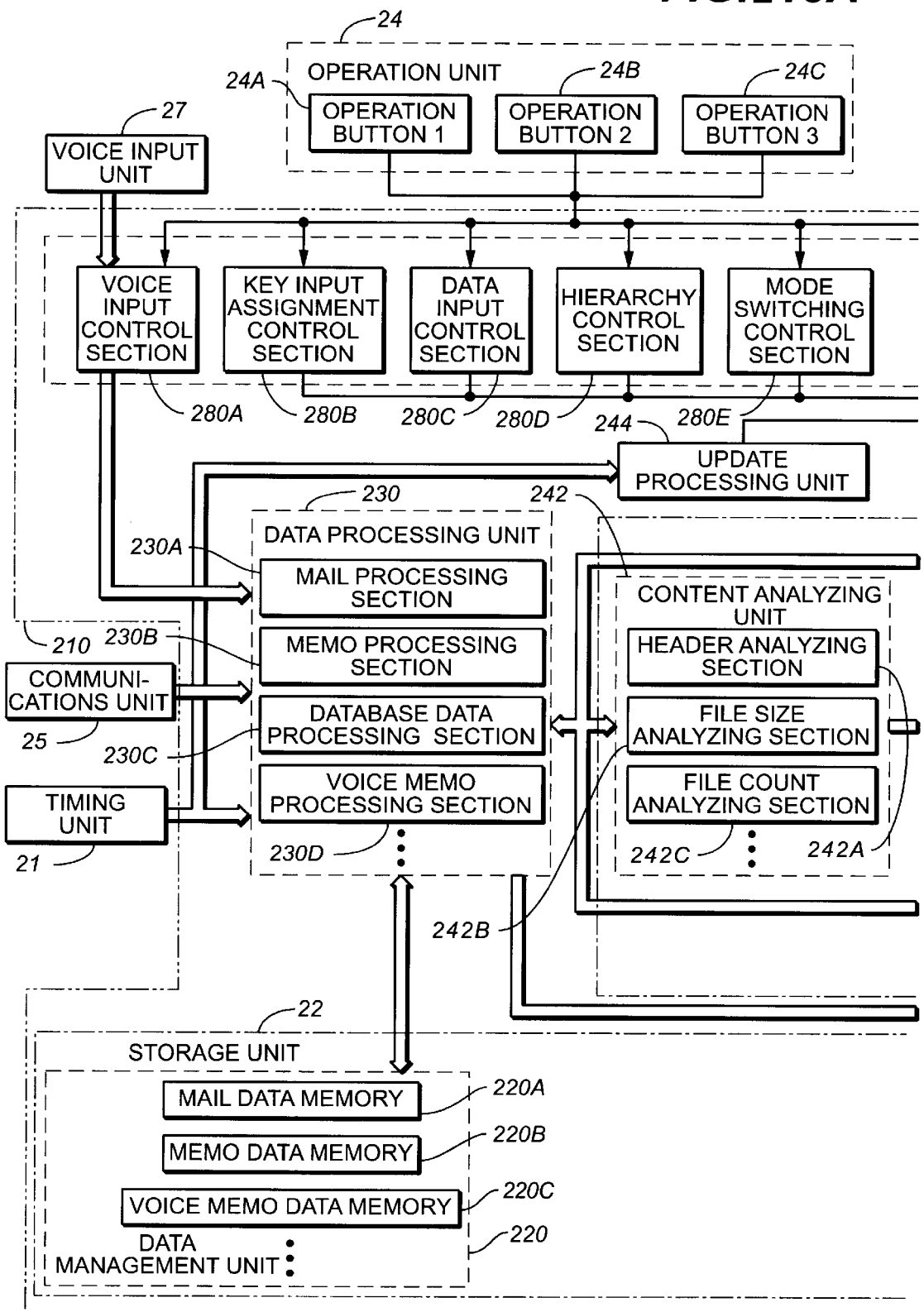
FIG._13A

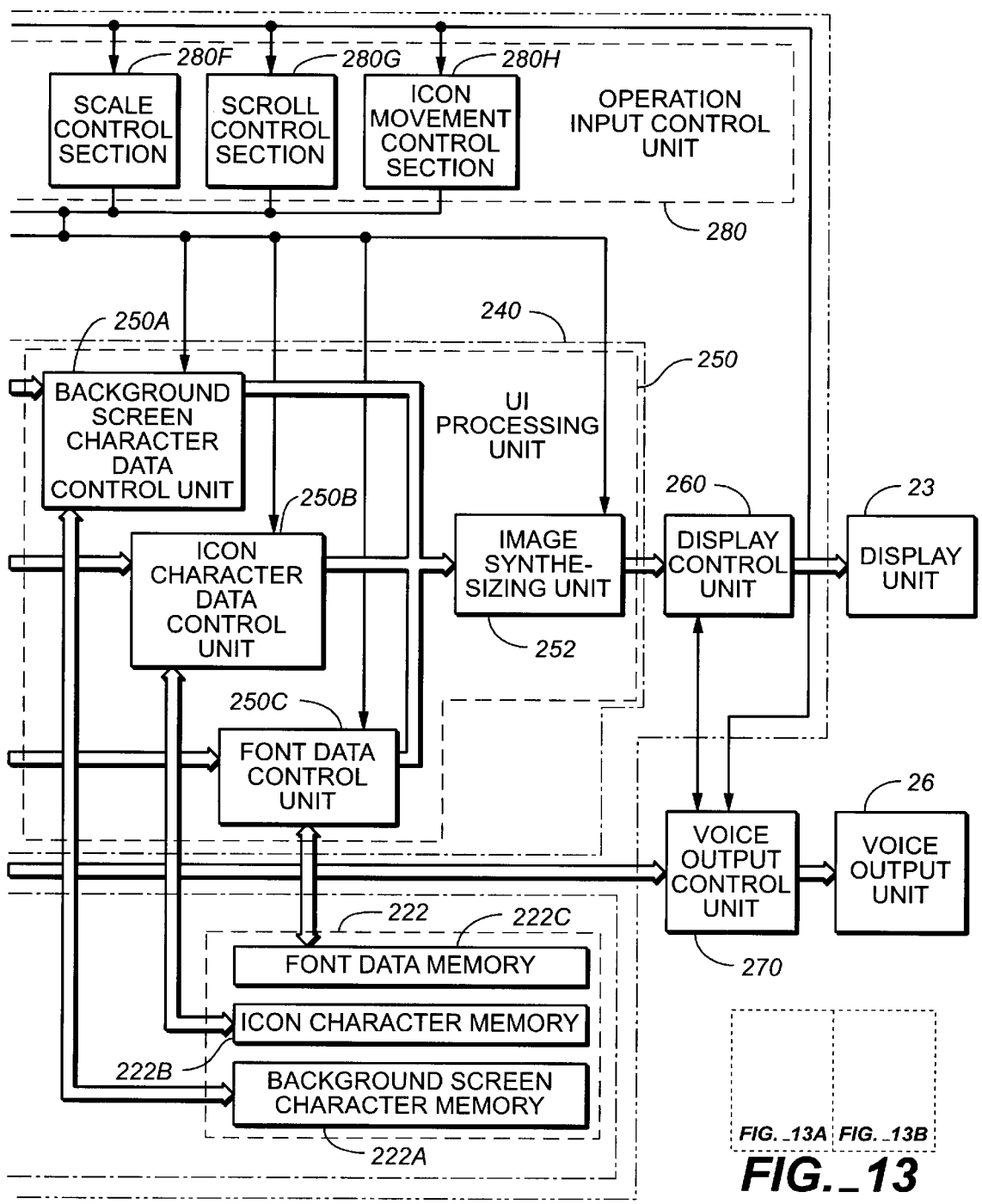
FIG._13B
FIG._13

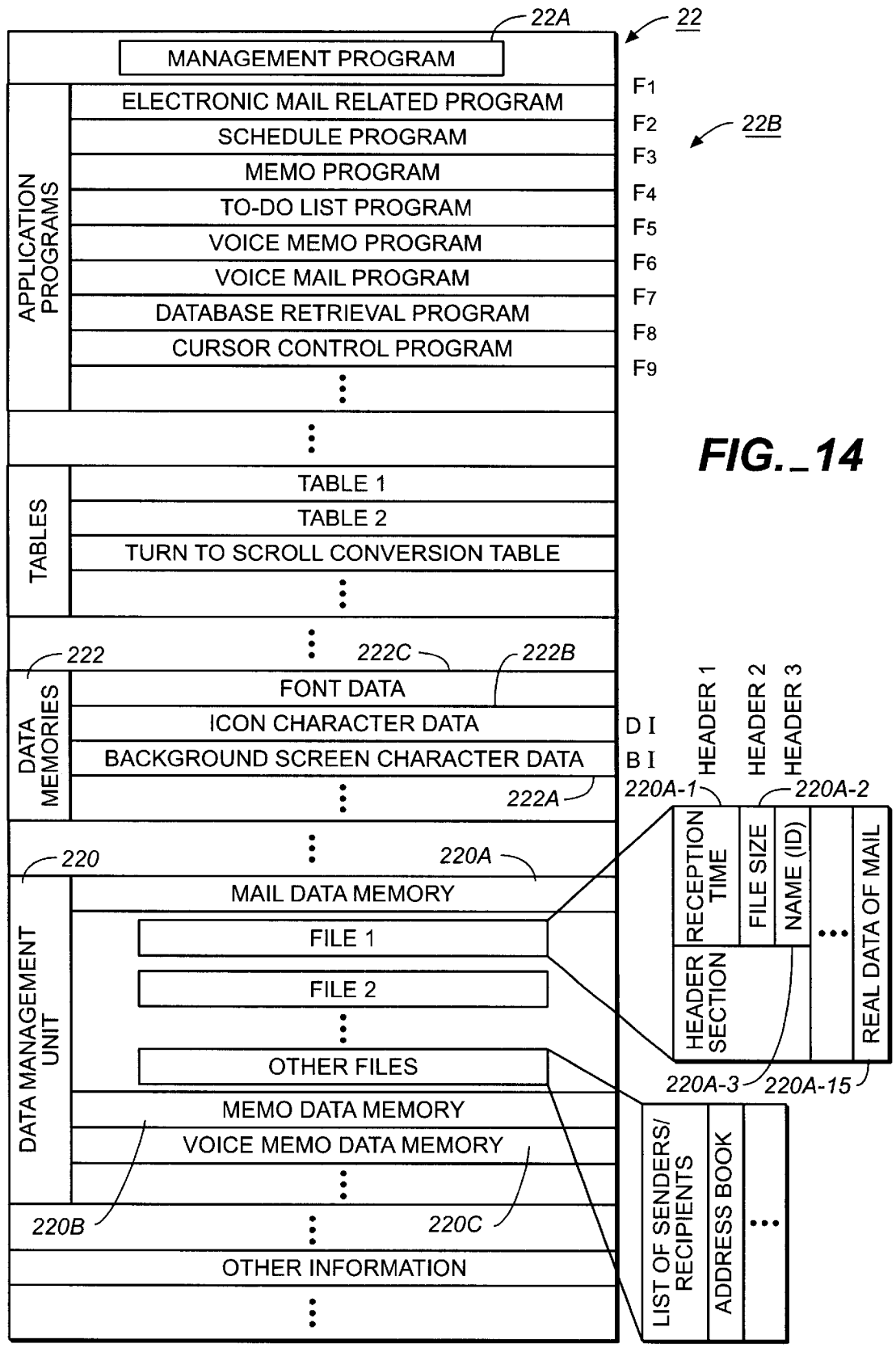
FIG._14

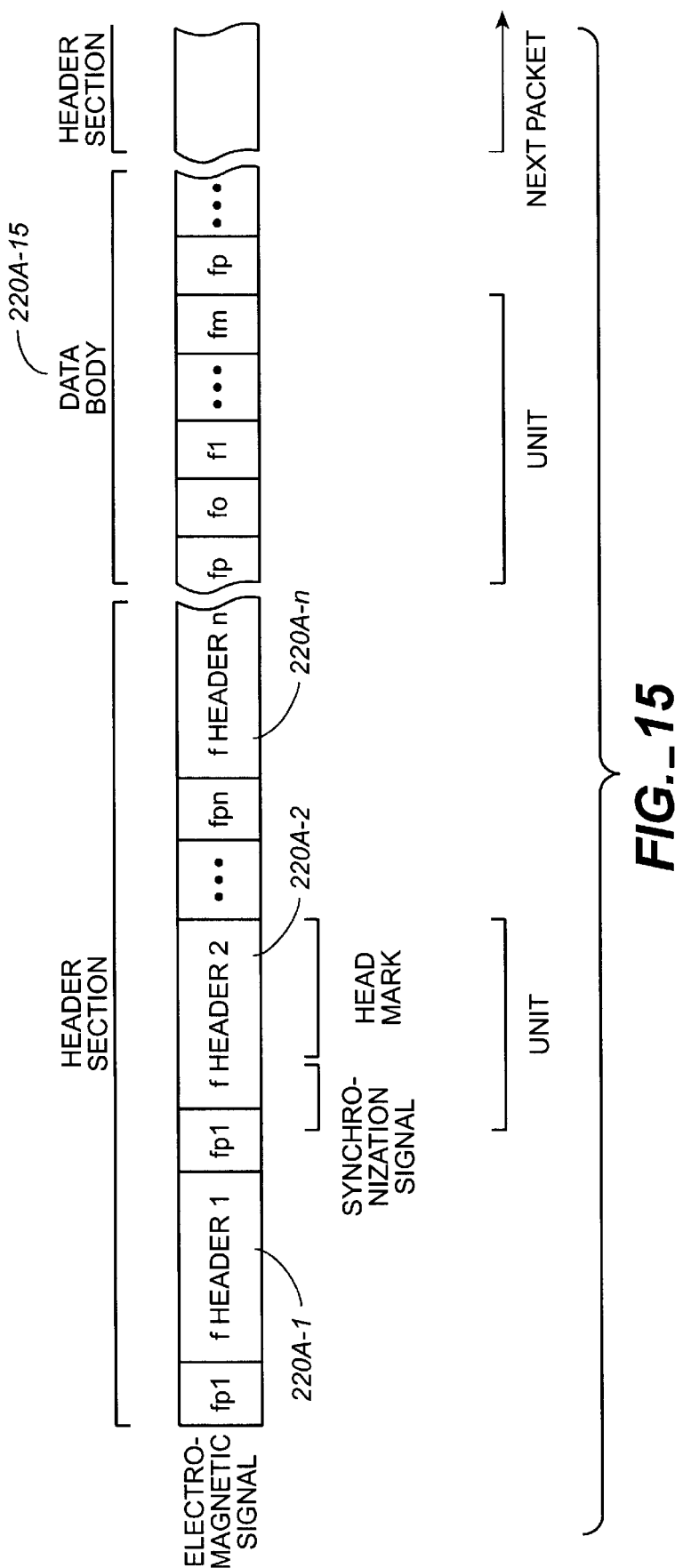
FIG._15

Table 1

| FUNCTION NAME | ICON CHARACTER DATA POINTER | FUNCTION PROGRAM POINTER |
|---|---|---|
| ELECTRONIC MAIL | DI1 | F1 |
| ELECTRONIC MAIL | DI2 | F1 |
| ELECTRONIC MAIL | DI3 | F1 |
| VOICE MAIL | DI4 | F6 |
| VOICE MEMO | DI5 | F5 |
| HAND-WRITTEN MEMO | DI6 | F3 |
| VOICE MEMO | DI7 | F5 |
| SCHEDULE | DI9 | F2 |
| SCHEDULE | DI10 | F2 |
| CURSOR CONTROL | DI11 | F8 |
| ... | ... | ... |

*FIG._16A*

Table 2

| MENU NAME | MENU FORMAT | BACKGROUND SCREEN CHARACTER POINTER | ICON LAYOUT | |
|---|---|---|---|---|
| DEFAULT SCREEN | ENTIRE SCREEN | BI1 | | |
| COMMUNICATIONS AREA | ENTIRE SCREEN | BI2 | ELECTRONIC MAIL (X1,Y1) | |
| | | | MEMO (X2,Y2) | |
| SCHEDULE AREA | ENTIRE SCREEN | BI3 | | |
| DATABASE AREA | ENTIRE SCREEN | BI4 | | |
| ELECTRONIC MAIL DISPLAY SCREEN | POP-UP | BI5 | | |
| MEMO DISPLAY SCREEN | POP-UP | BI6 | | |
| SCHEDULE MODE (DAY SCALE) | ENTIRE SCREEN | BI7 | SCHEDULE (X3,Y3) | |
| DATABASE MODE (NAME SELECTION) | POP-UP | BI8 | | |
| ... | ... | ... | ... | |

(DEFAULT SCREEN through DATABASE AREA = STANDARD SCREEN)

FIG. _16B

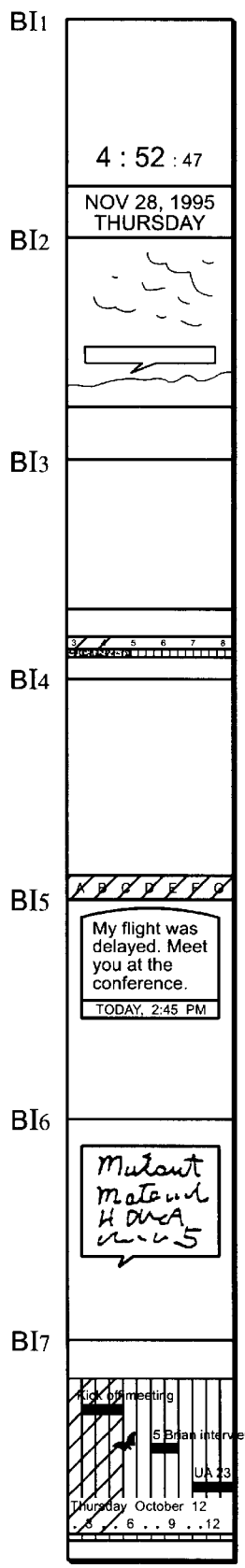
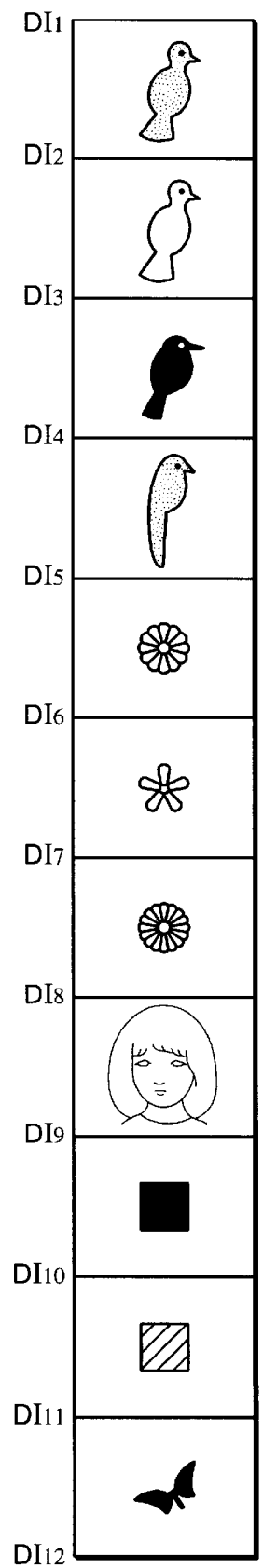
FIG._17A  FIG._17B

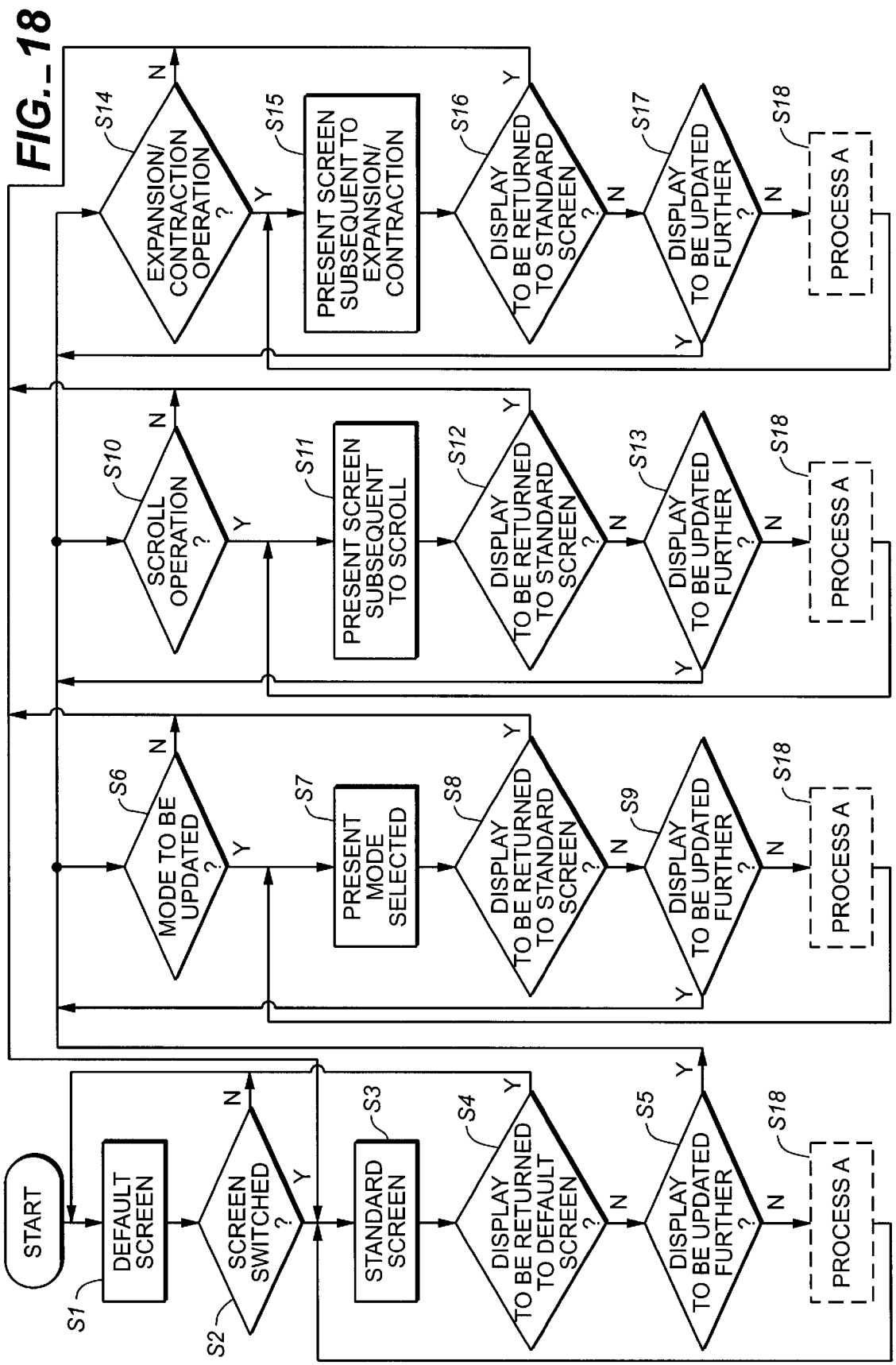
FIG._18

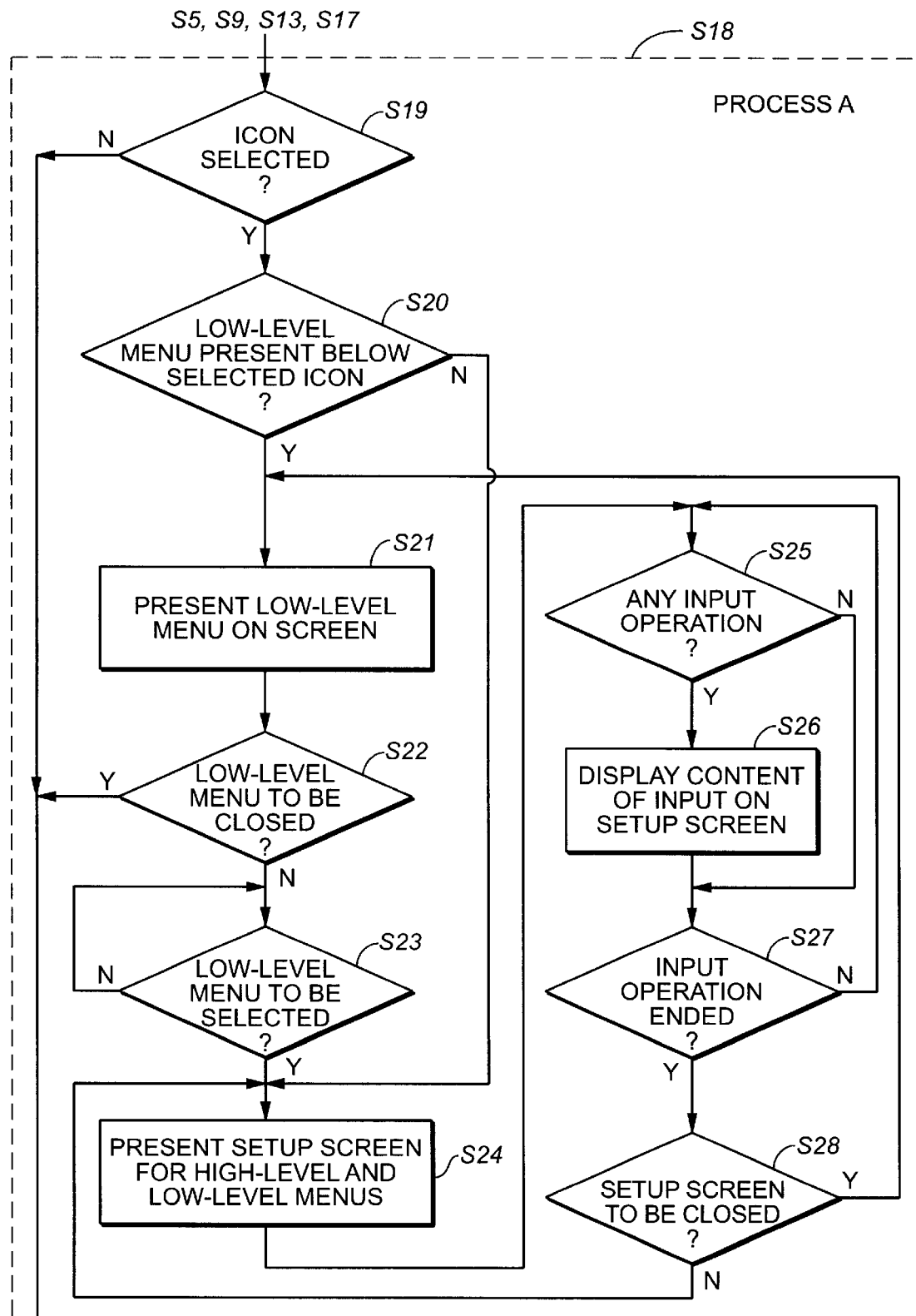
FIG._19

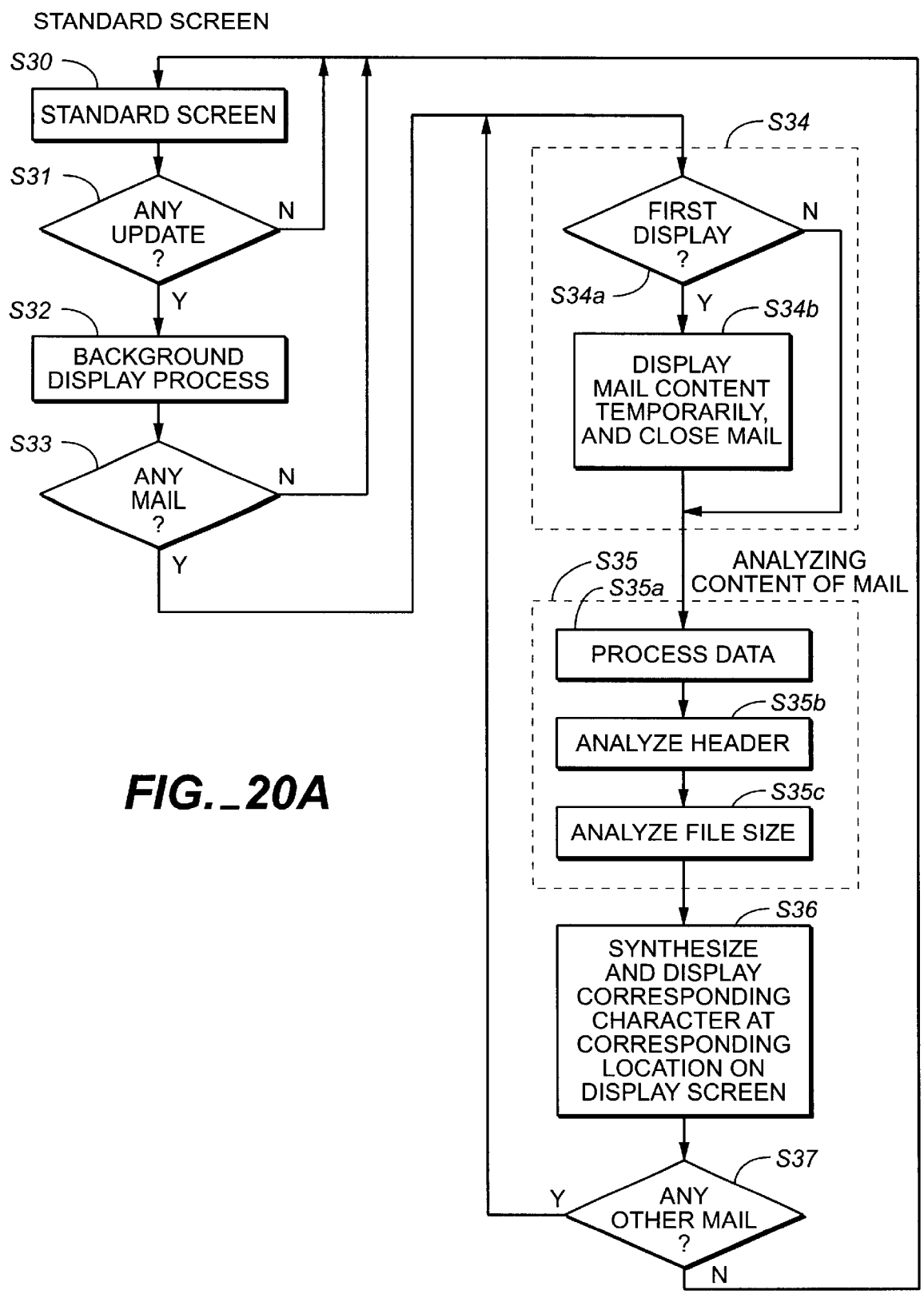
FIG._20A

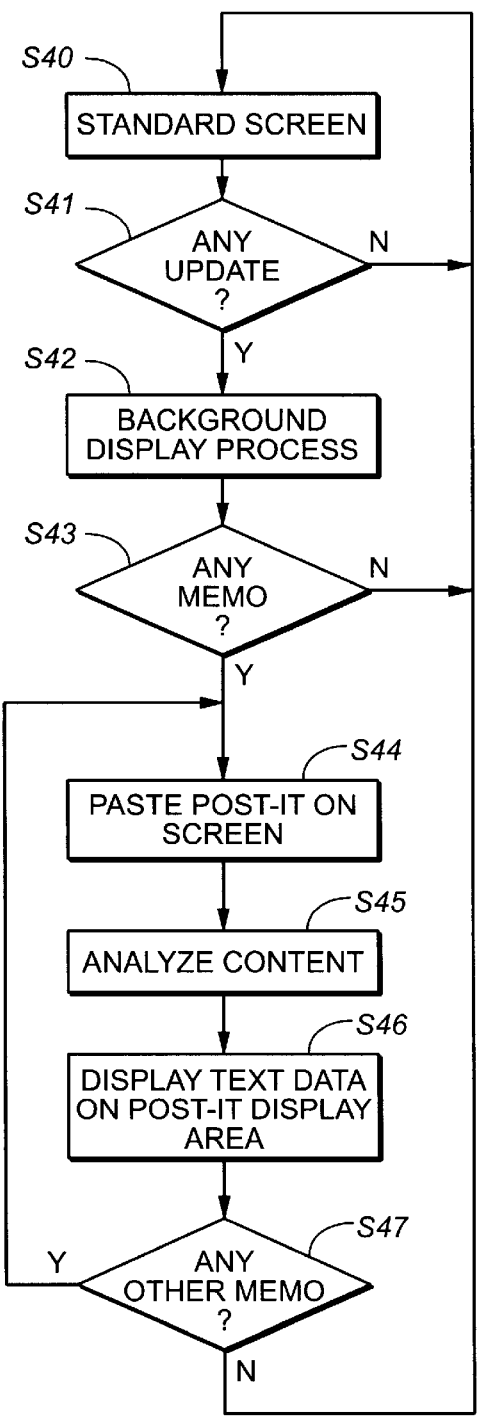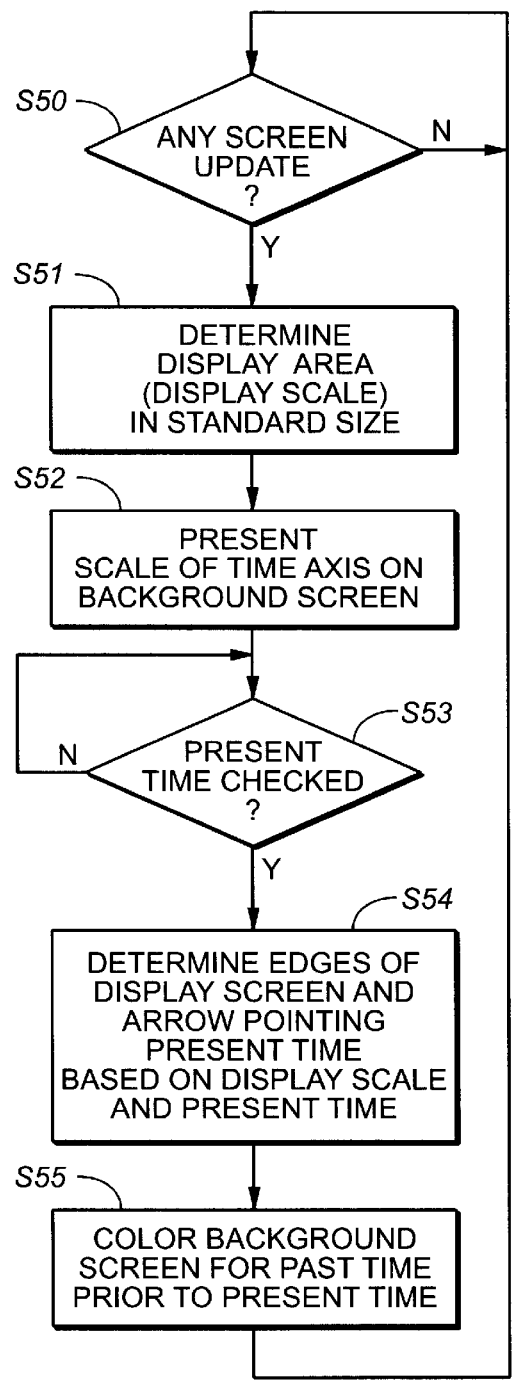
FIG._20B  FIG._21A

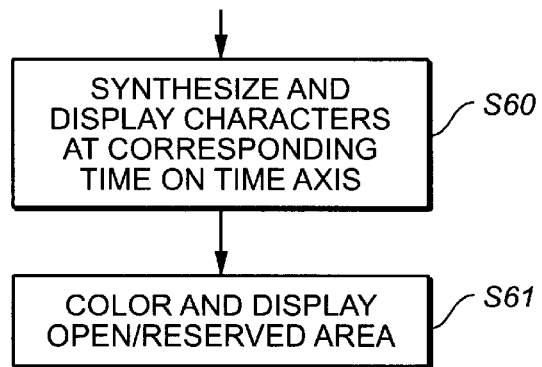
FIG._21B
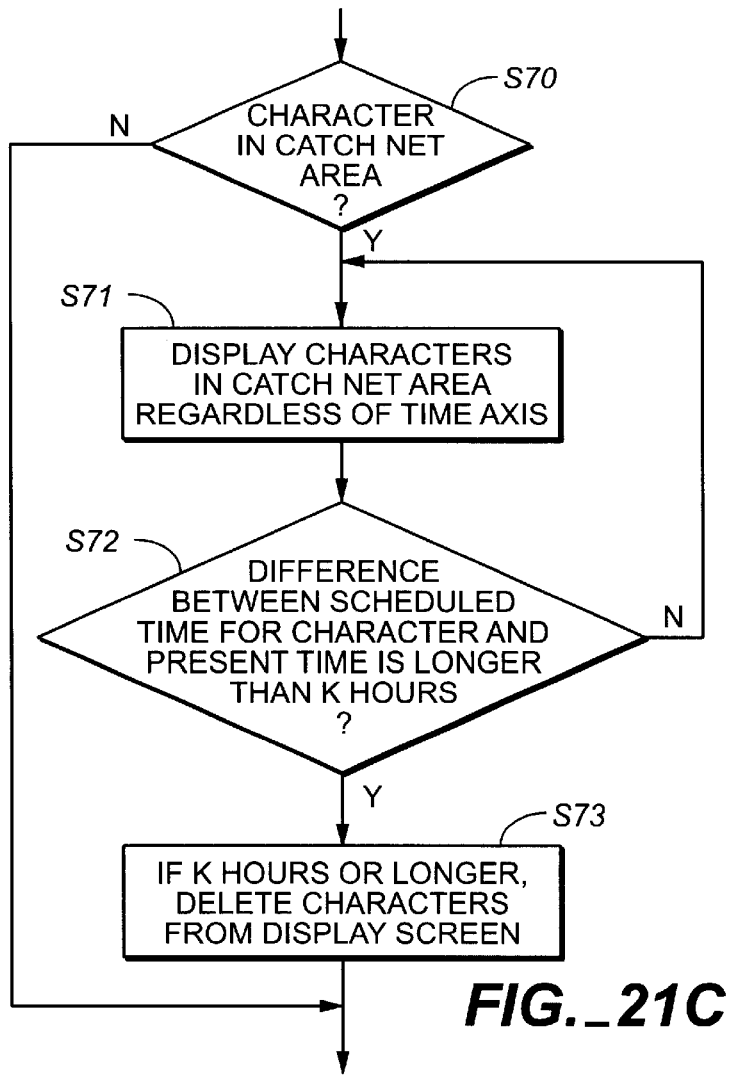
FIG._21C

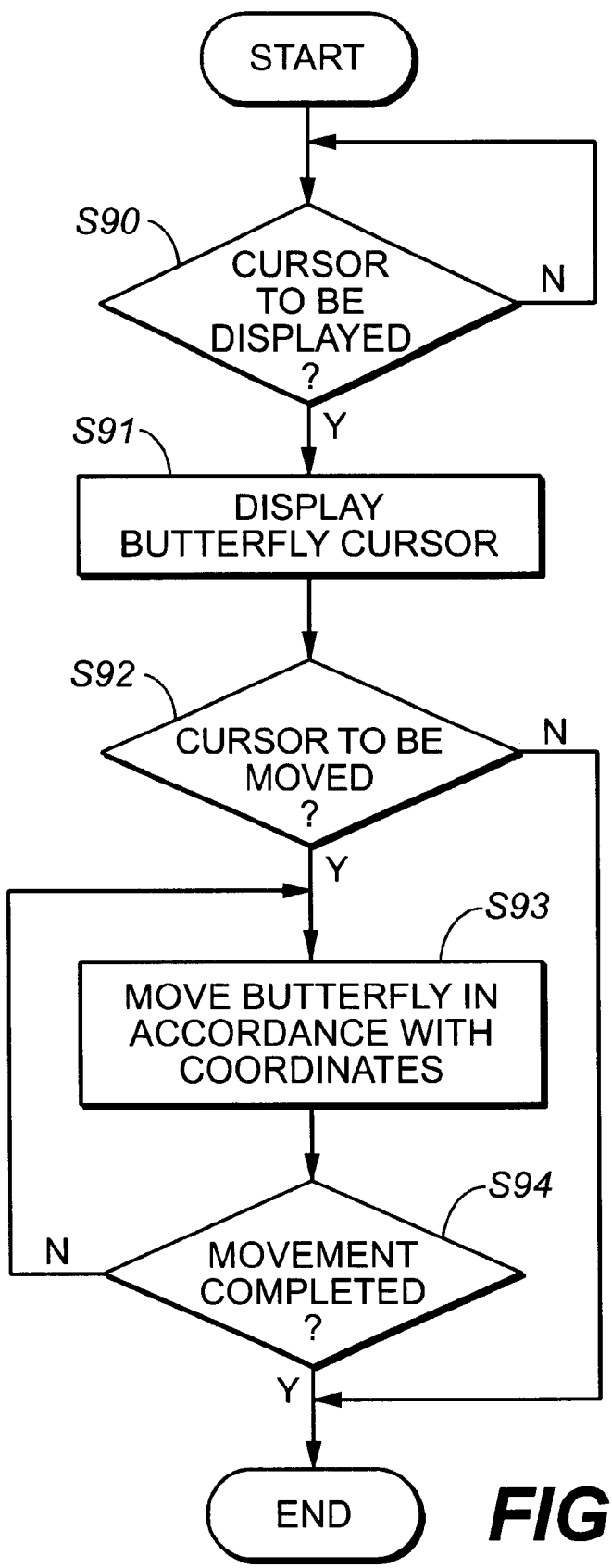
FIG. _22

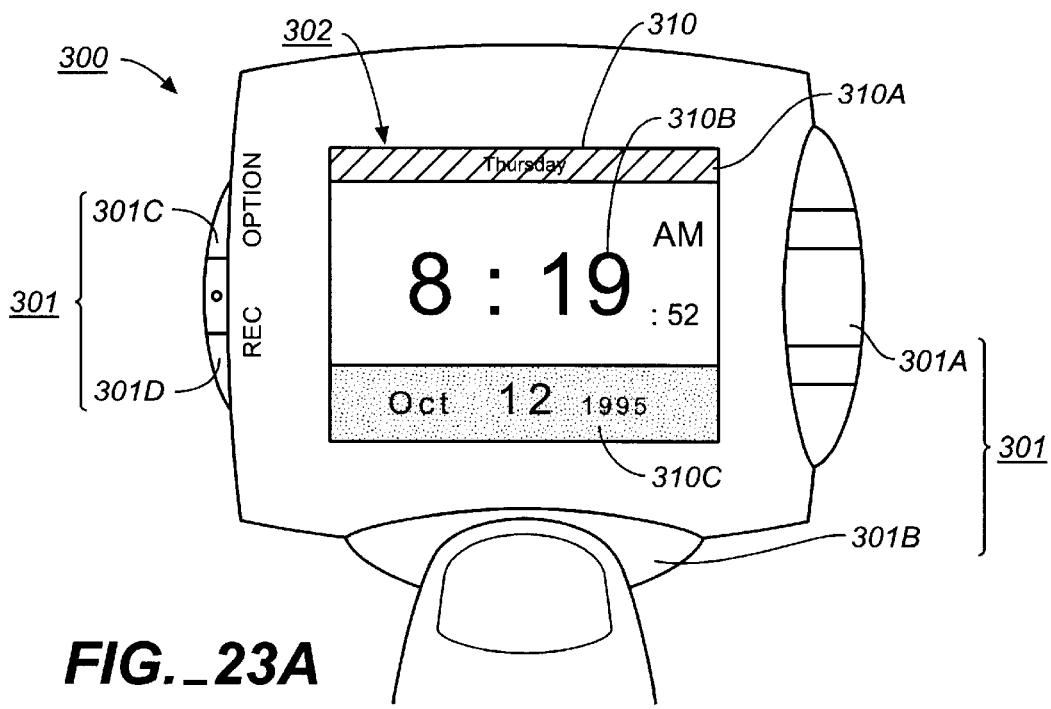
FIG._23A
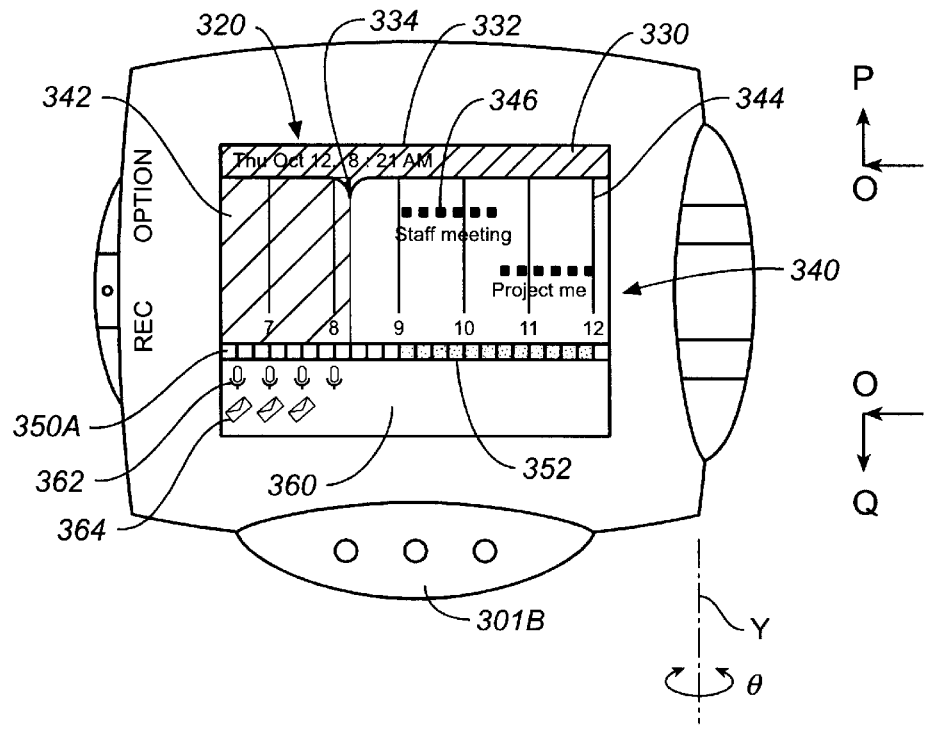
FIG._23B

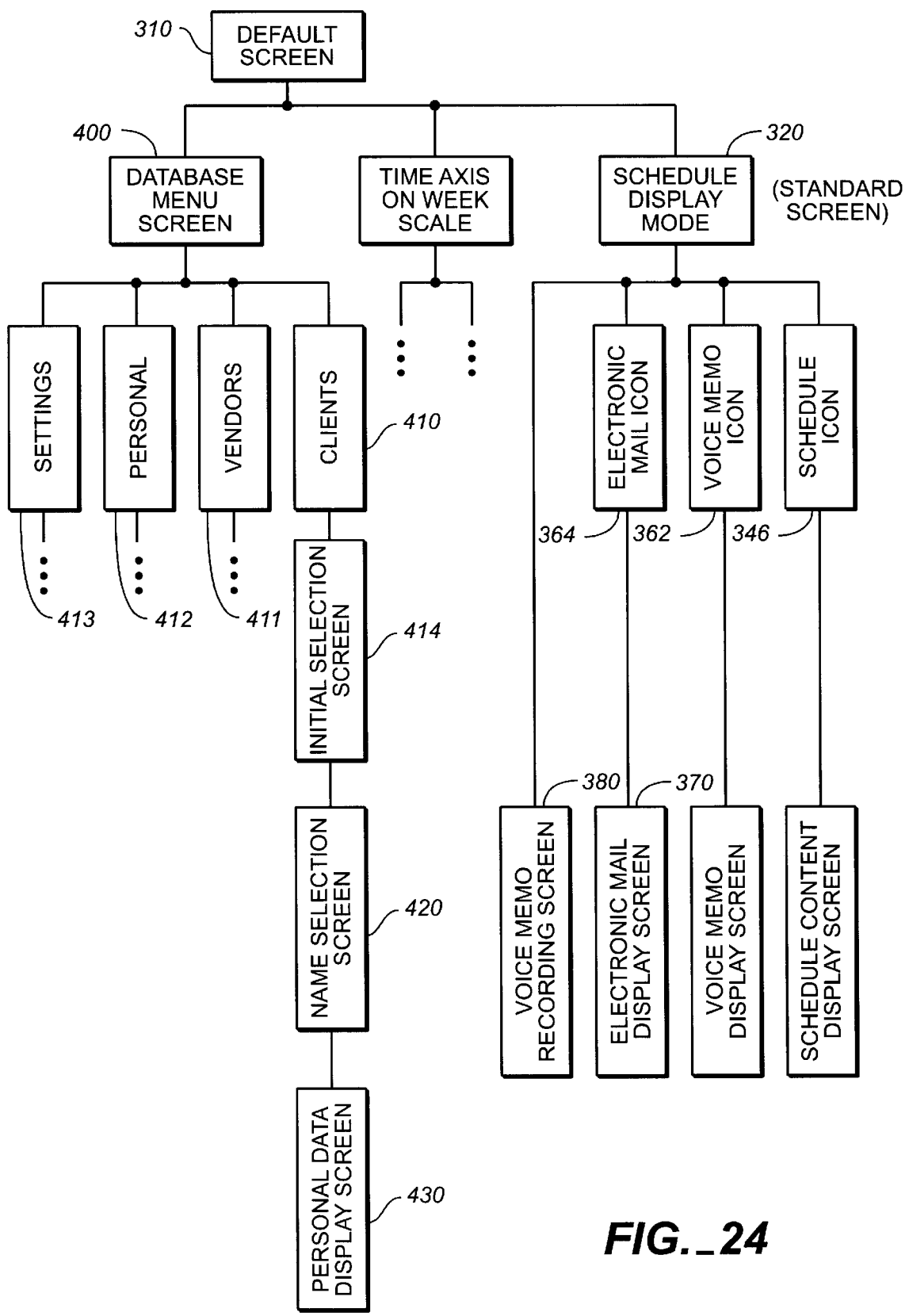
FIG._24

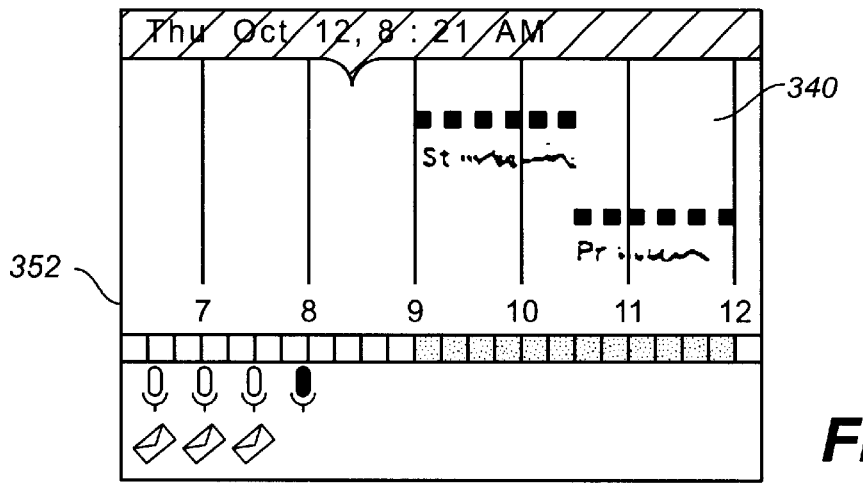
FIG._25A
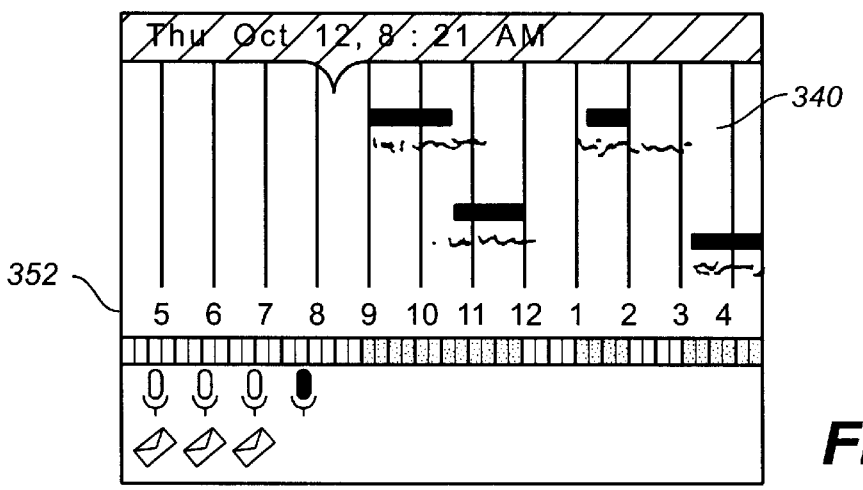
FIG._25B
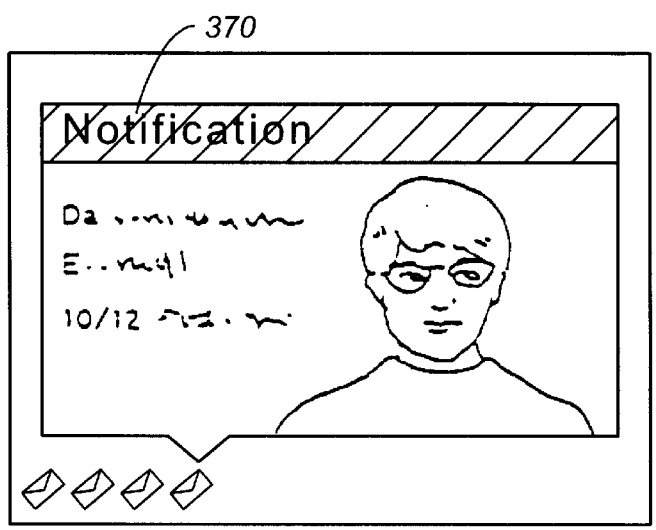
FIG._25C

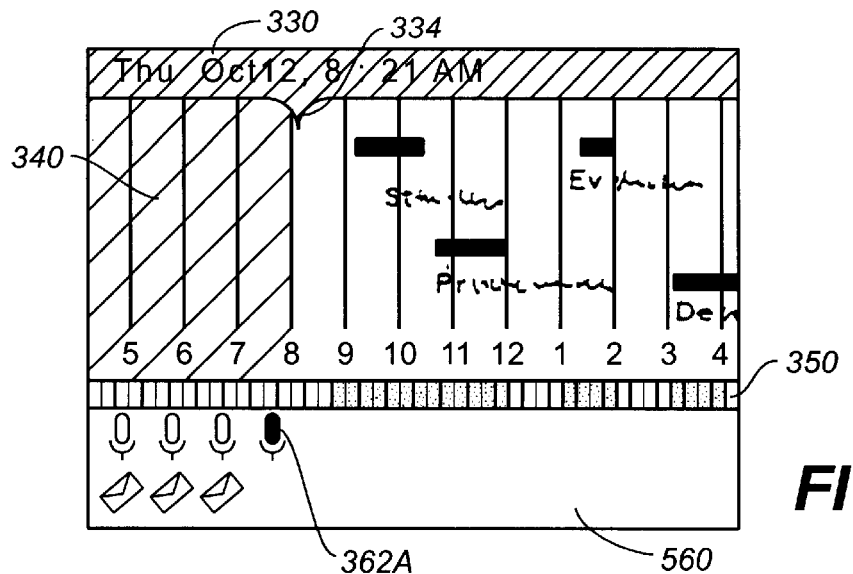
FIG._26A
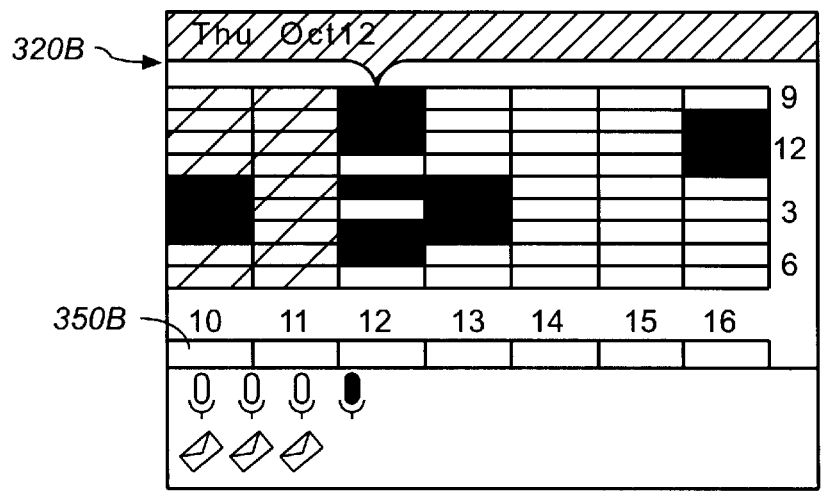
FIG._26B

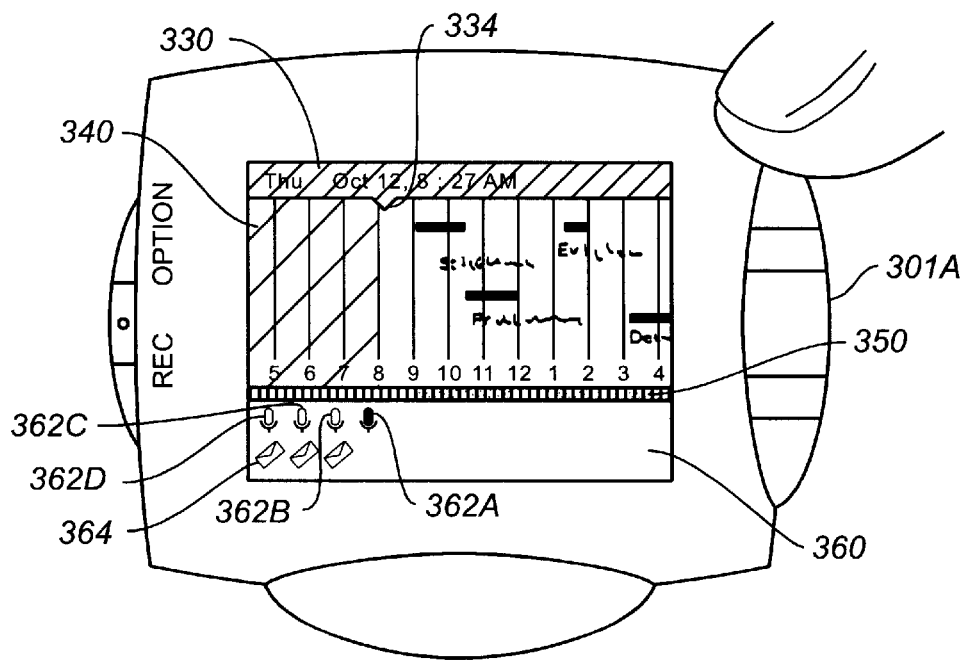
FIG._27A
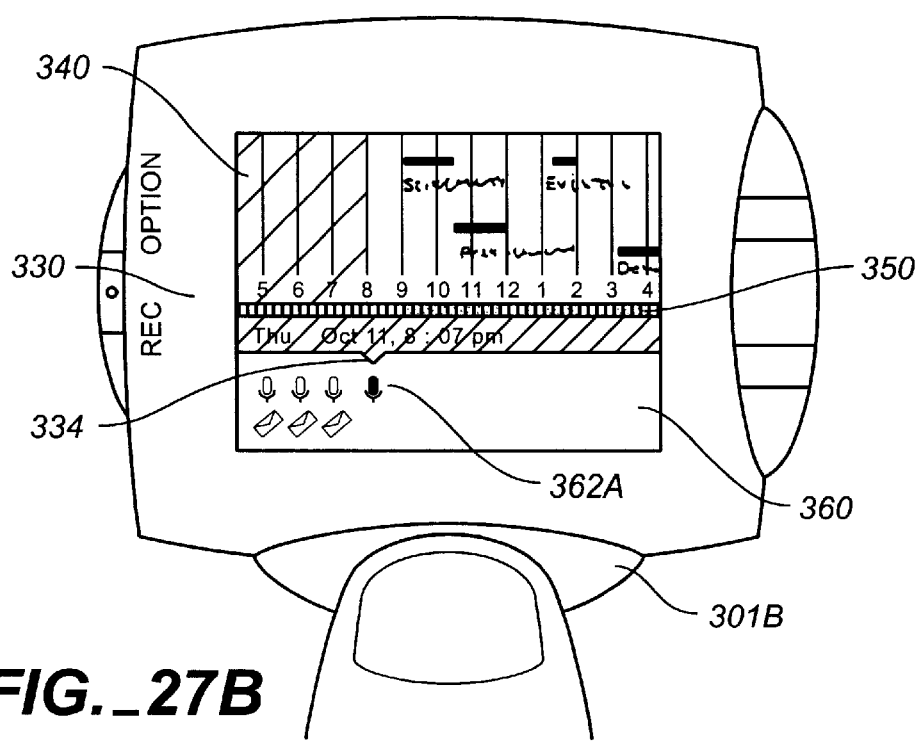
FIG._27B

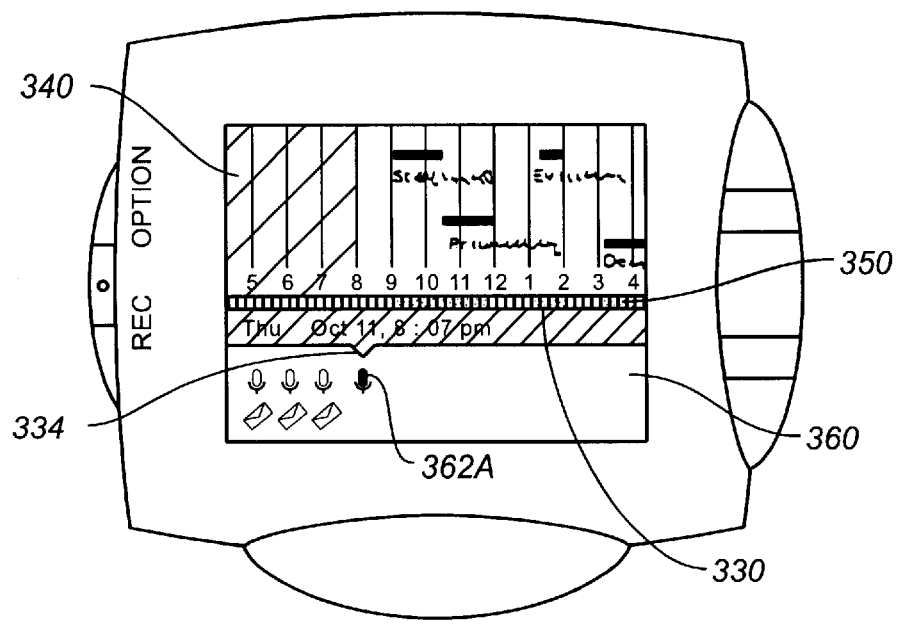
FIG._27C
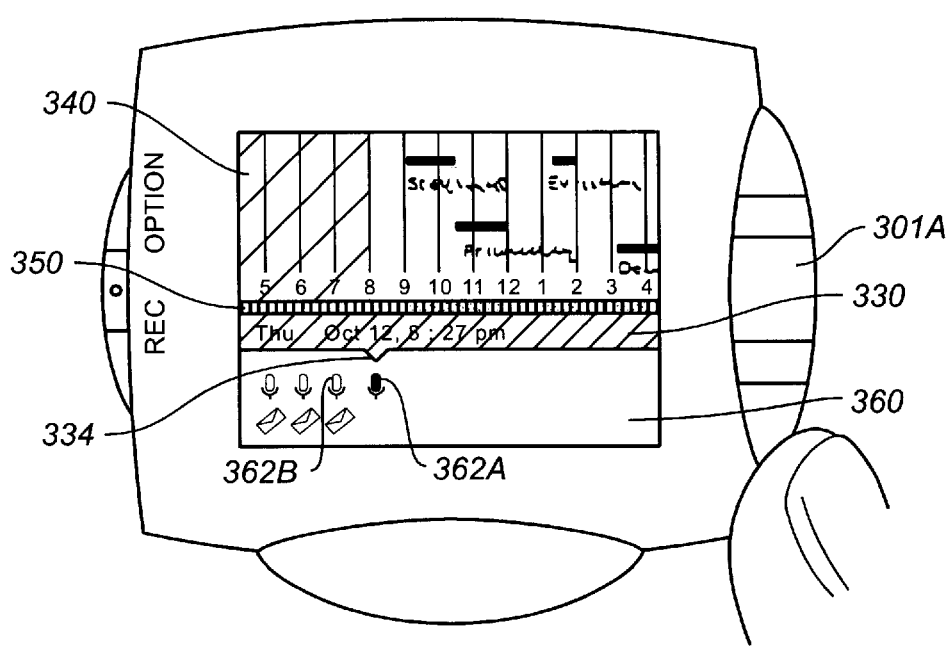
FIG._28A

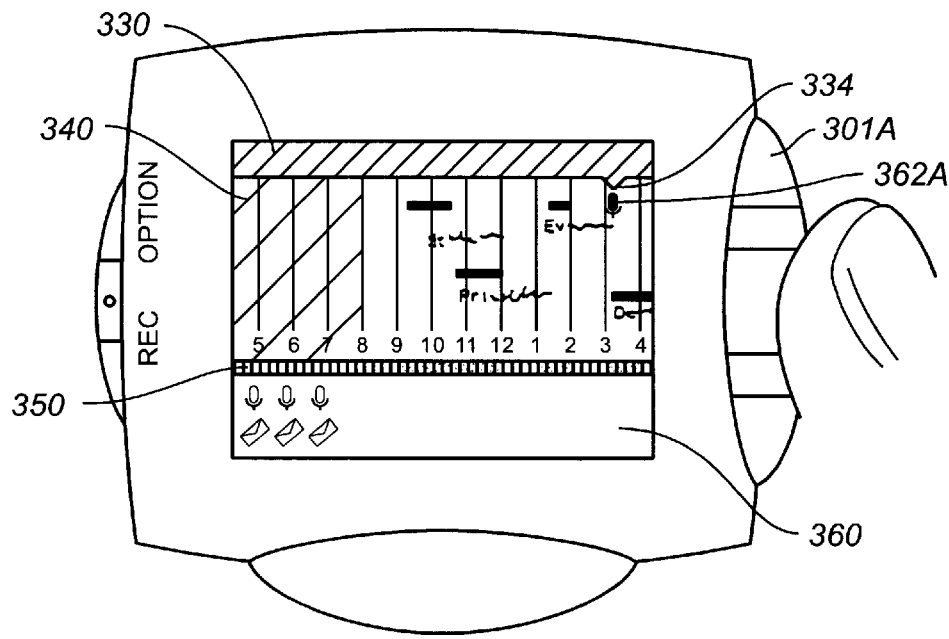
FIG._28B
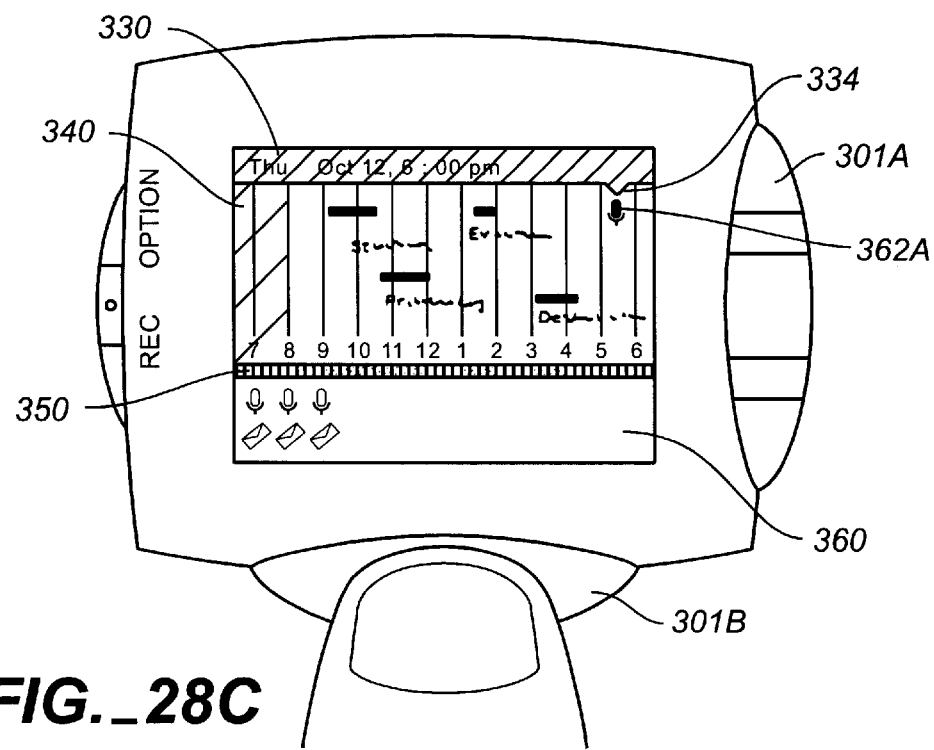
FIG._28C

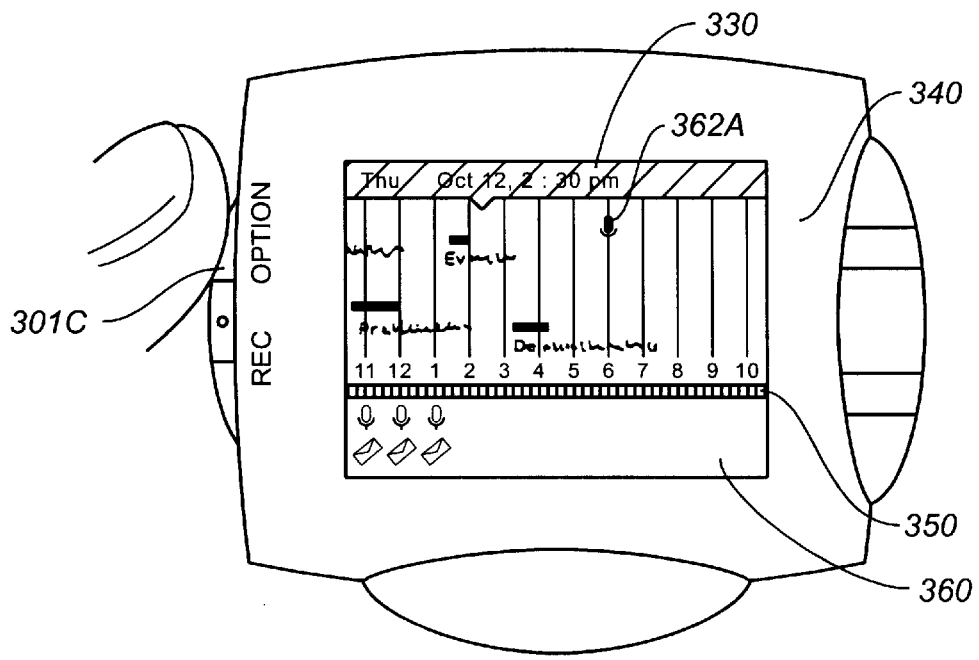
FIG._29A
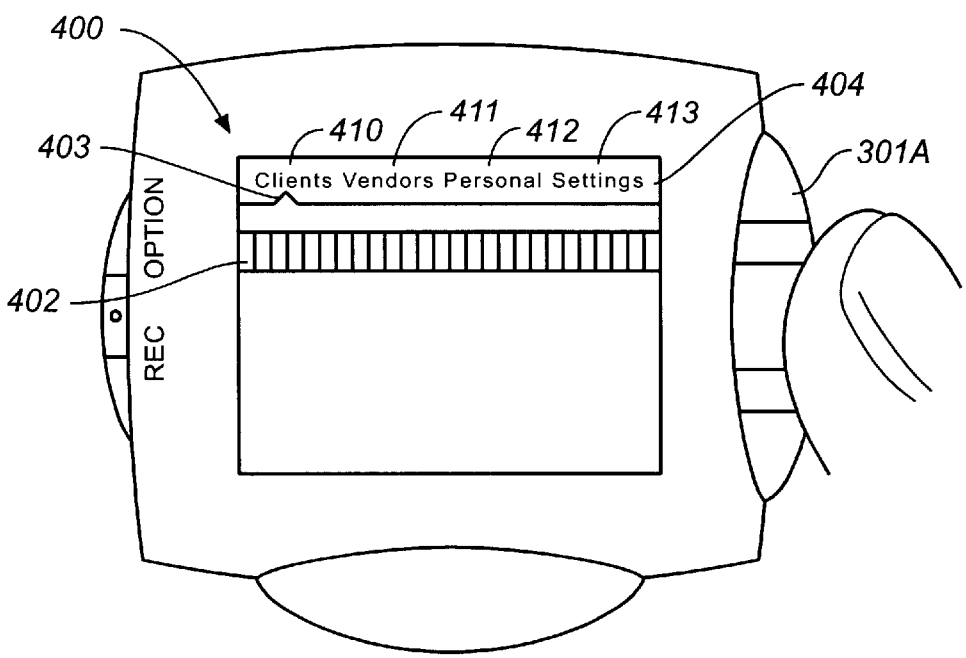
FIG._29B

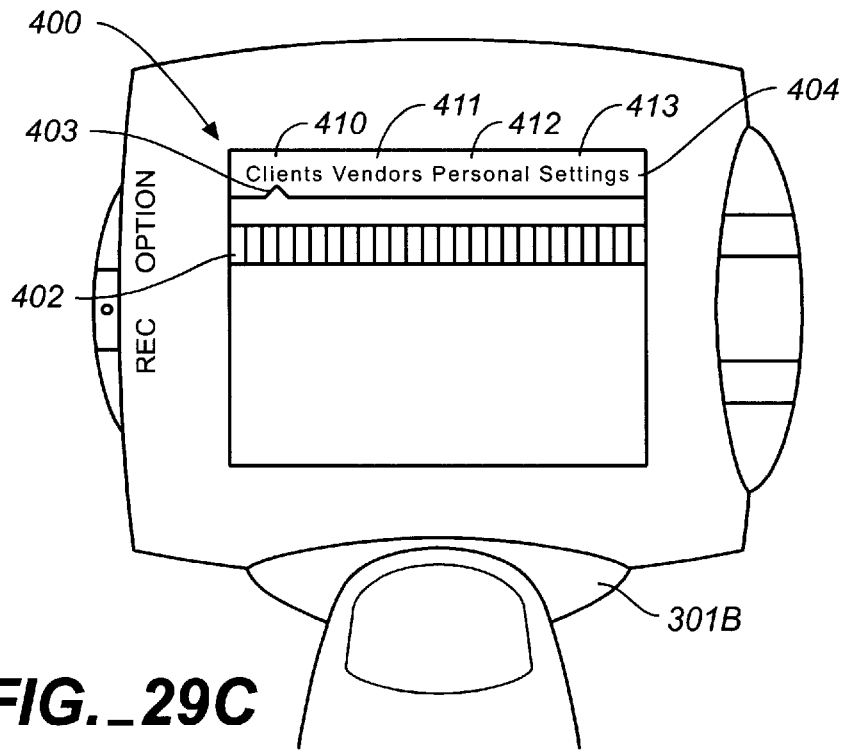
FIG._29C
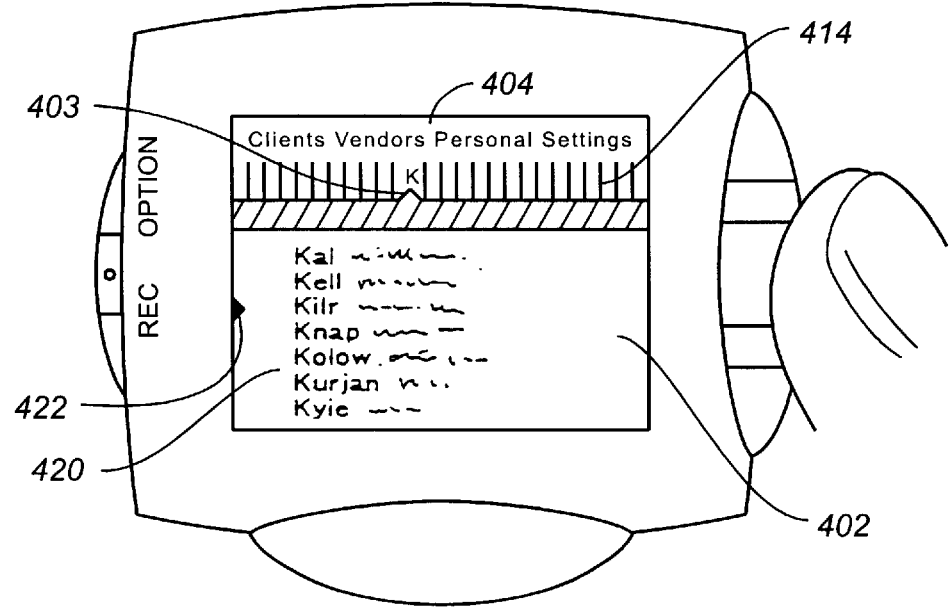
FIG._30A

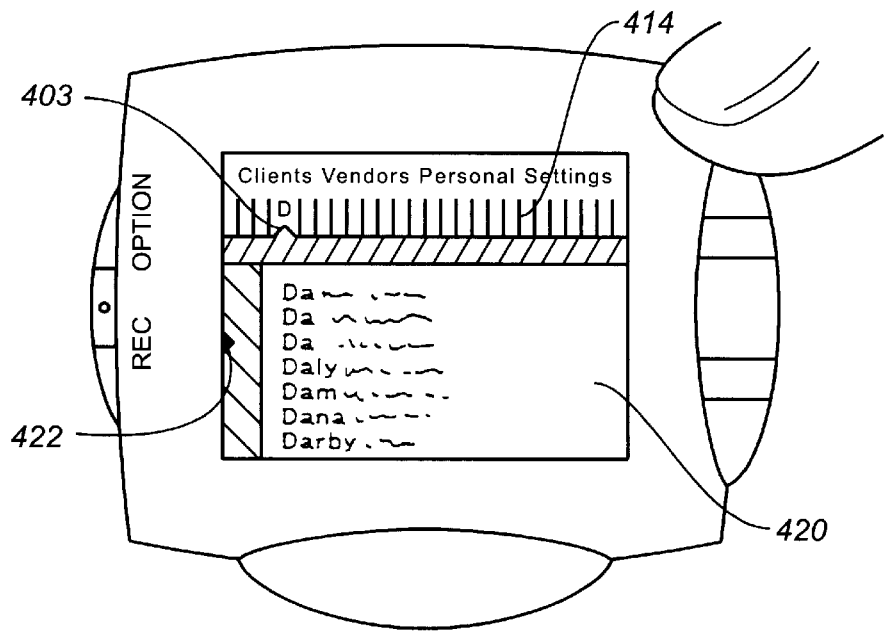
FIG._30B
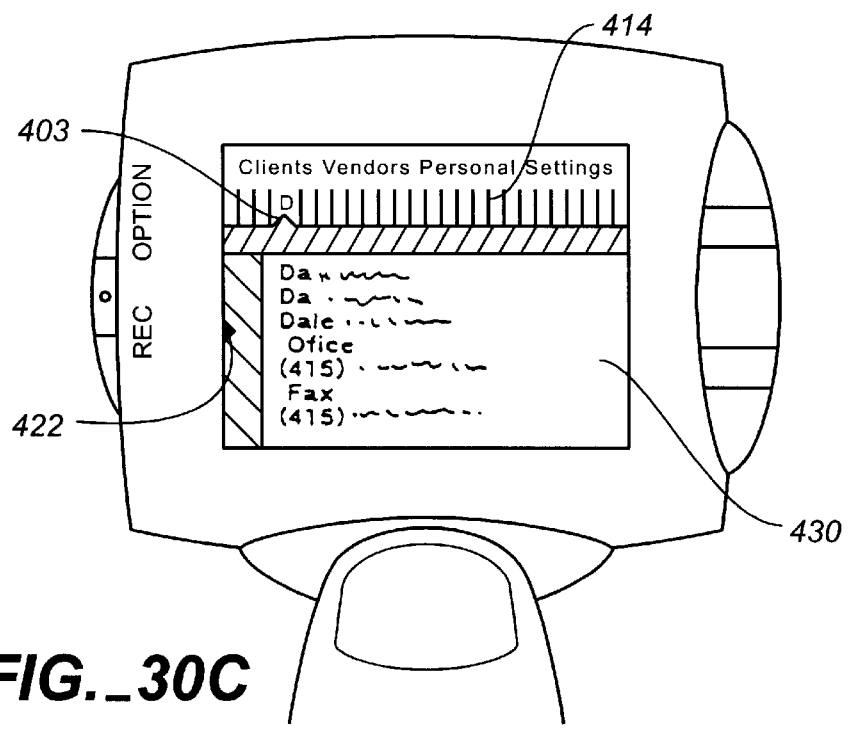
FIG._30C

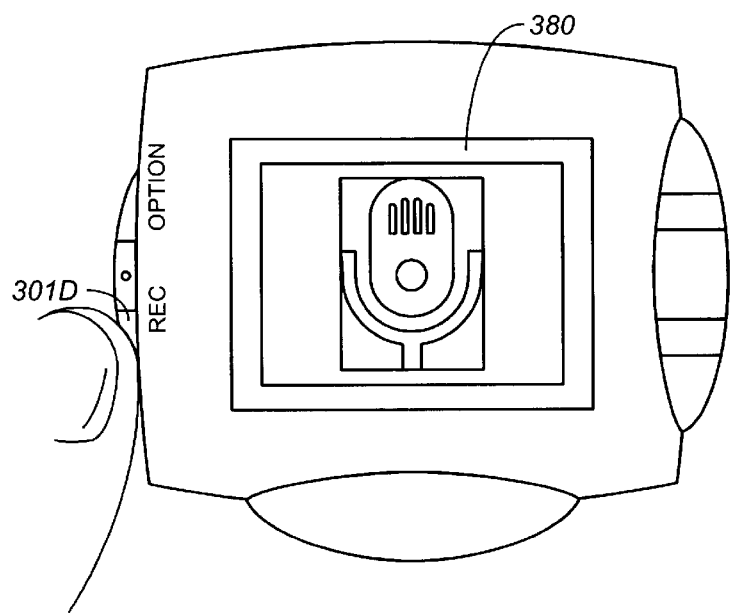
FIG._31
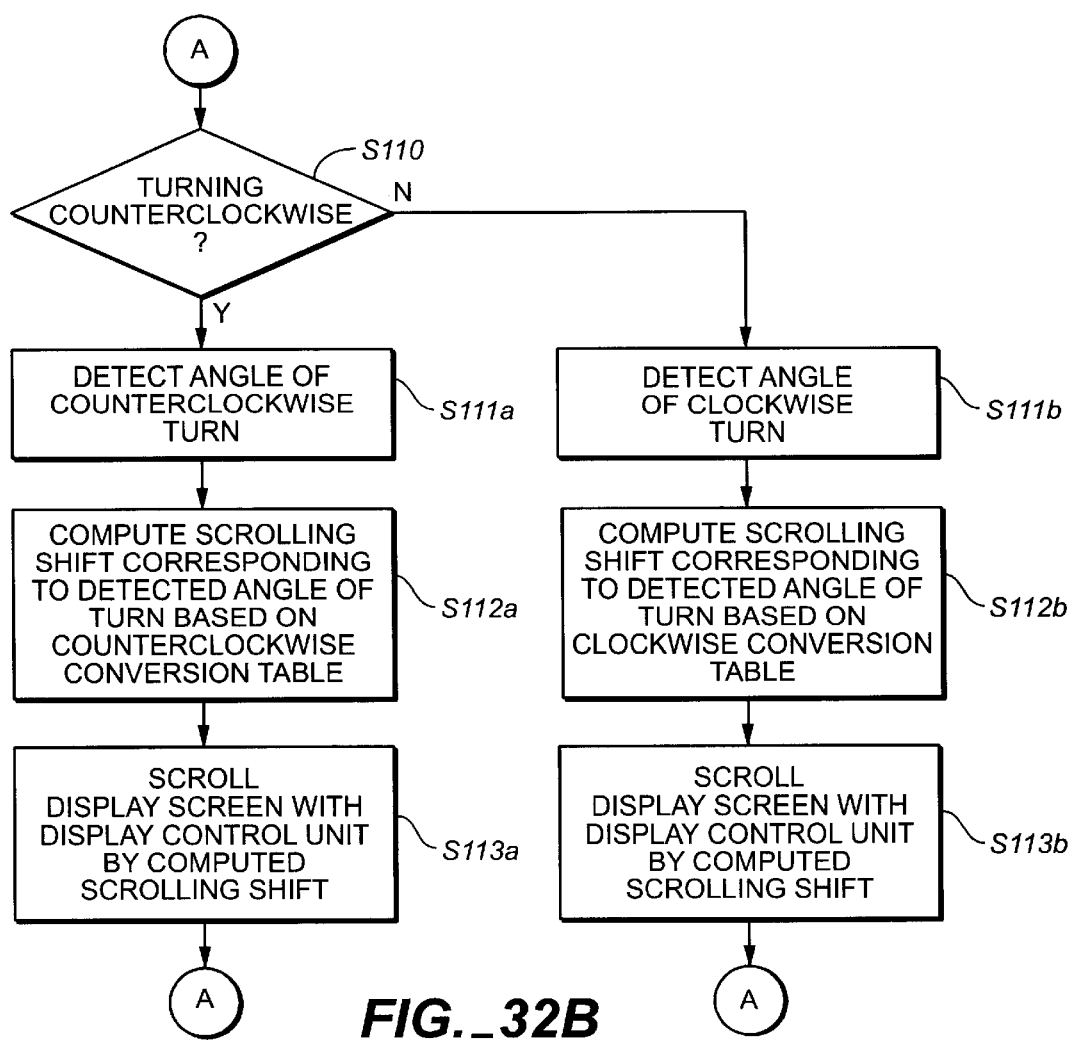
FIG._32B

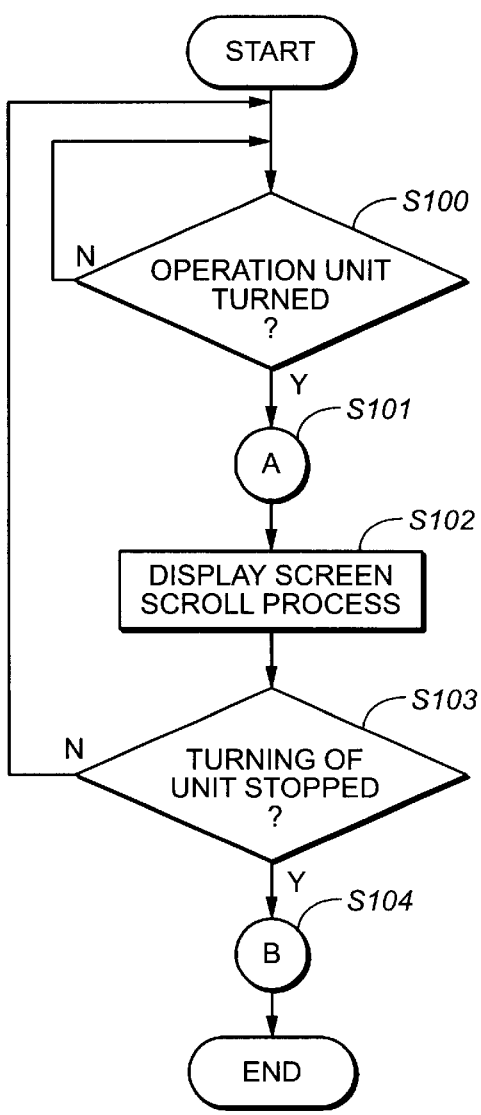
FIG._32A
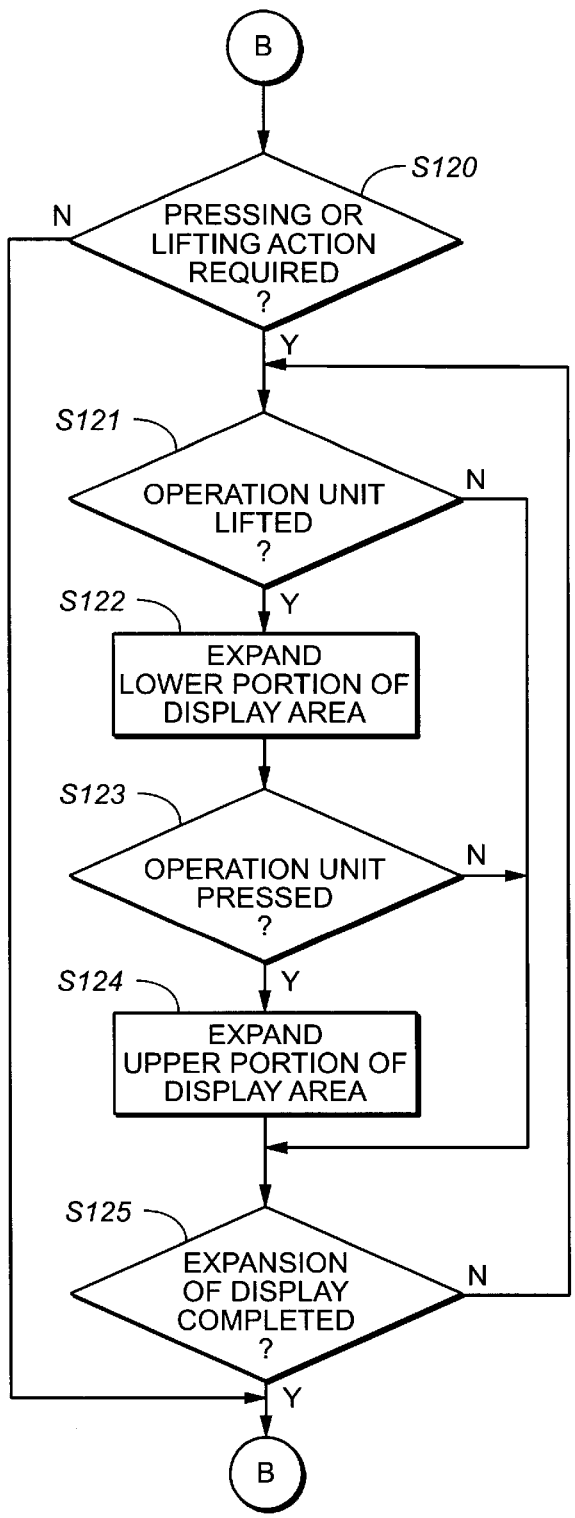
FIG._32C

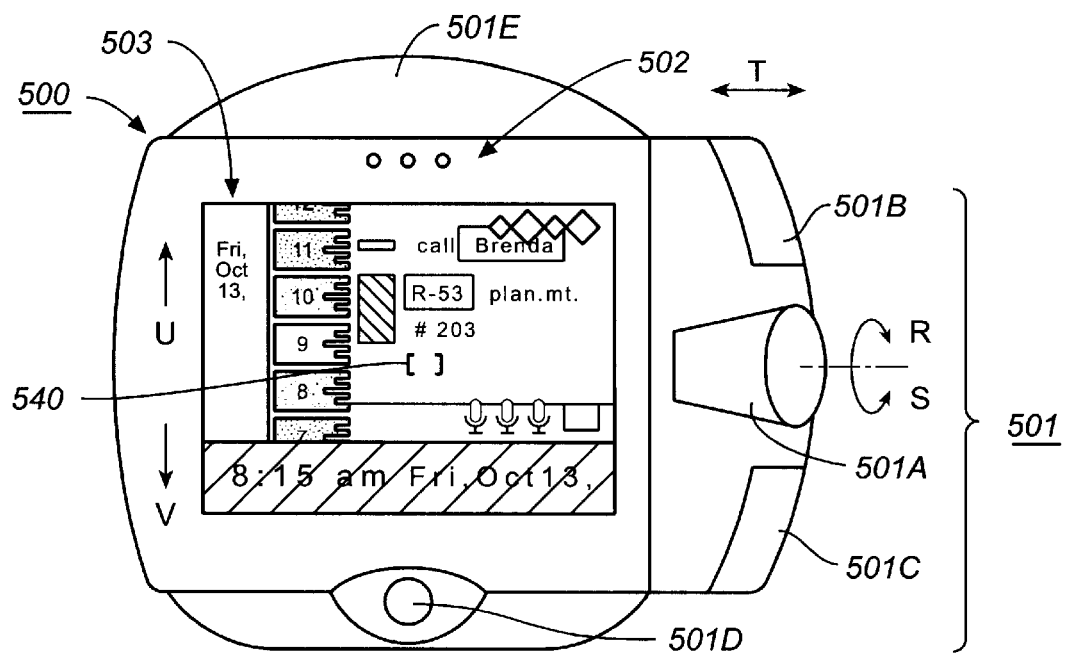
FIG._33A
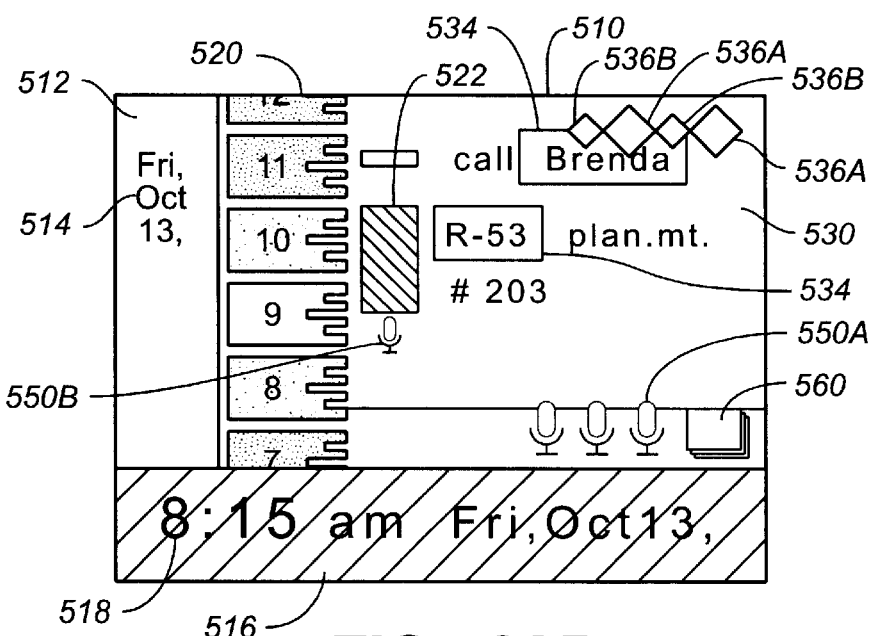
FIG._33B

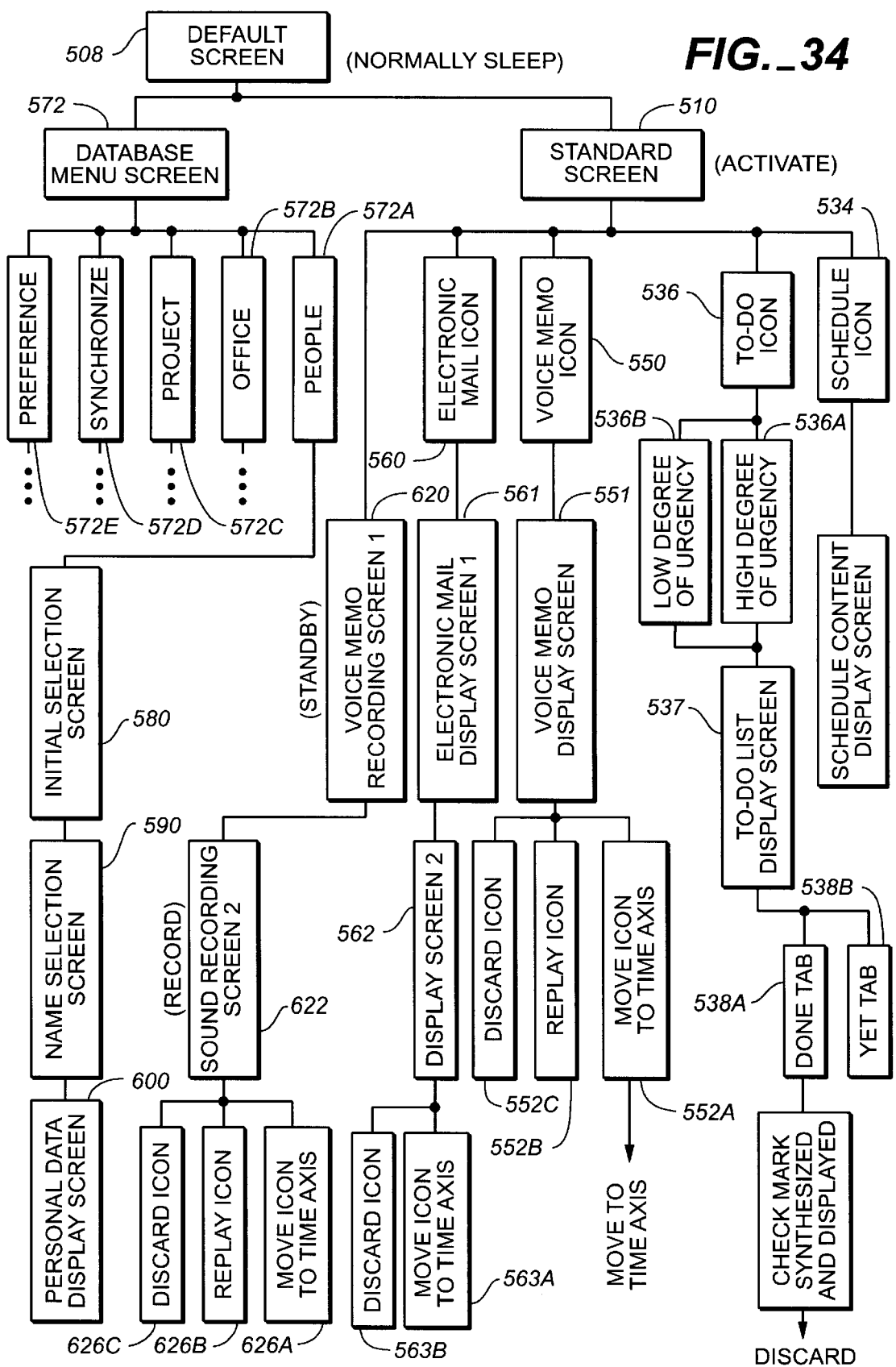
FIG._34

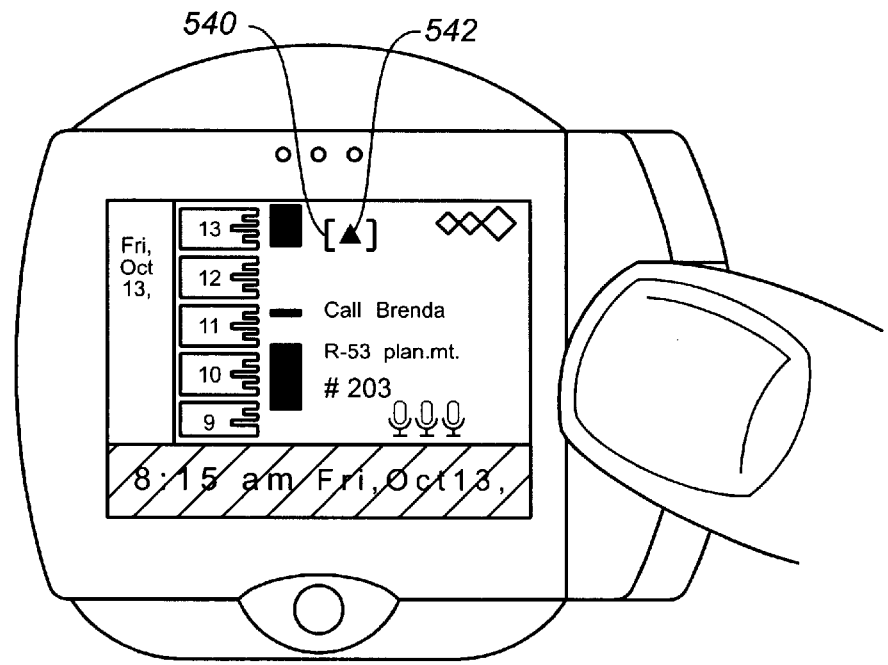
FIG._35
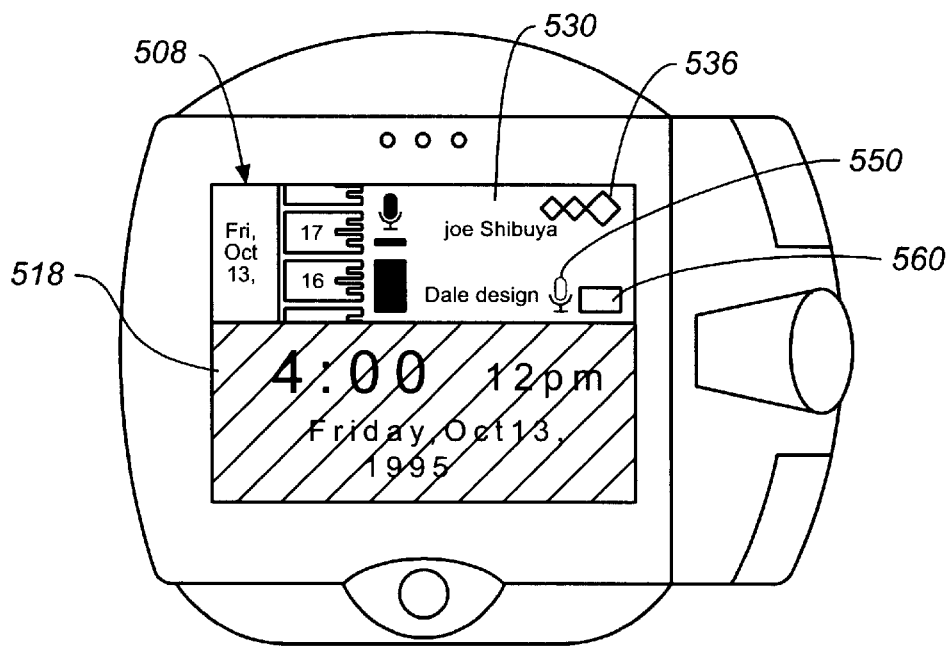
FIG._38

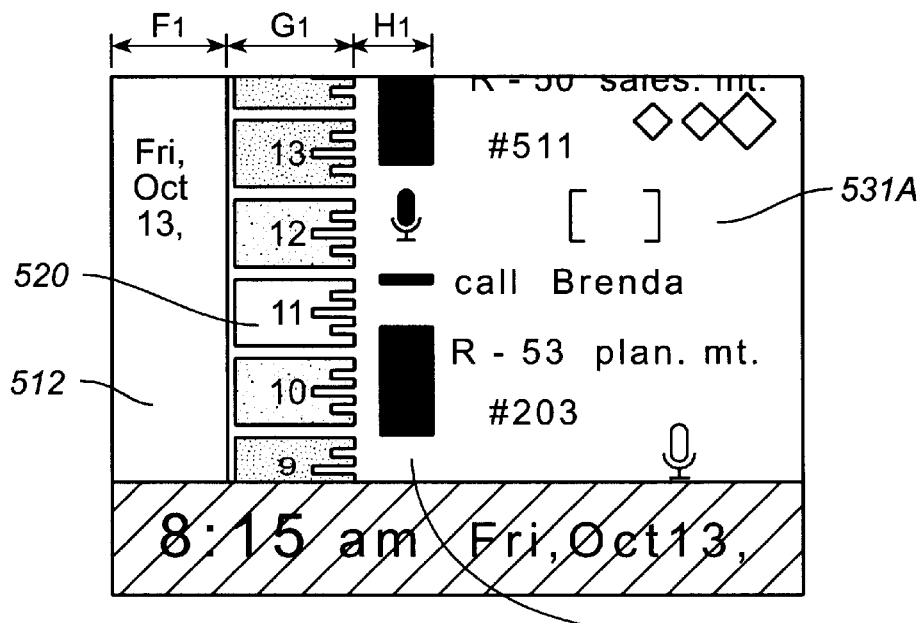
FIG._36A
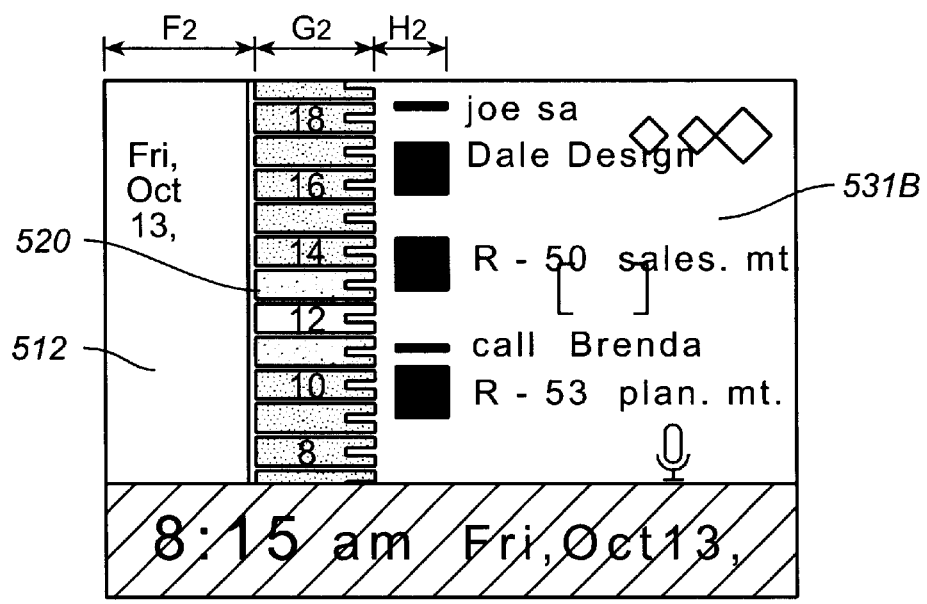
FIG._36B

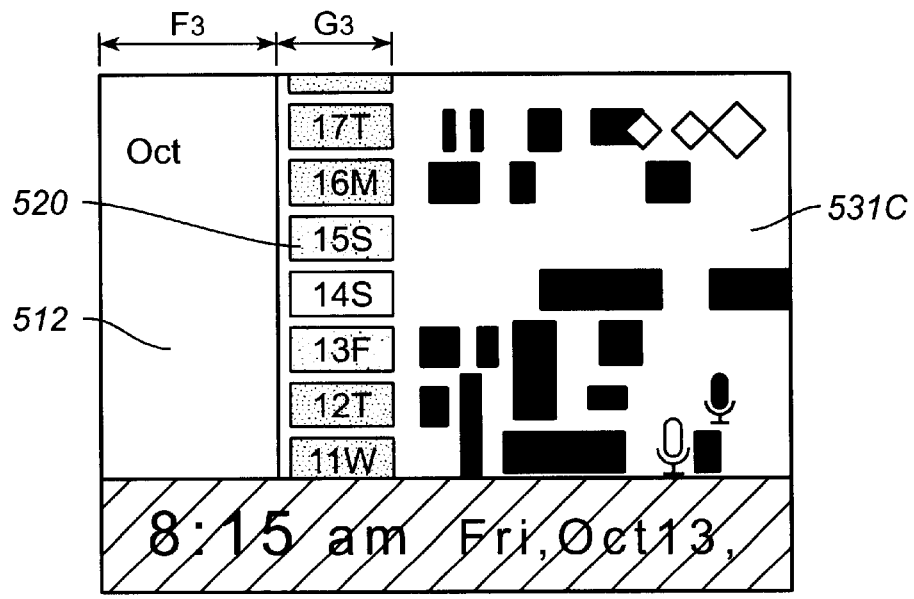
FIG._36C
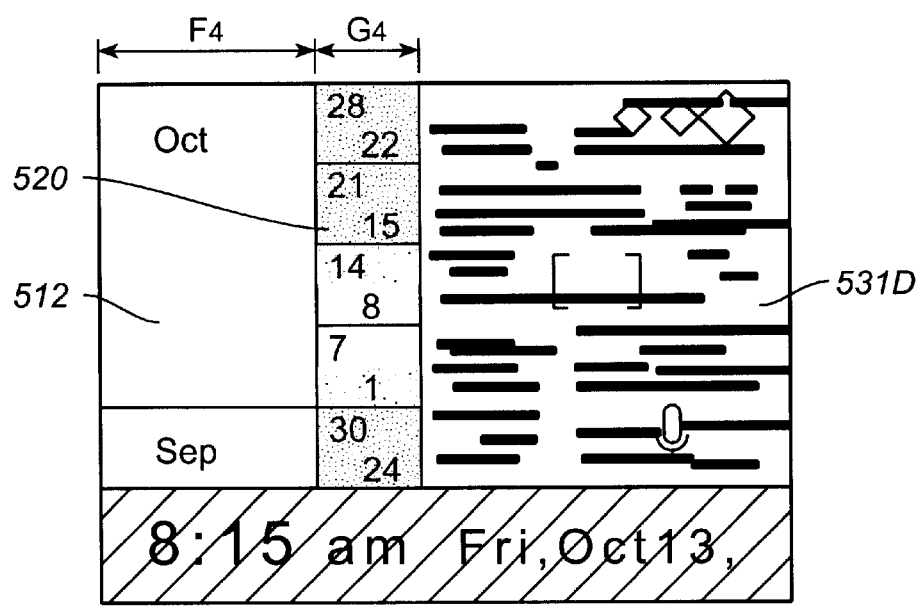
FIG._36D

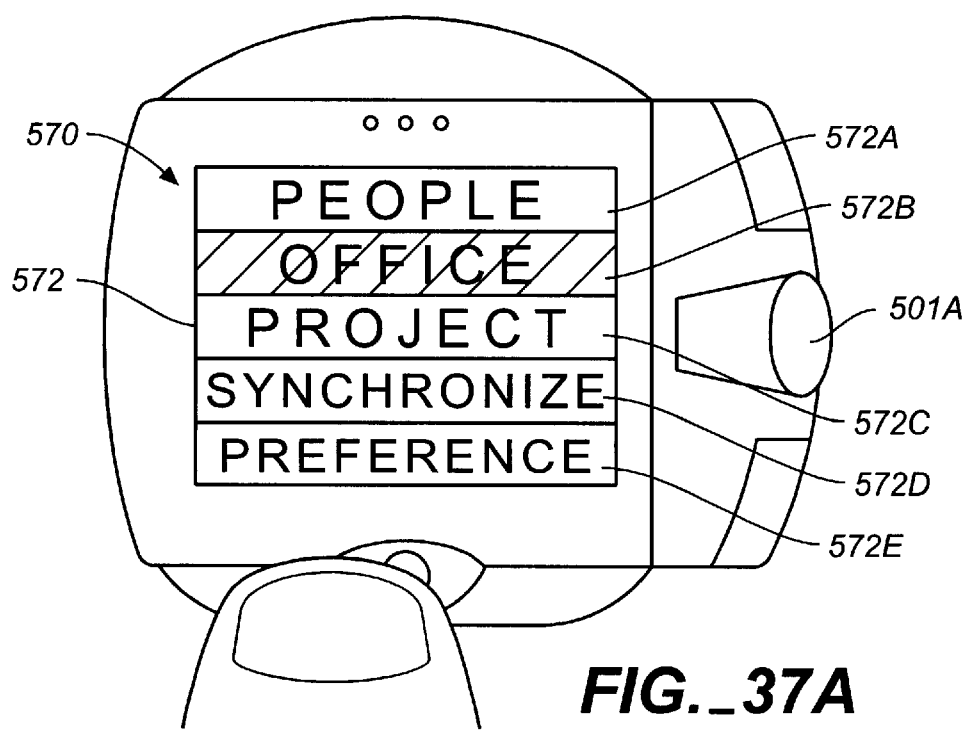
FIG._37A
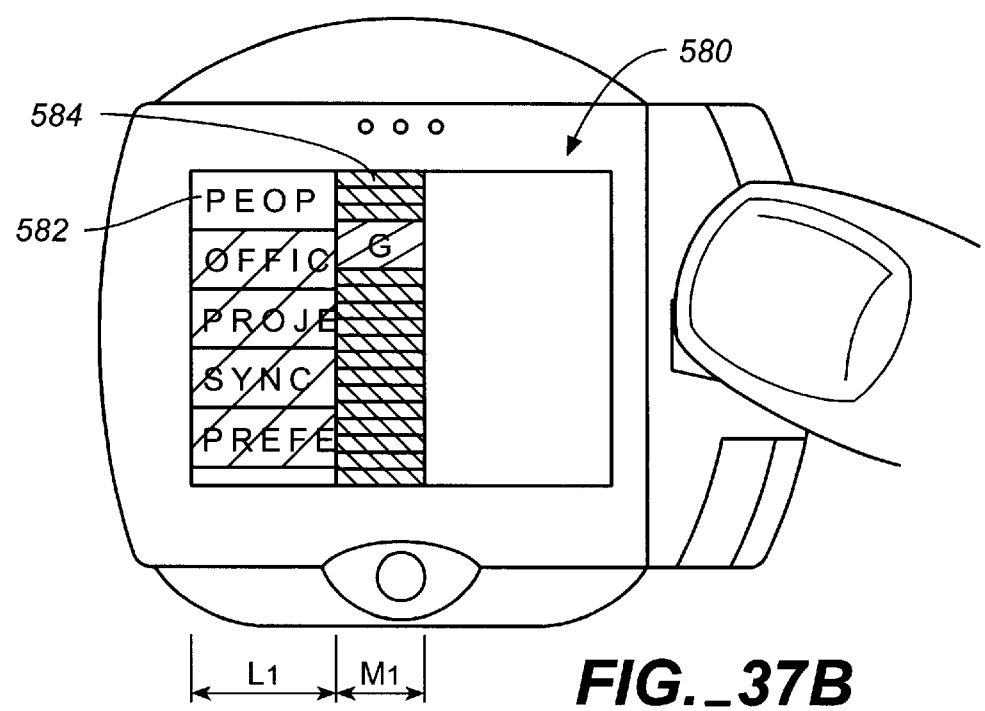
FIG._37B

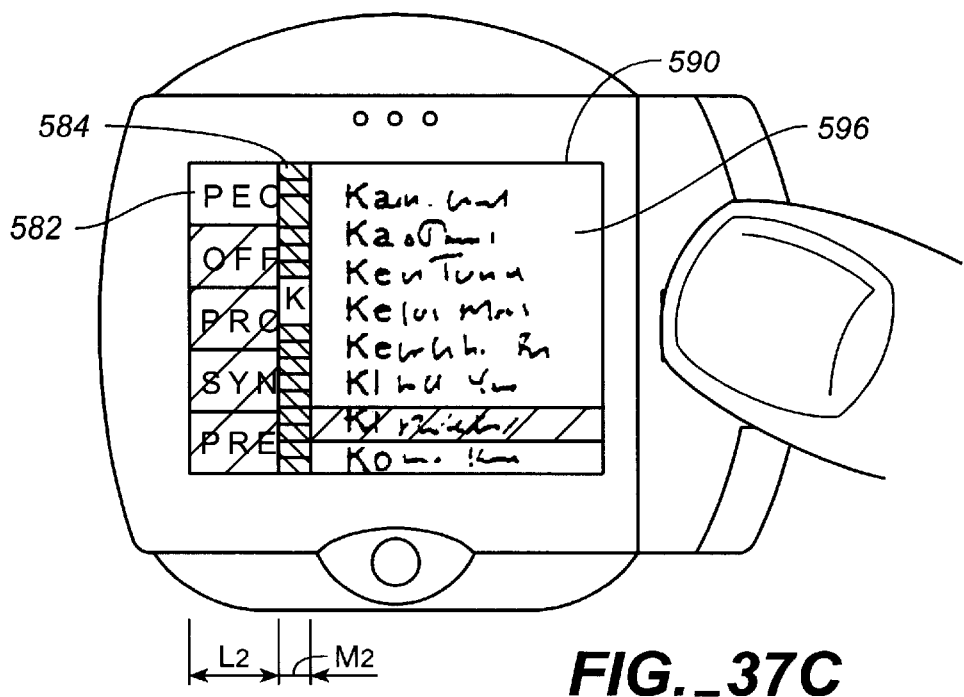
FIG._37C
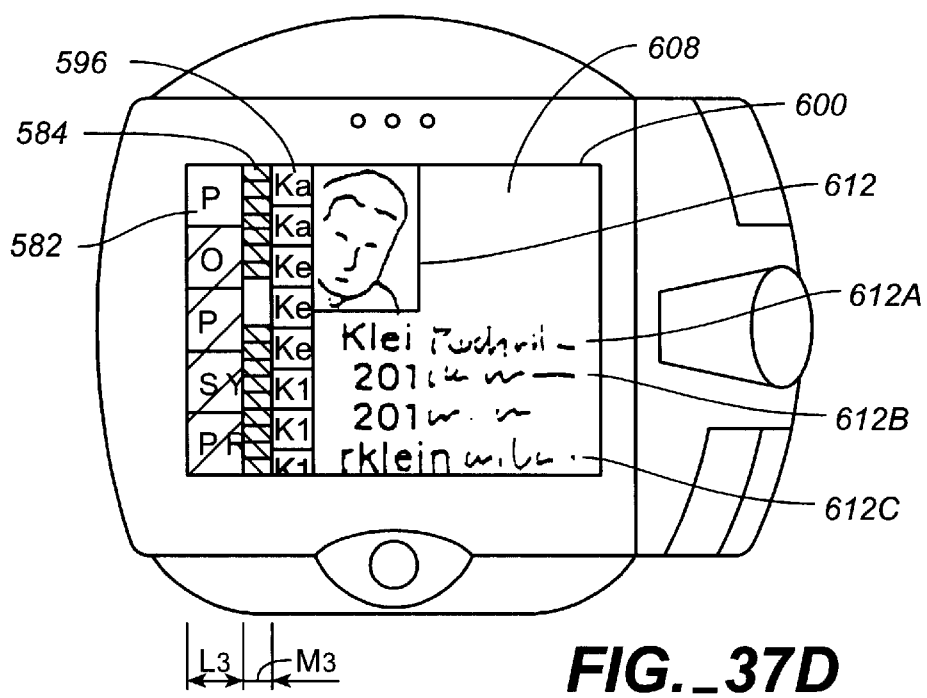
FIG._37D

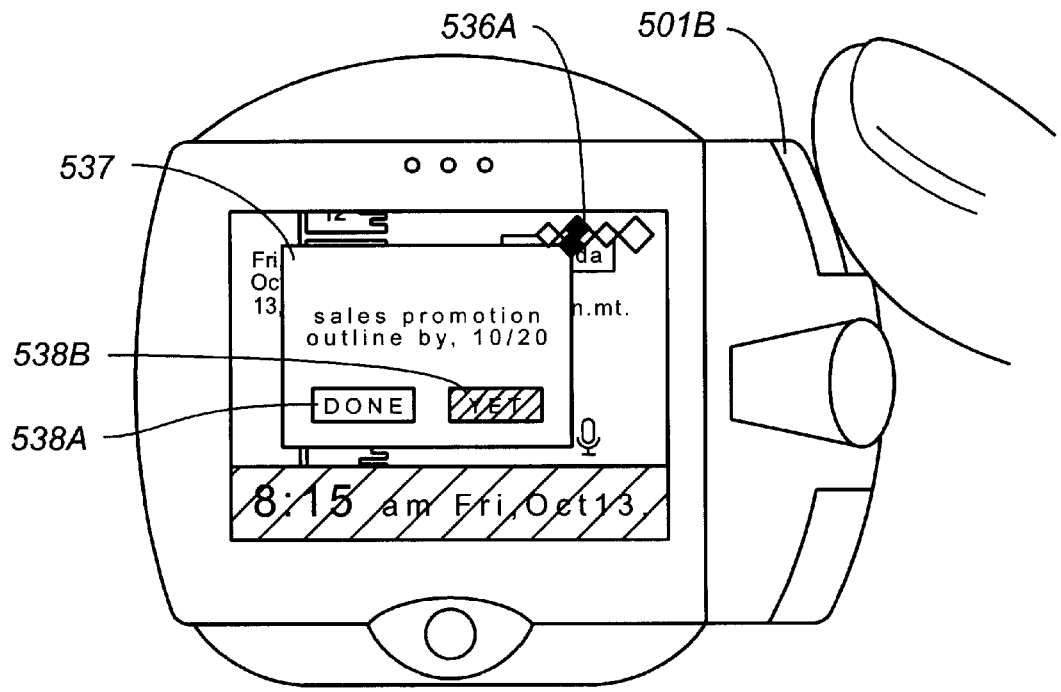
FIG._39A
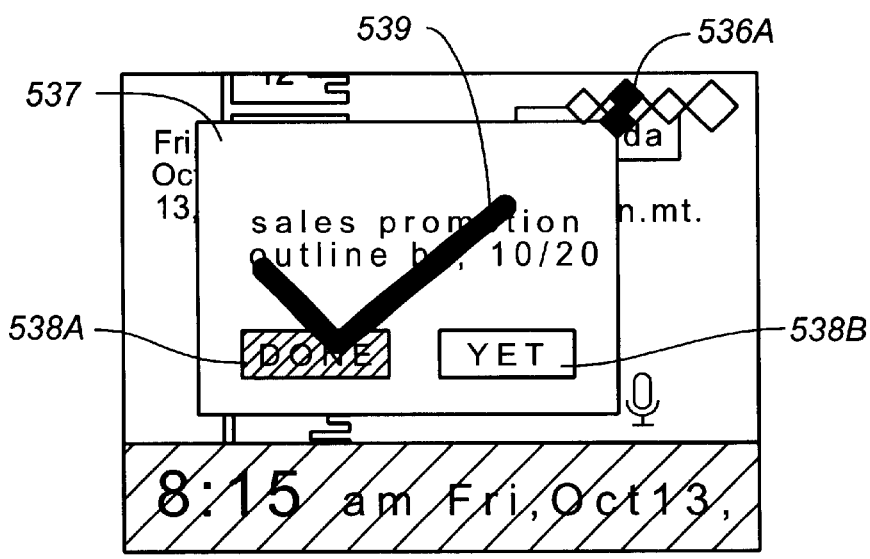
FIG._39B

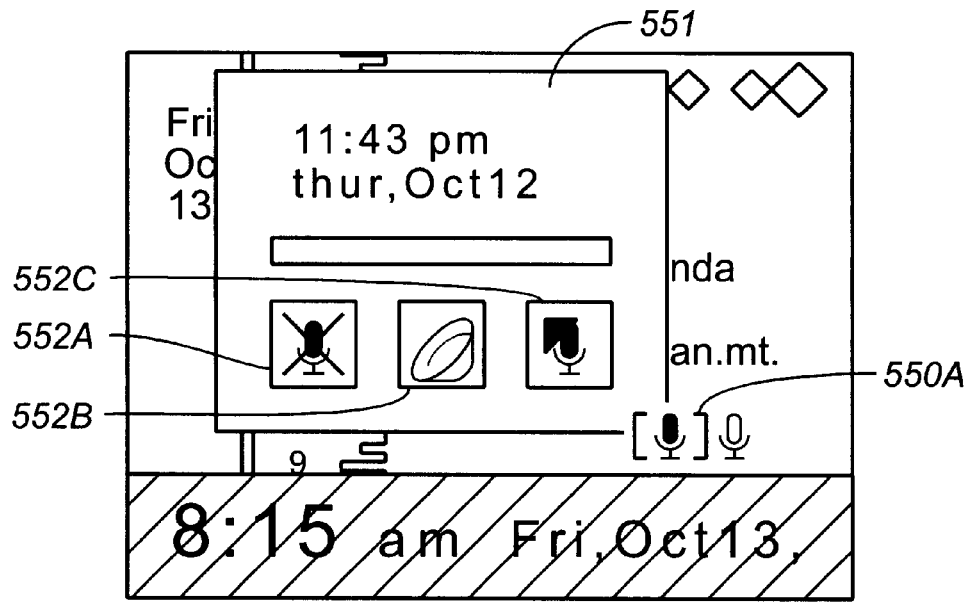
FIG._40A
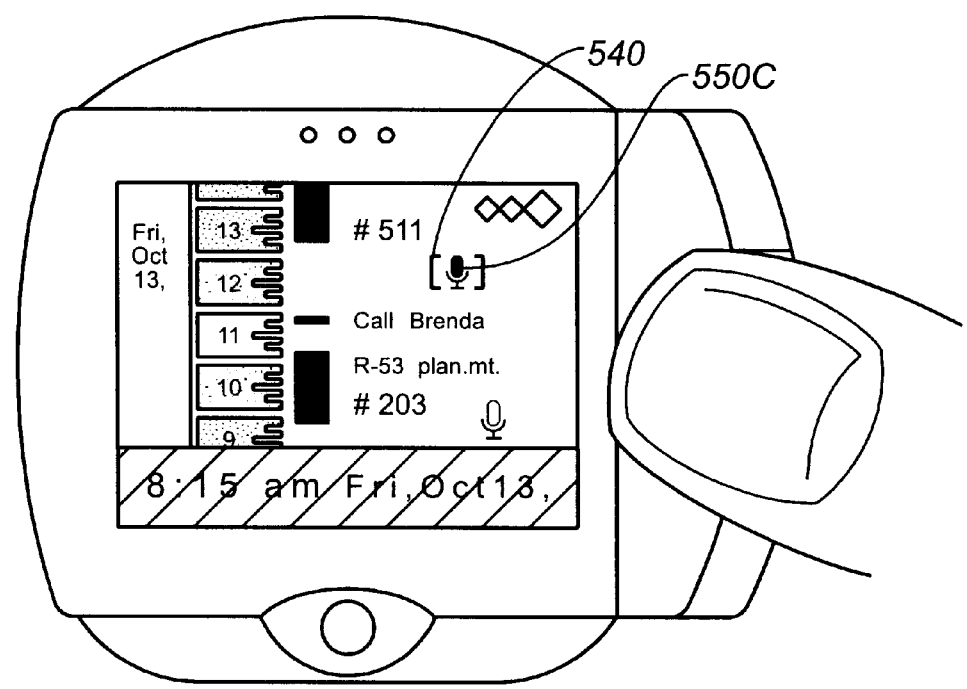
FIG._40B

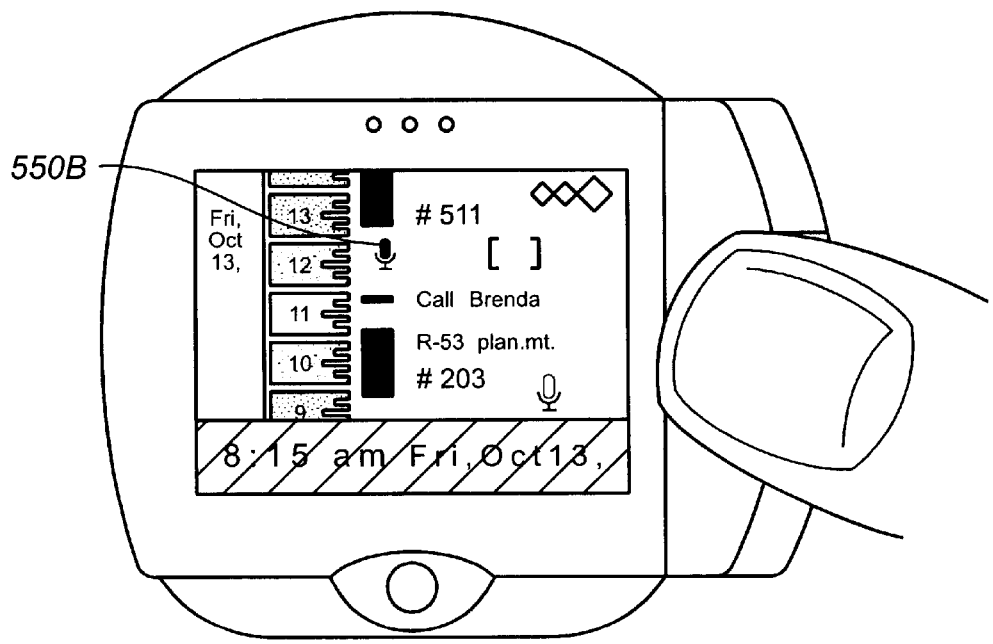
FIG._40C
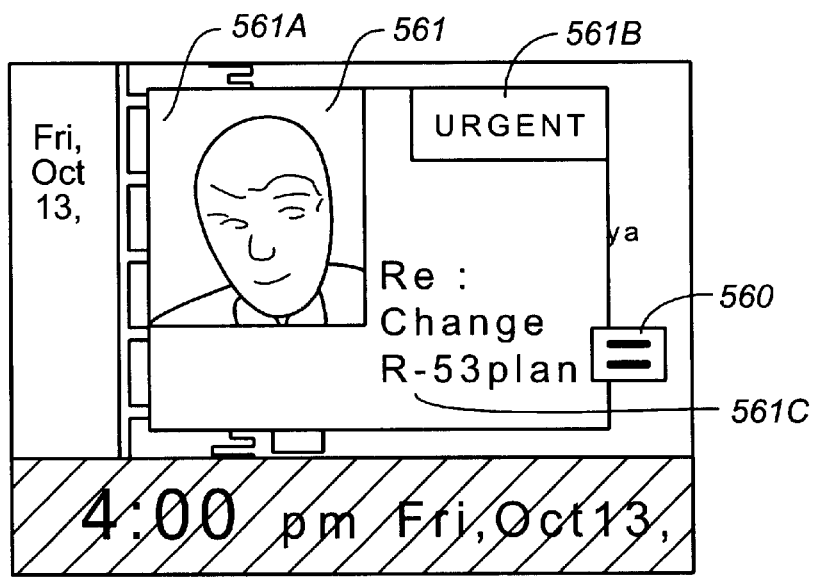
FIG._41A

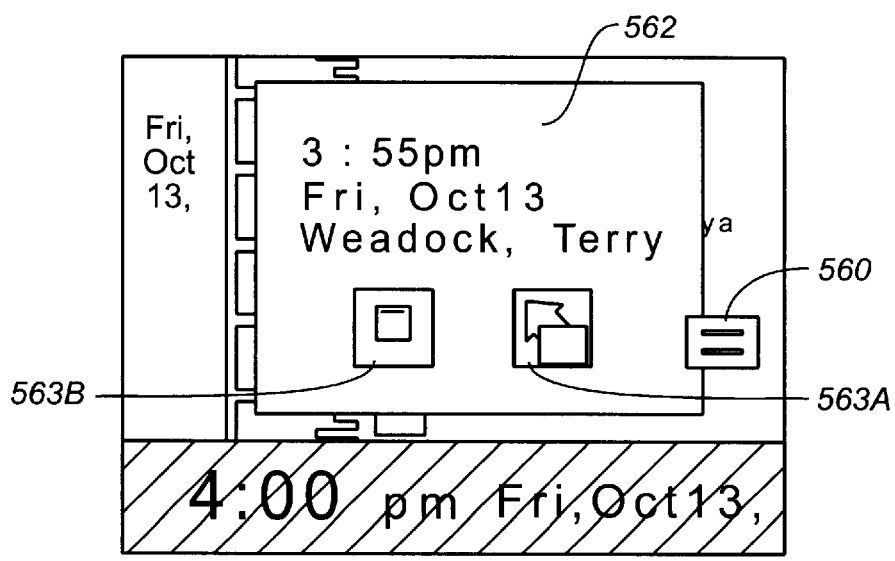
FIG._41B
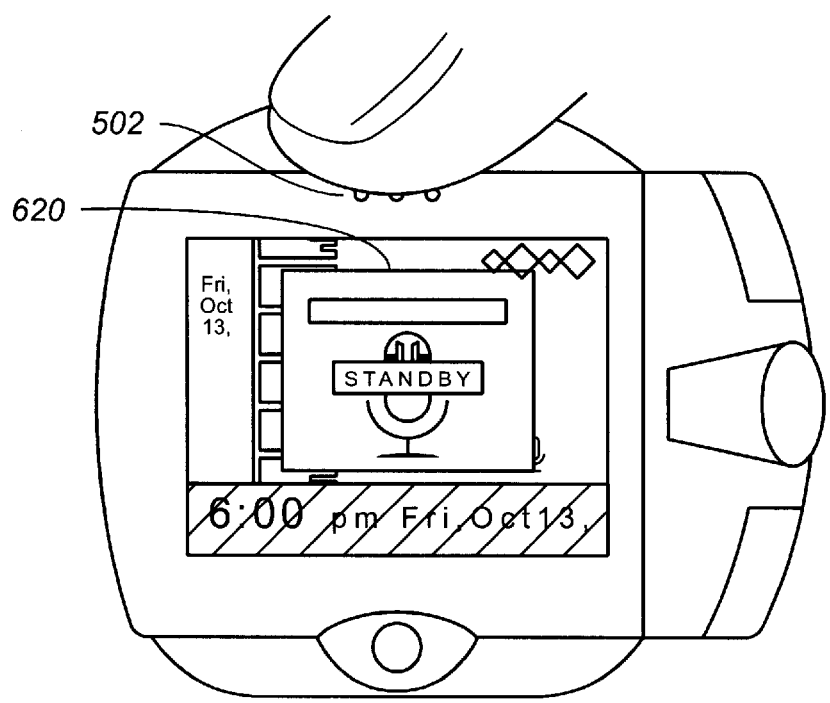
FIG._42A

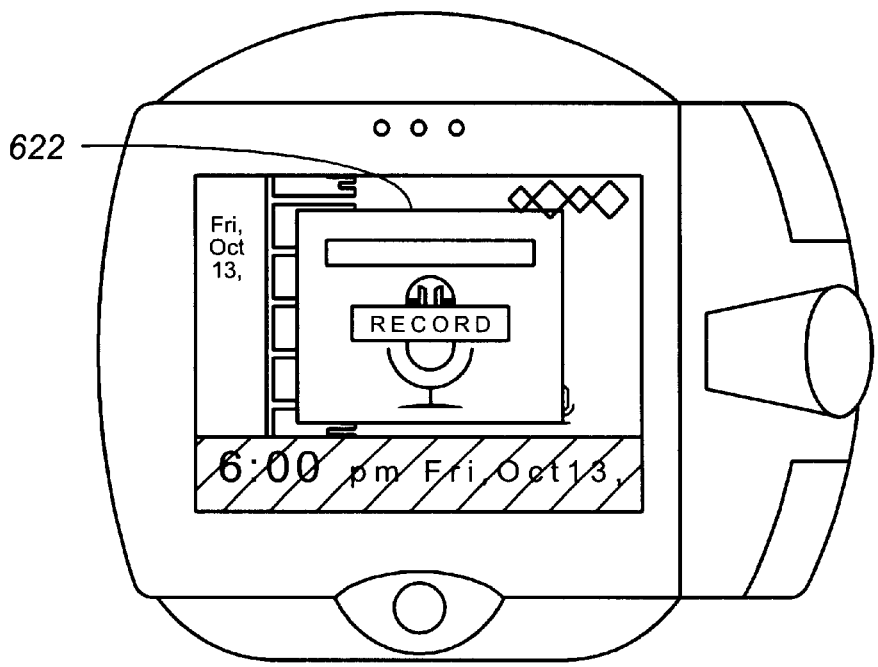
FIG._42B
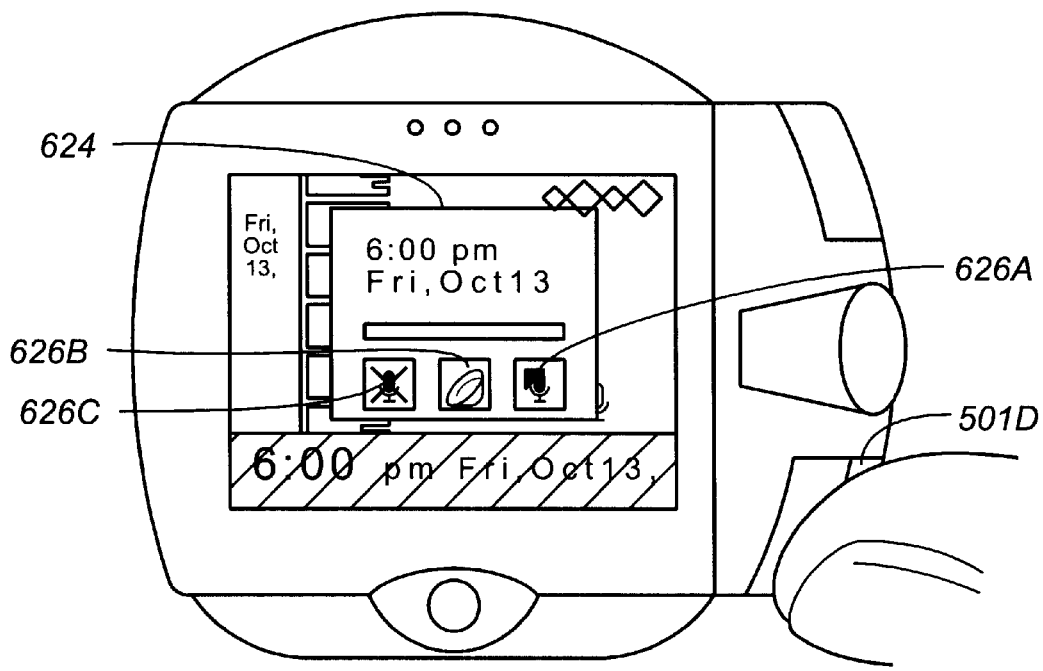
FIG._42C

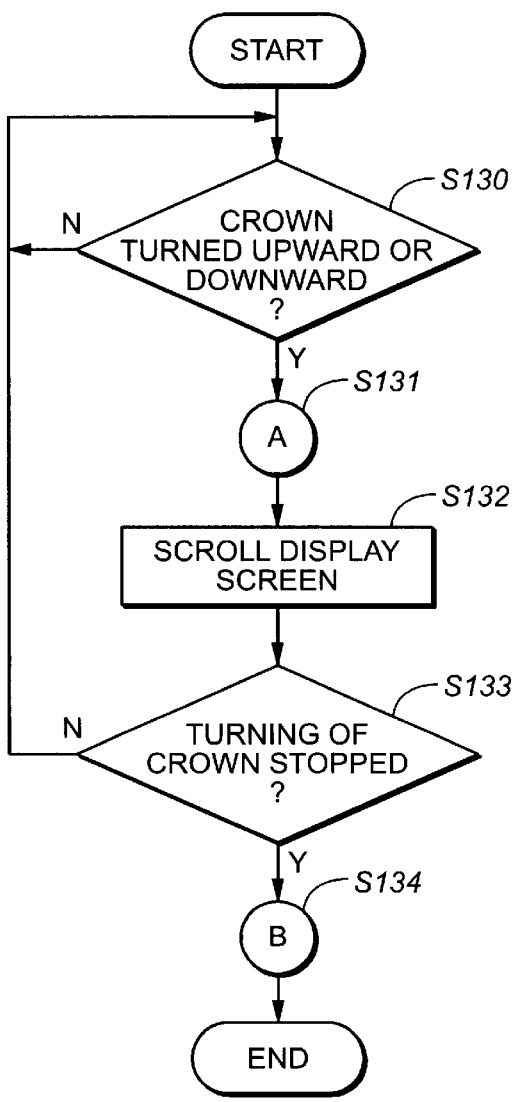
FIG._43A
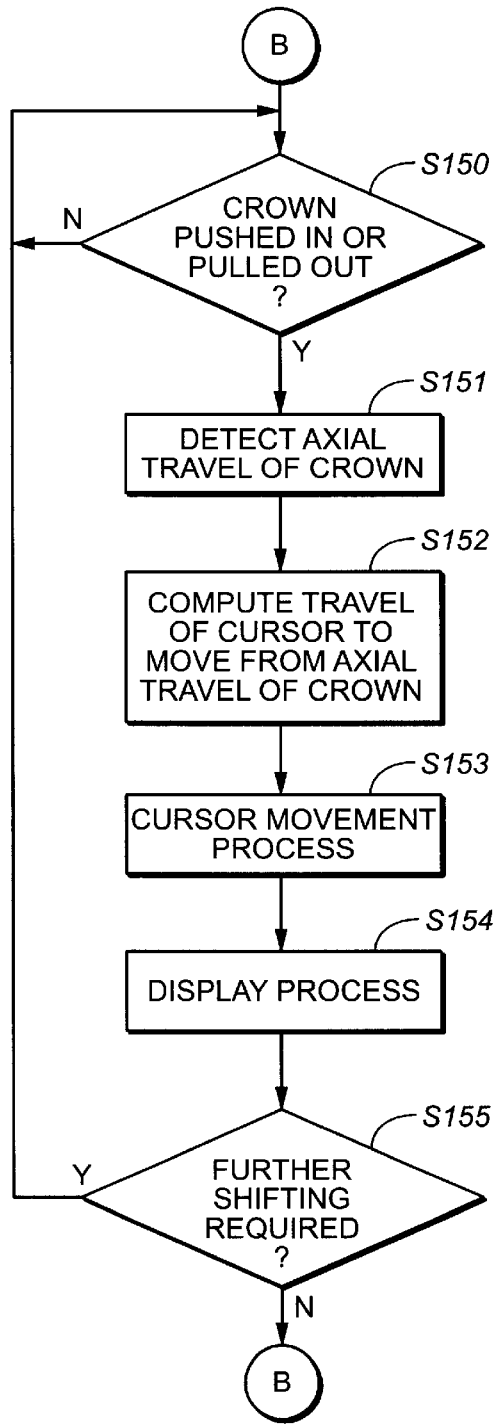
FIG._43C

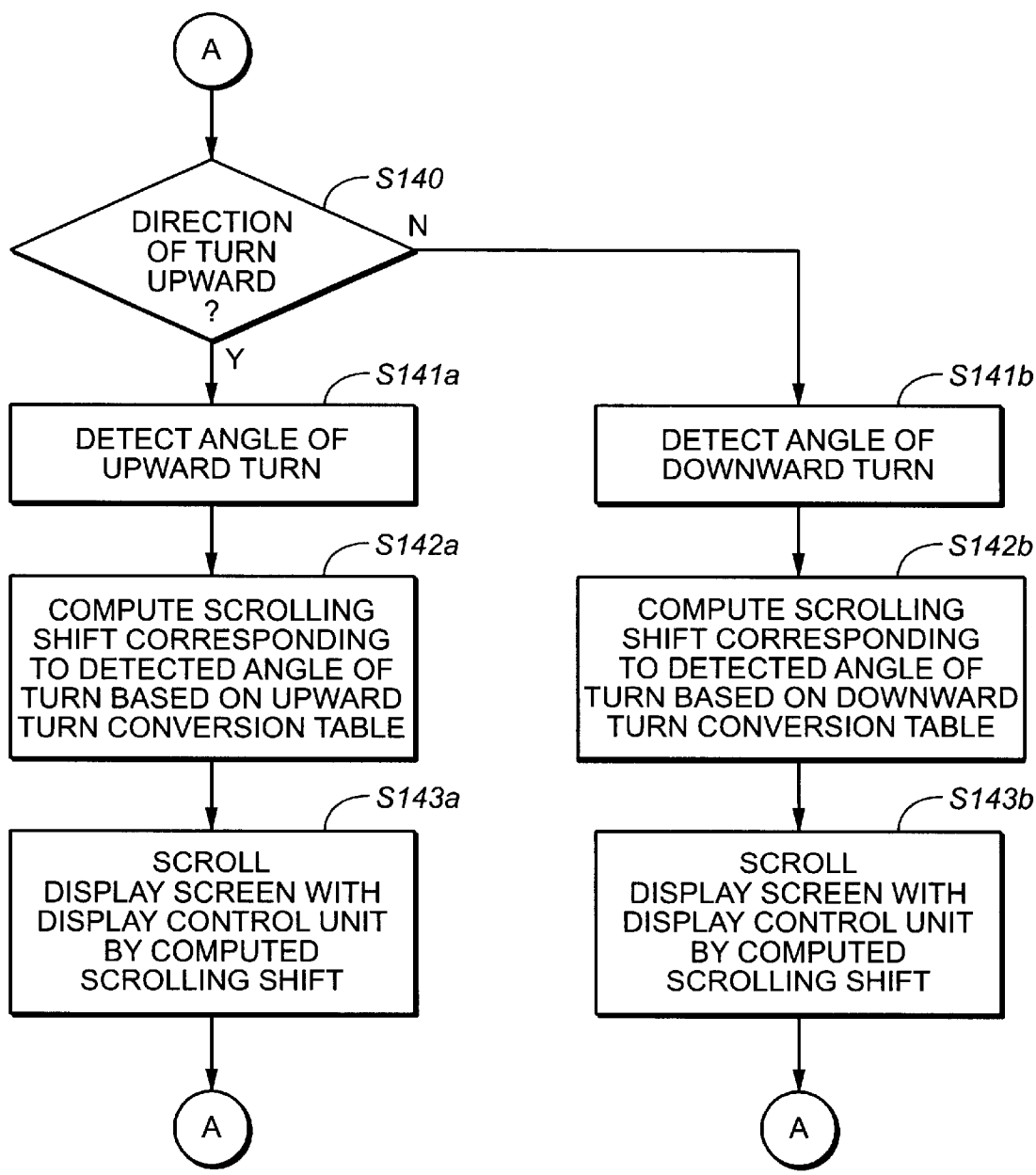
FIG._43B

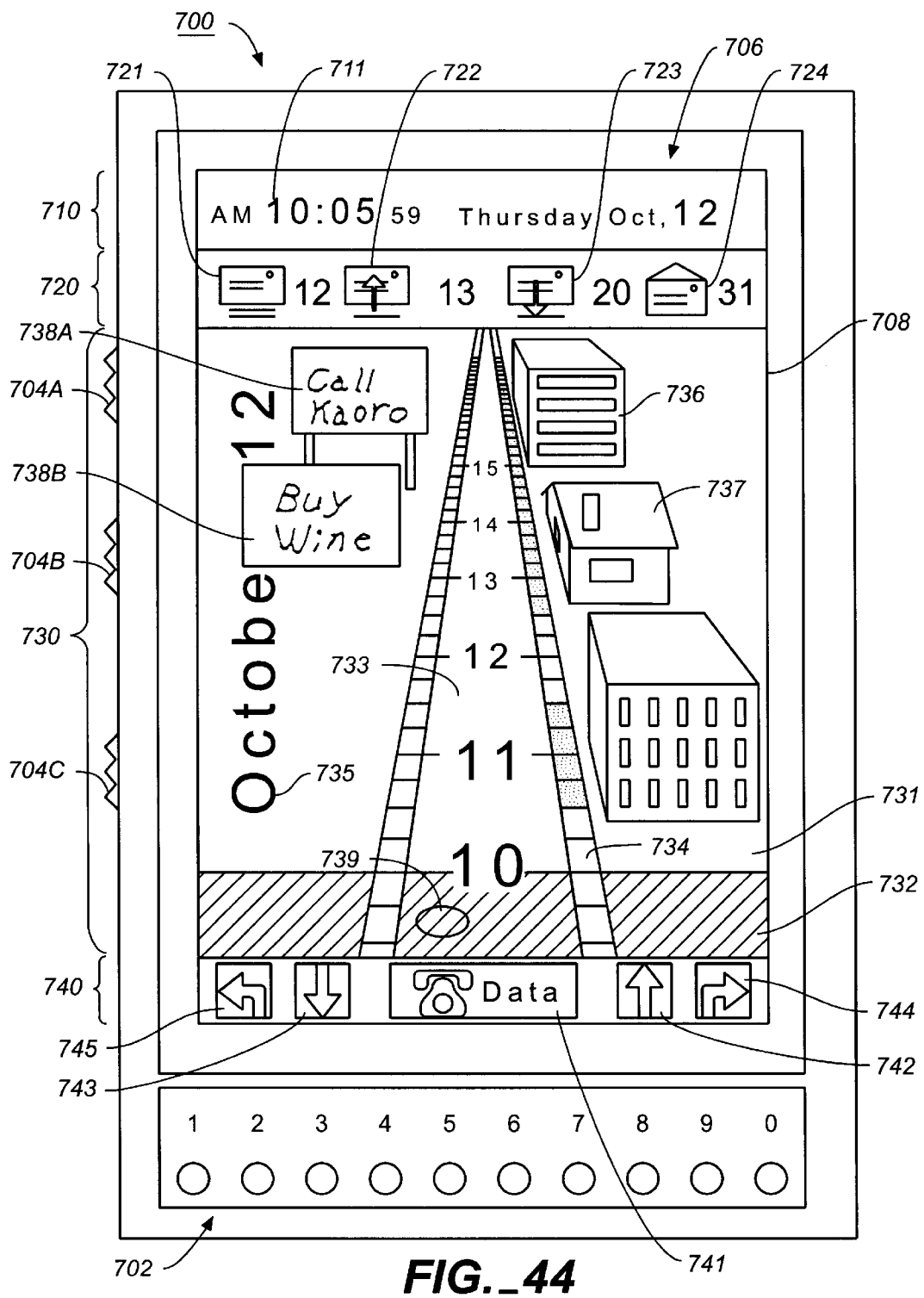
FIG._44

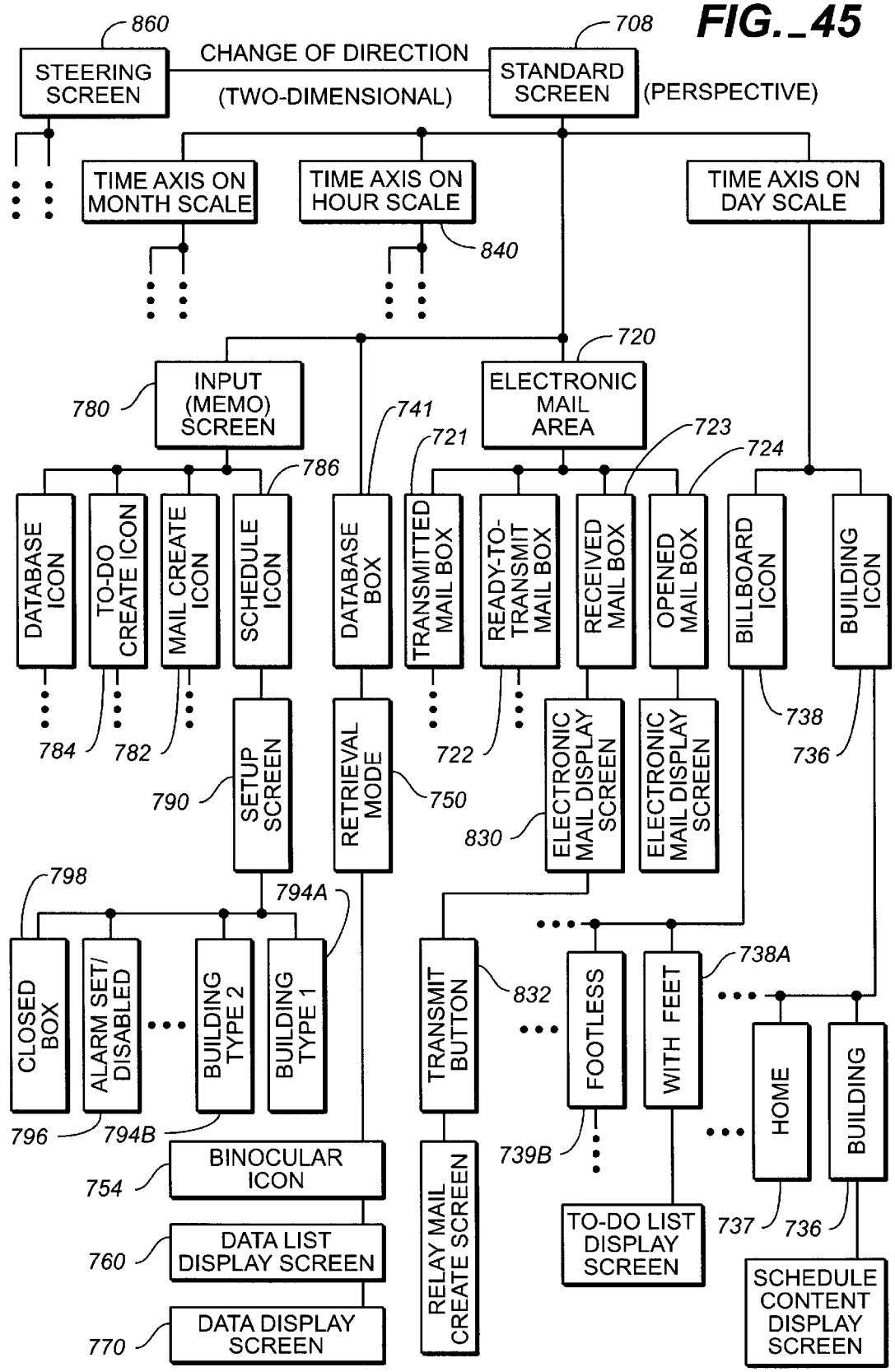
FIG._45

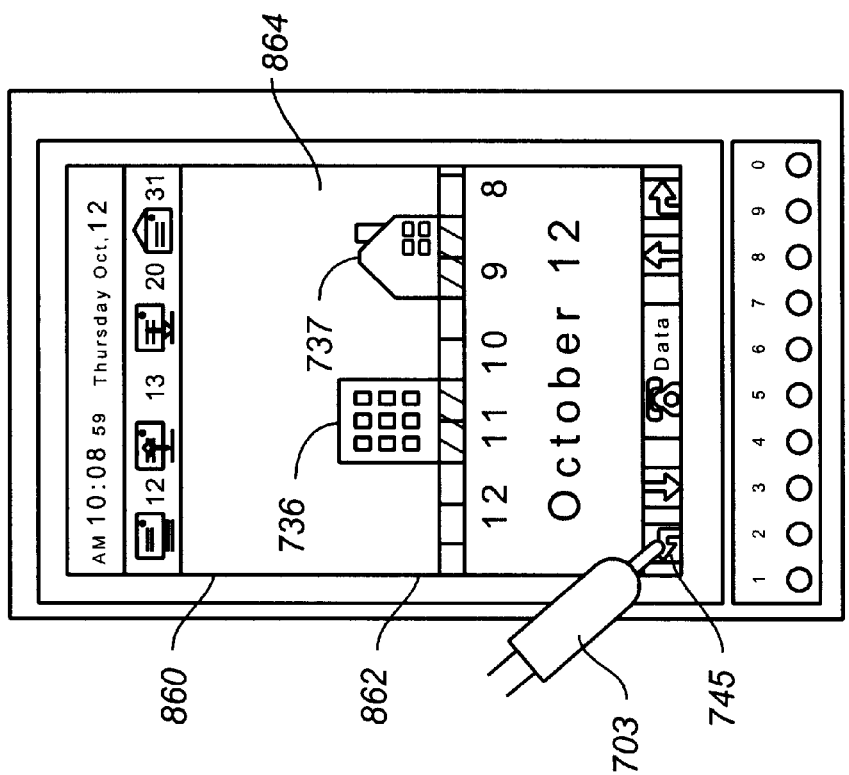
FIG._46B
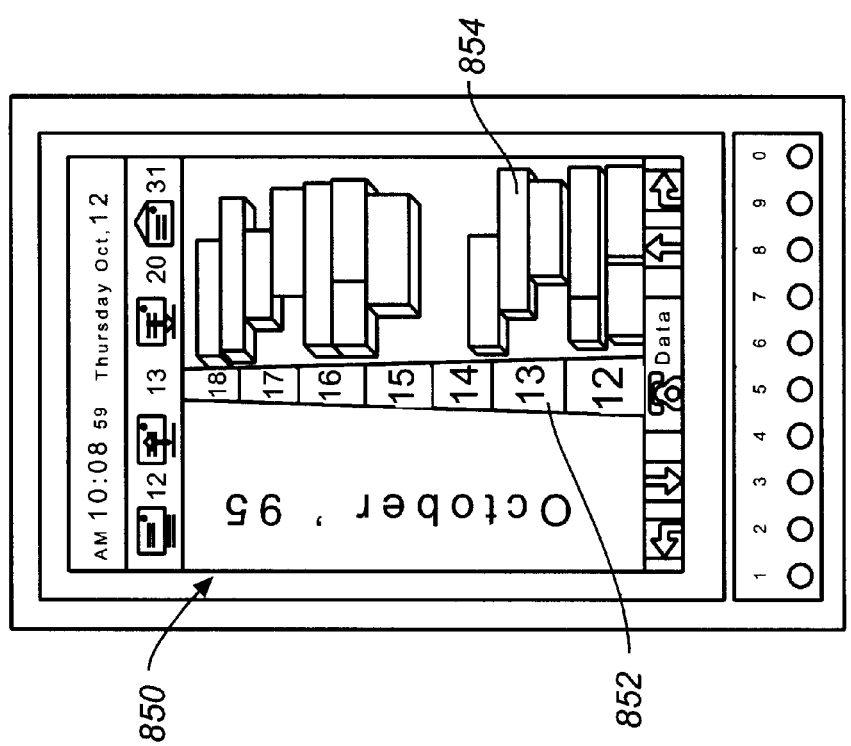
FIG._46A

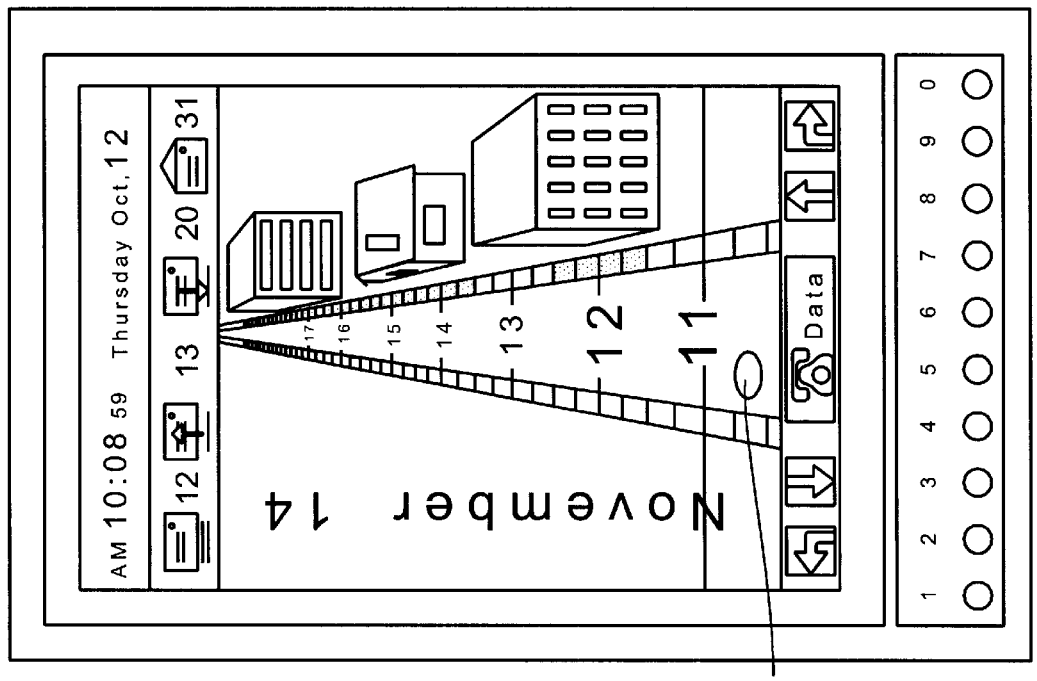
FIG._47B
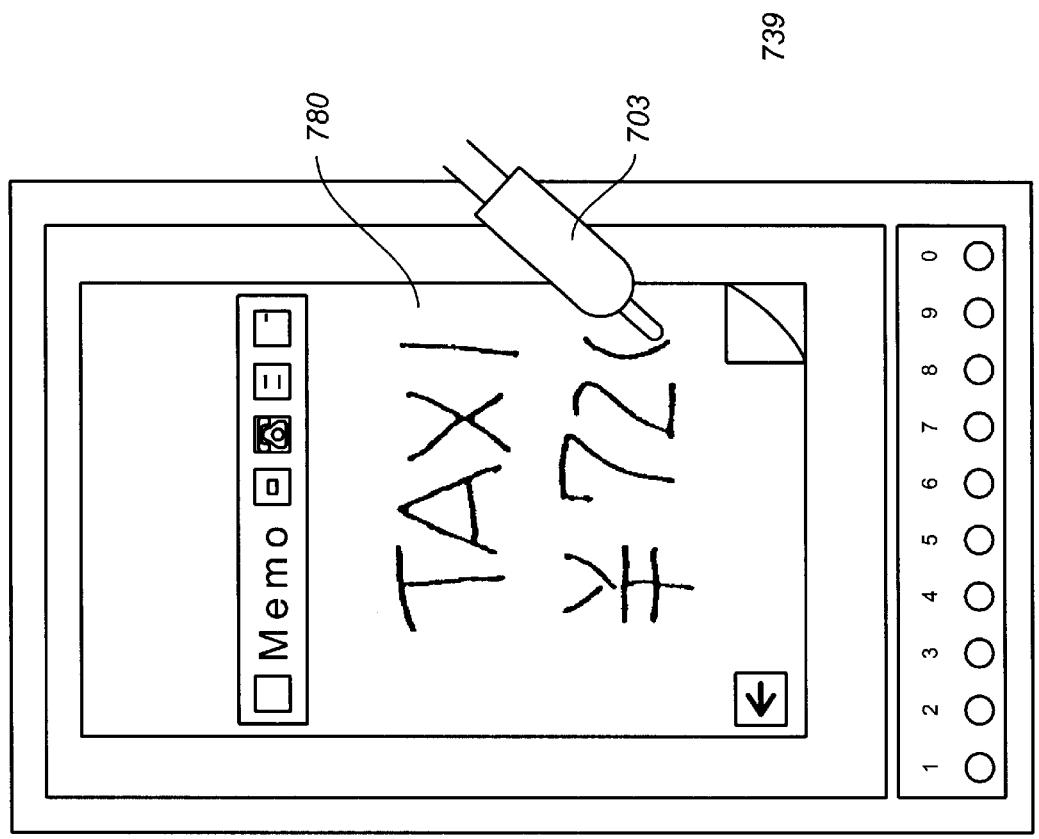
FIG._47A

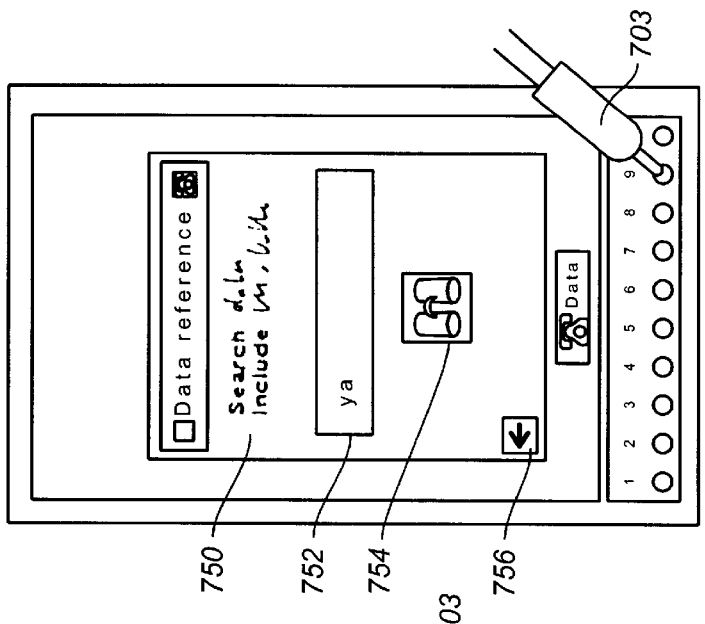
*FIG._48C*
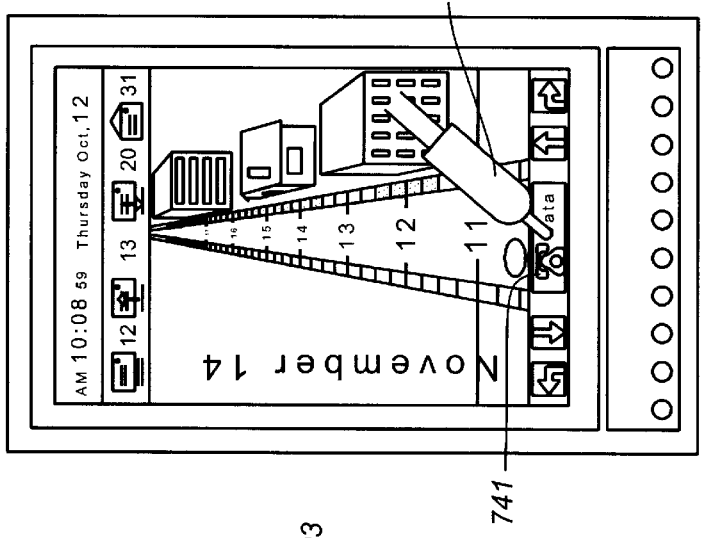
*FIG._48B*
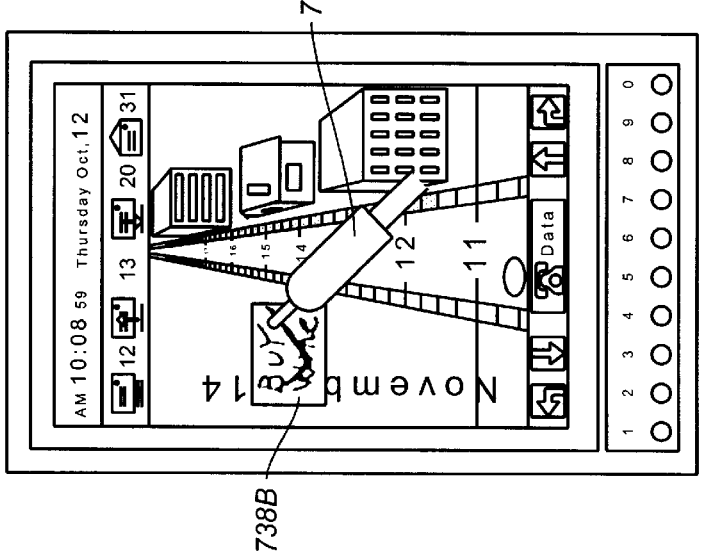
*FIG._48A*

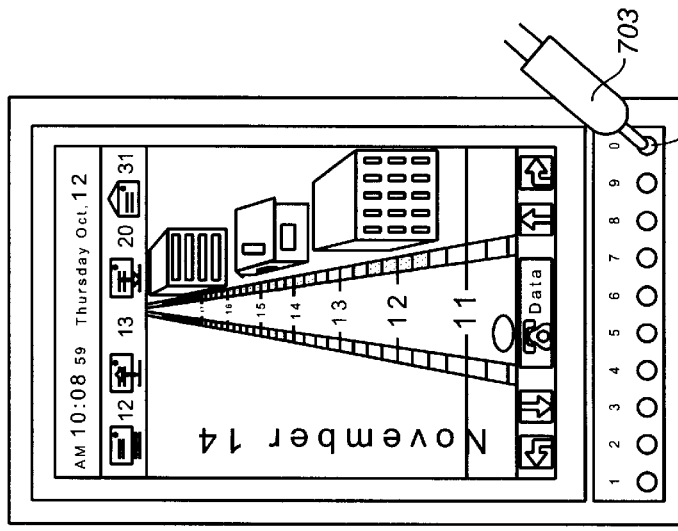
FIG._48F
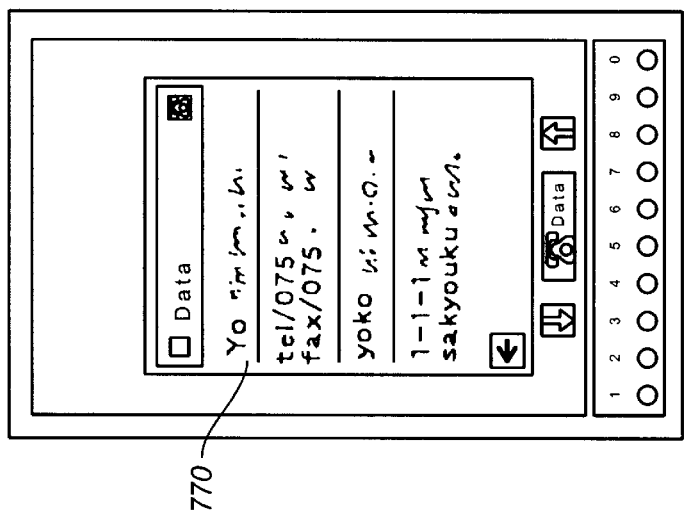
FIG._48E
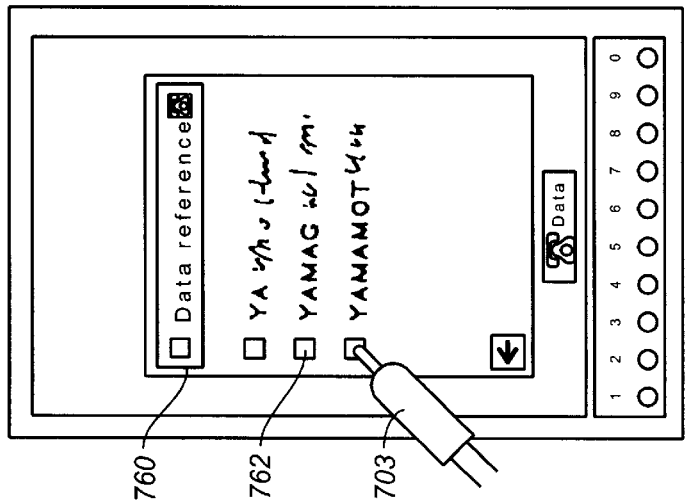
FIG._48D

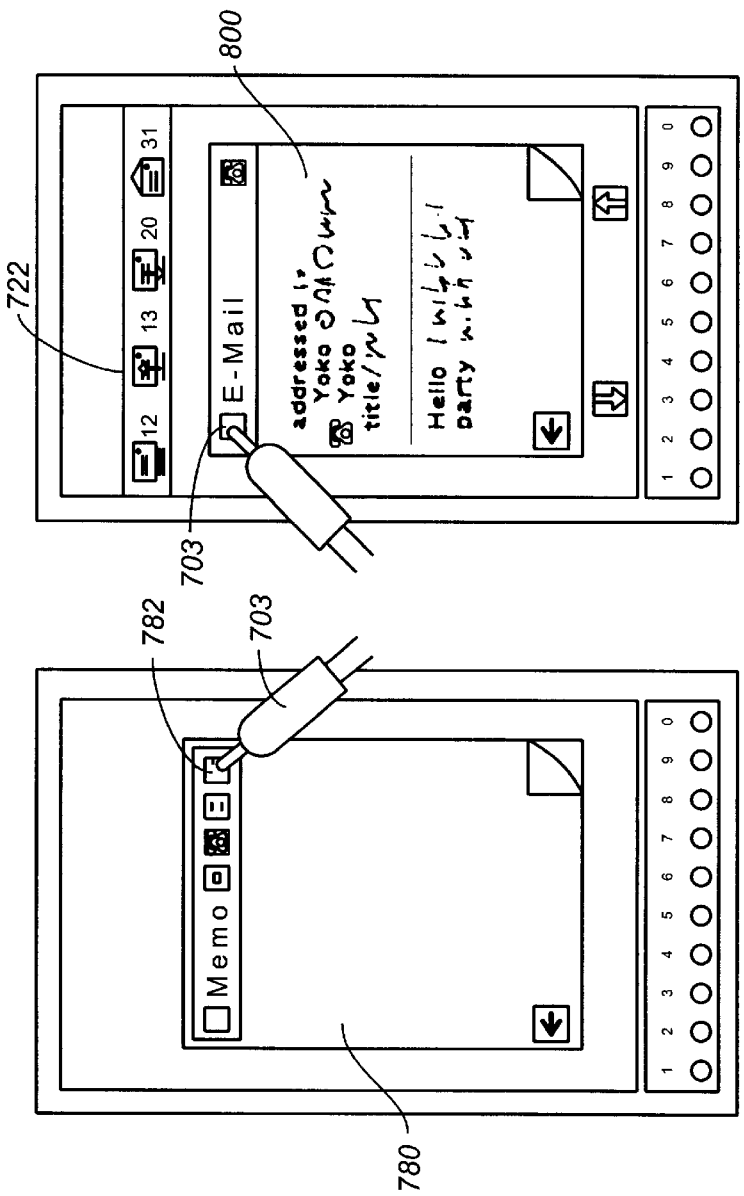
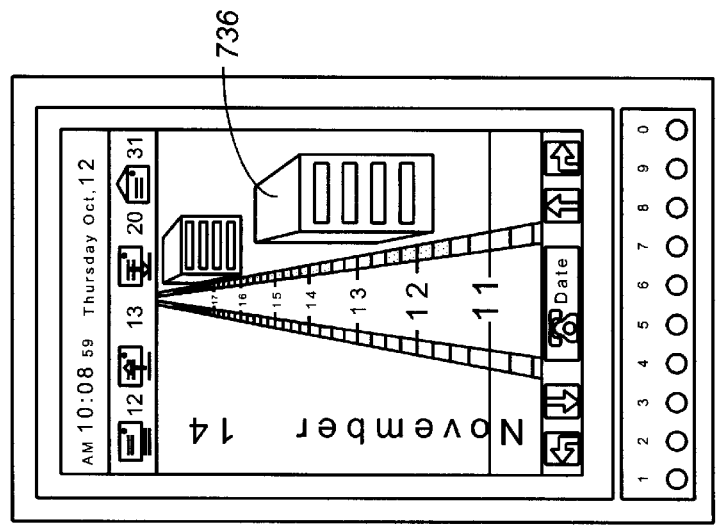
FIG._49C   FIG._49B   FIG._49A

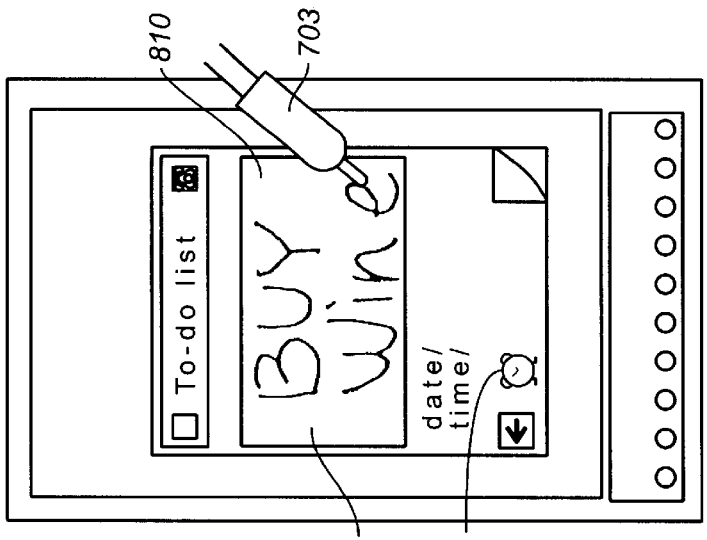
FIG._49F
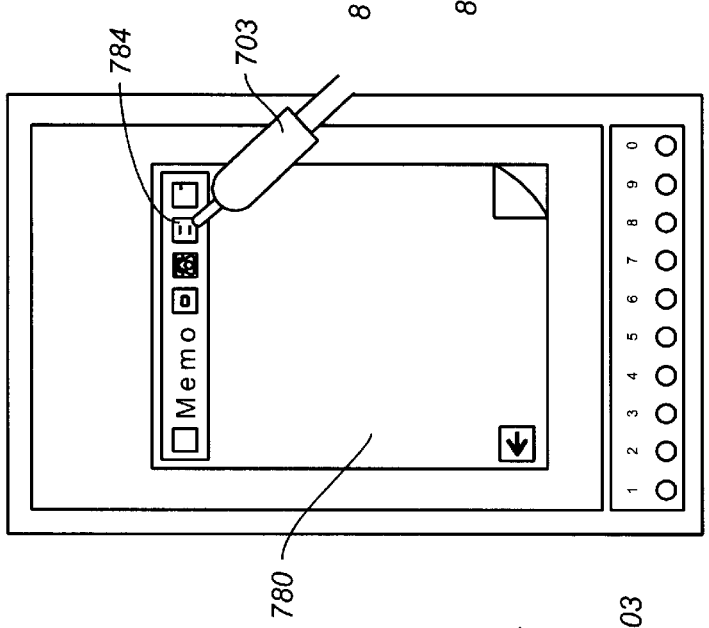
FIG._49E
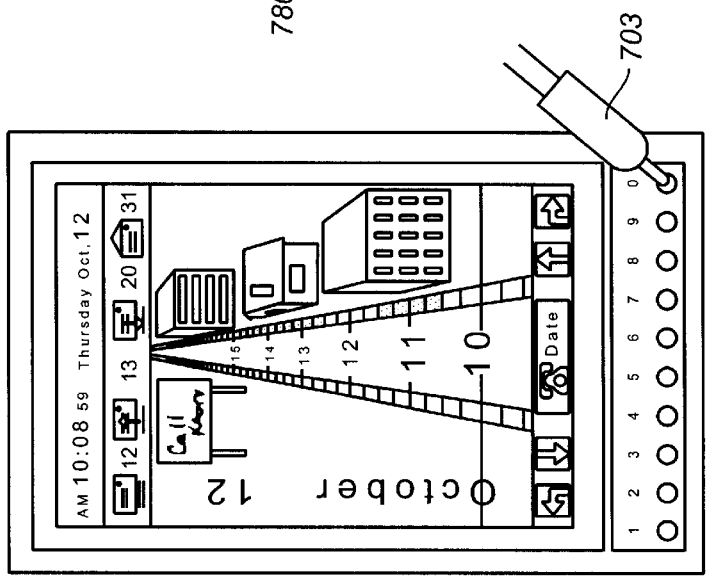
FIG._49D

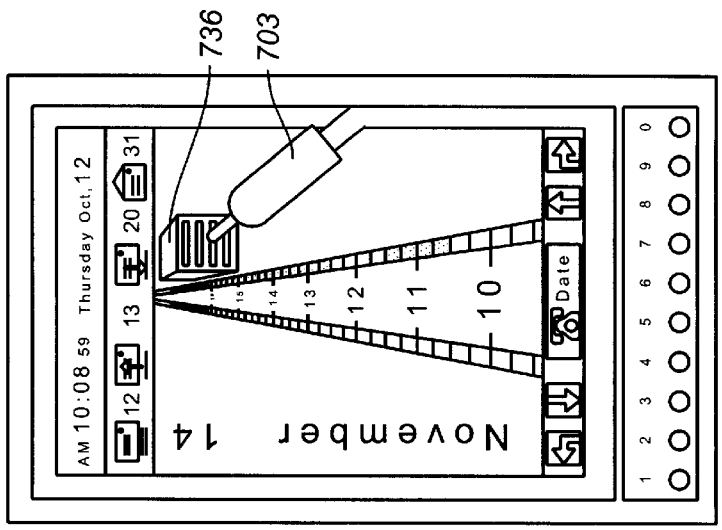
FIG._50C
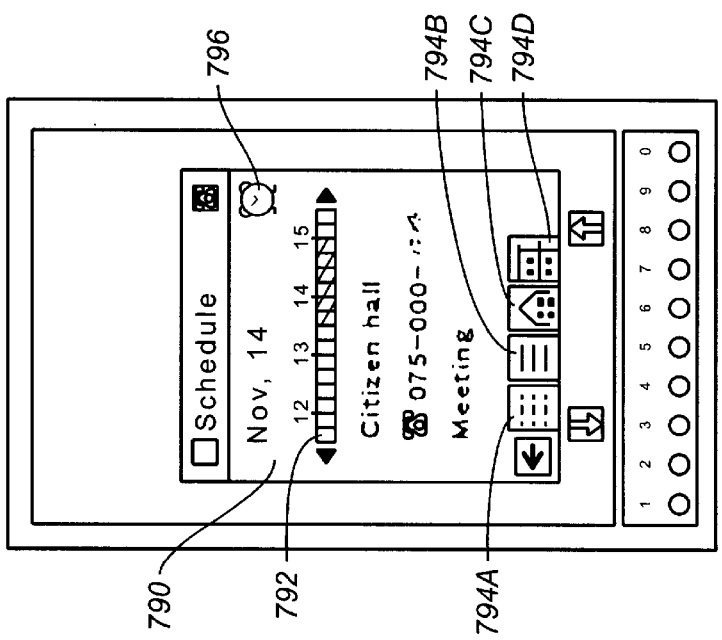
FIG._50B
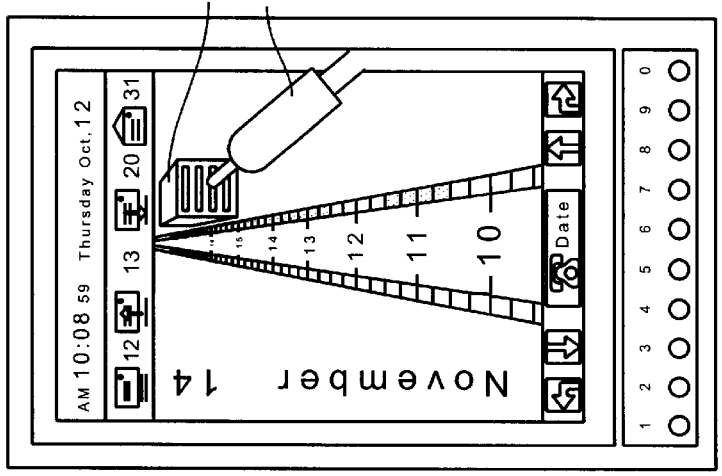
FIG._50A

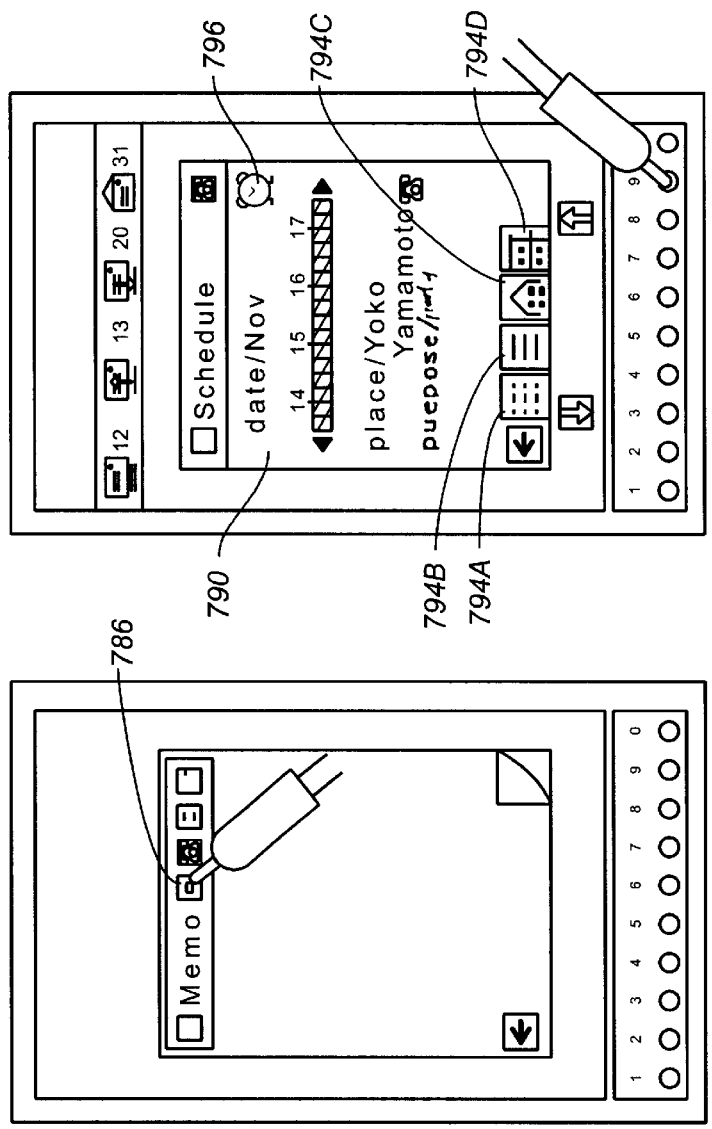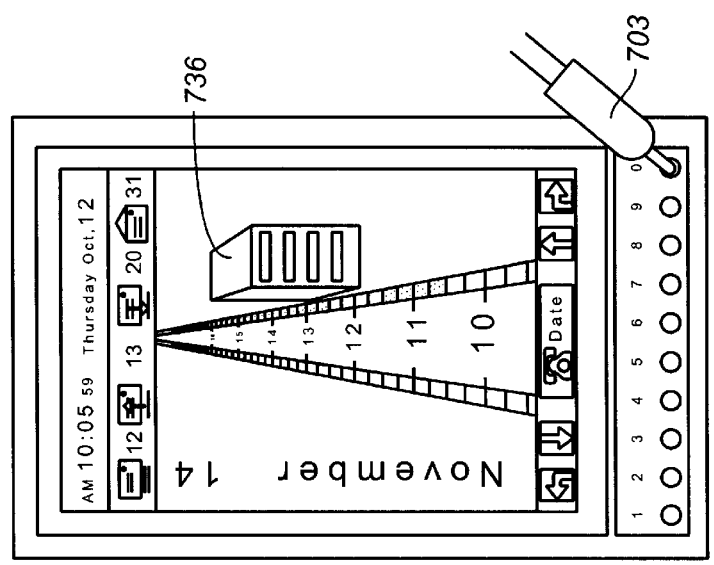
FIG._50F
FIG._50E
FIG._50D

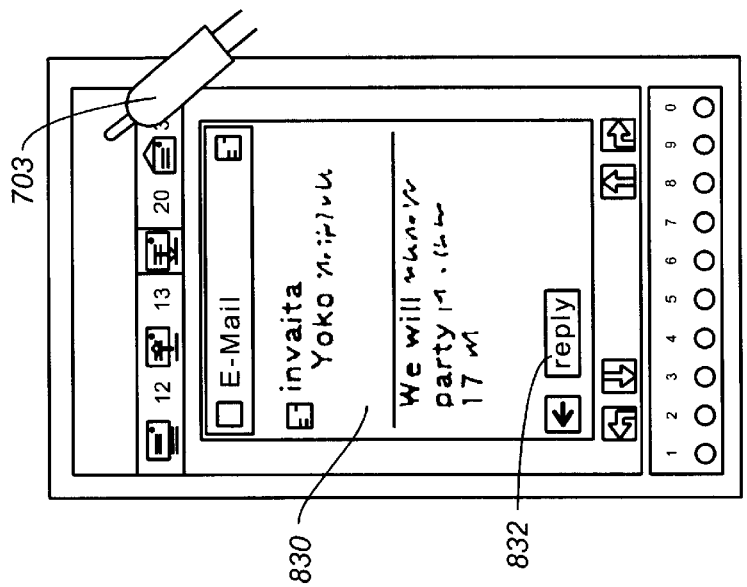
FIG._51C
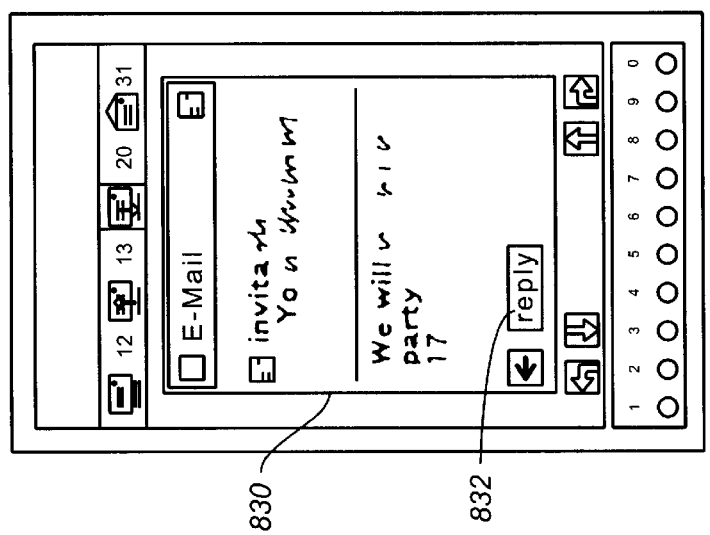
FIG._51B
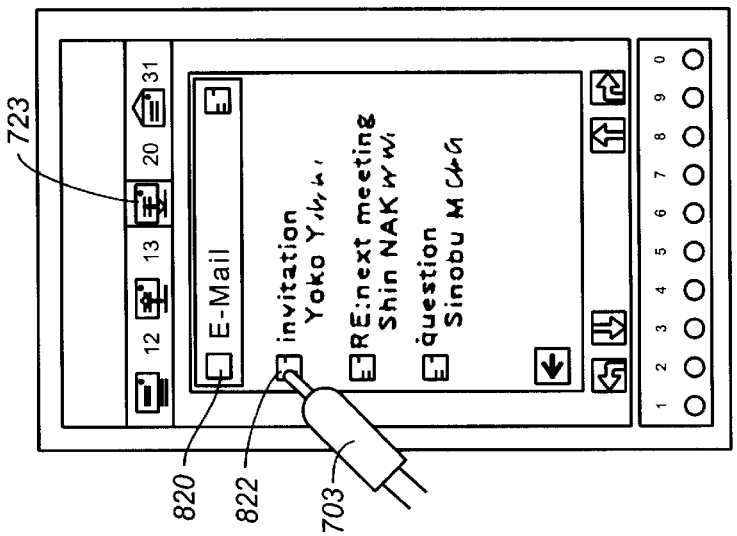
FIG._51A

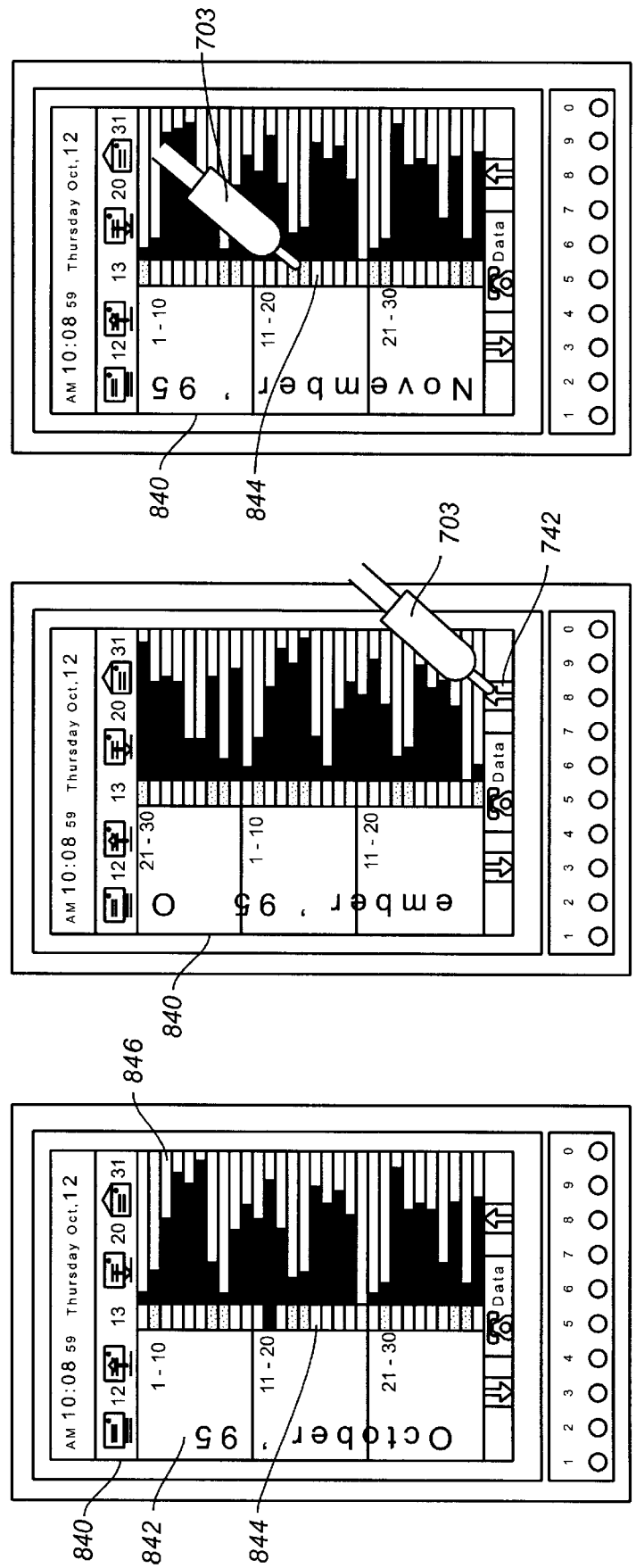

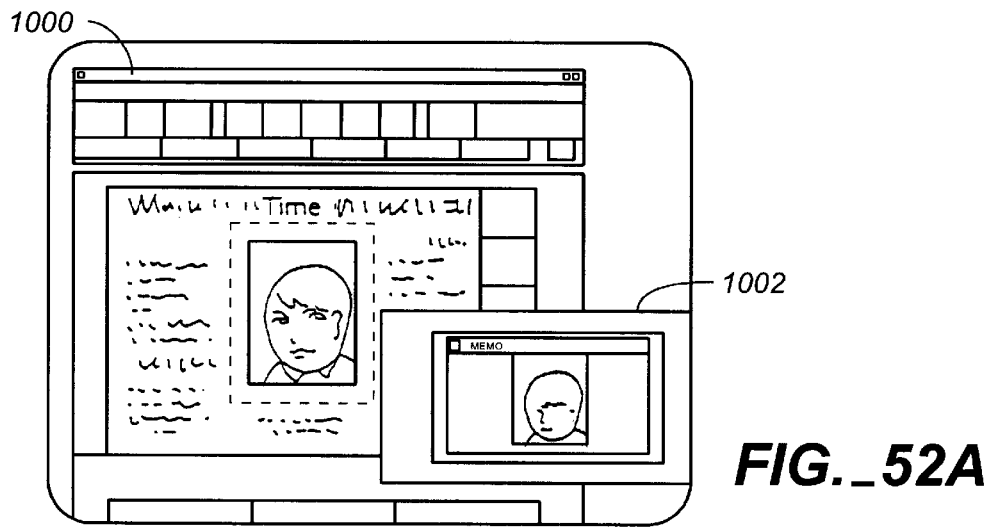
FIG._52A
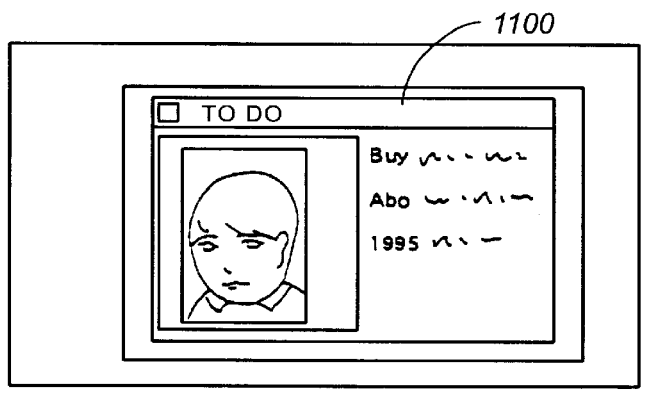
FIG._52B
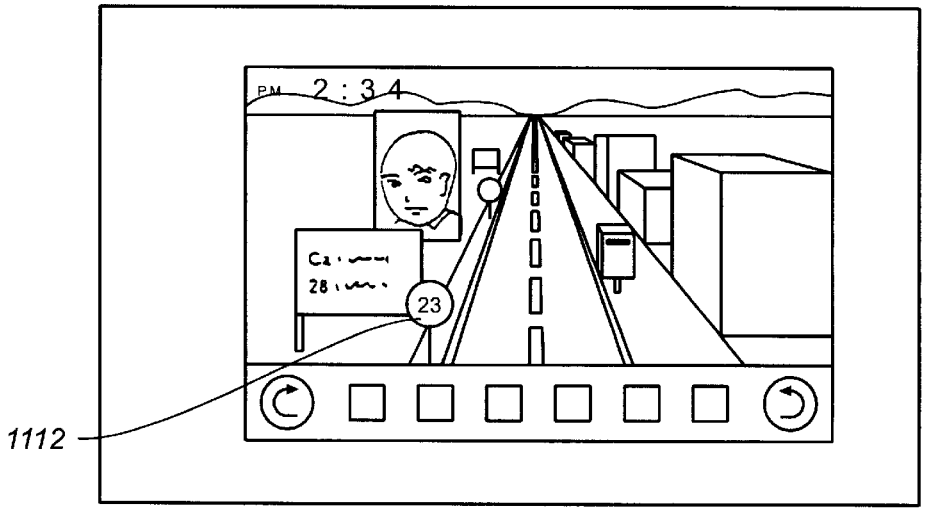
FIG._52C

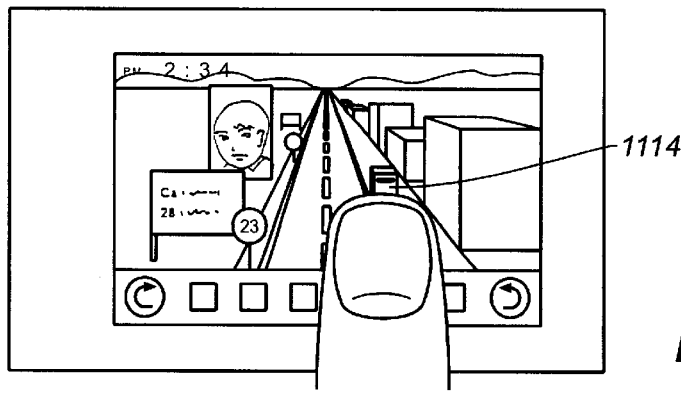
FIG._53A
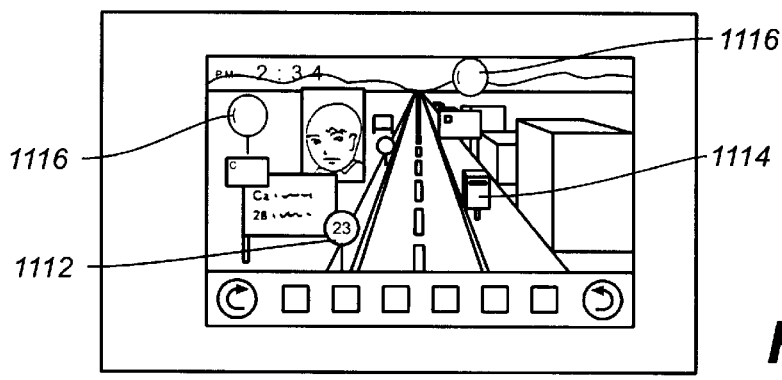
FIG._53B
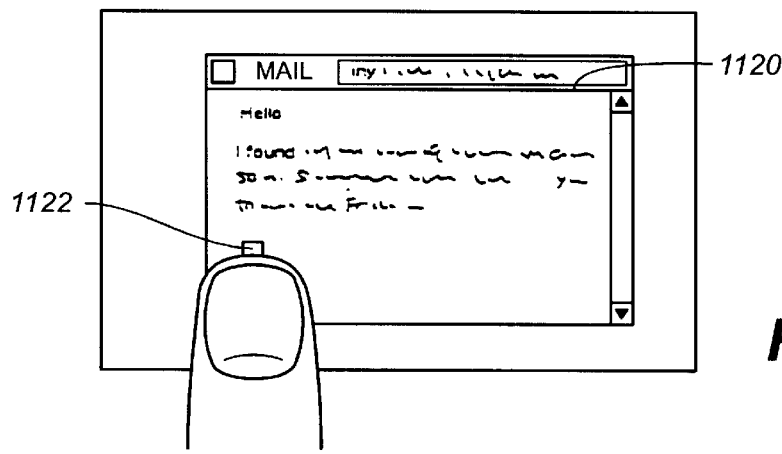
FIG._53C
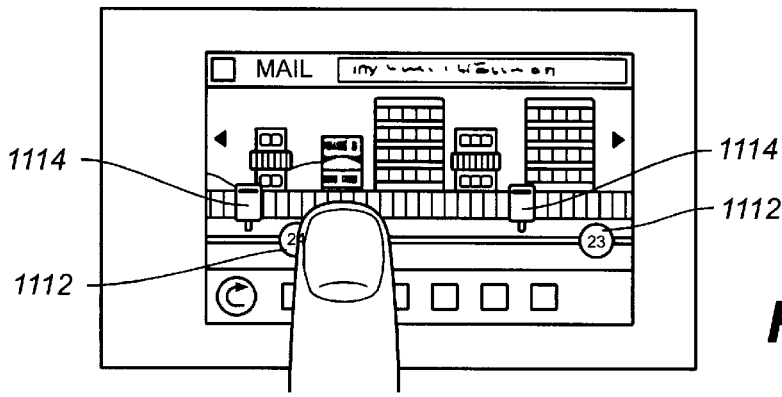
FIG._53D

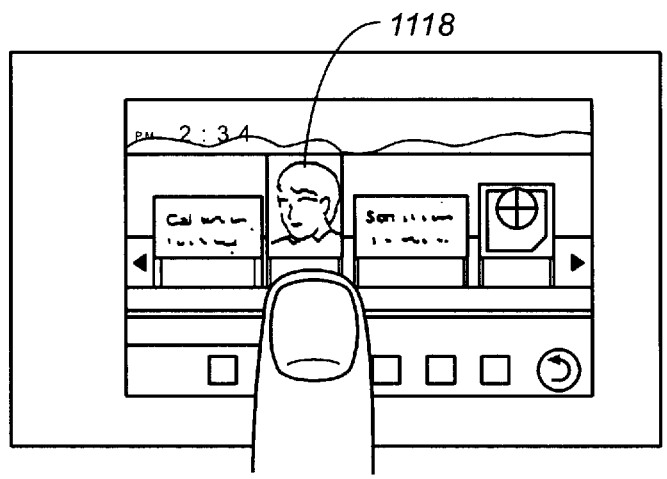
FIG._54A
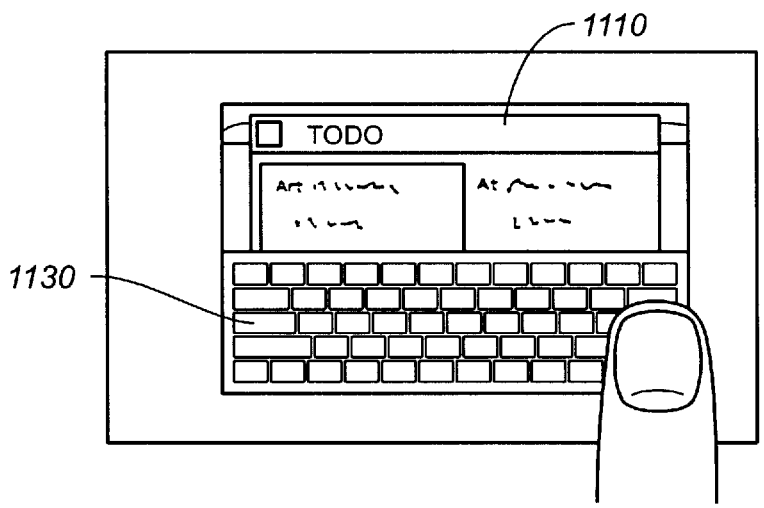
FIG._54B
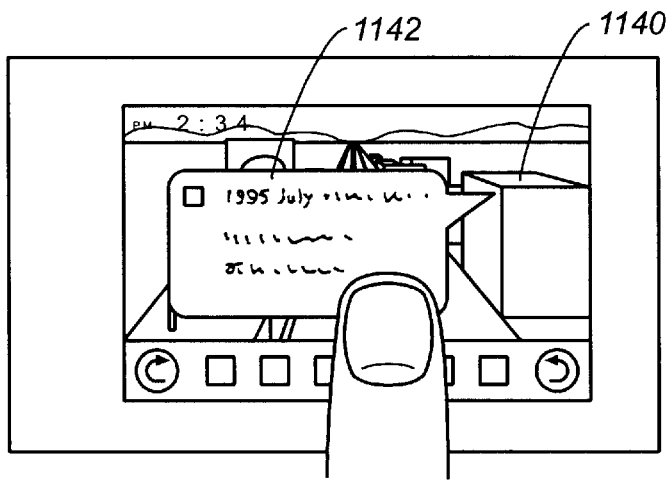
FIG._54C

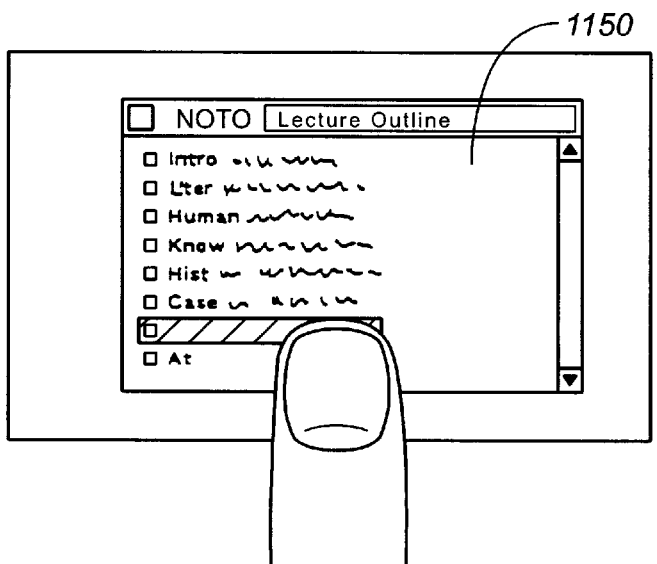
FIG._55A
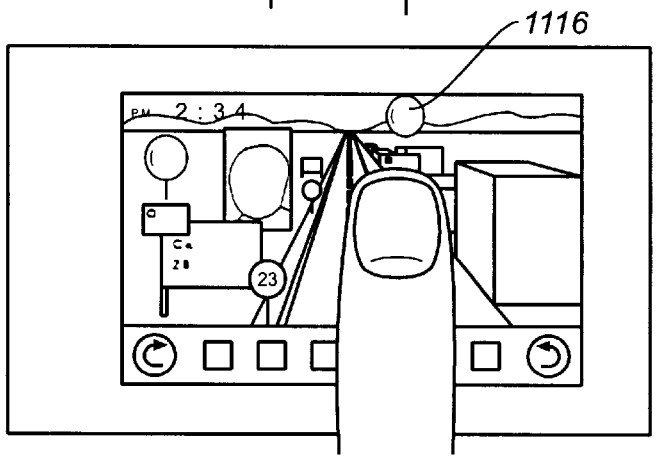
FIG._55B
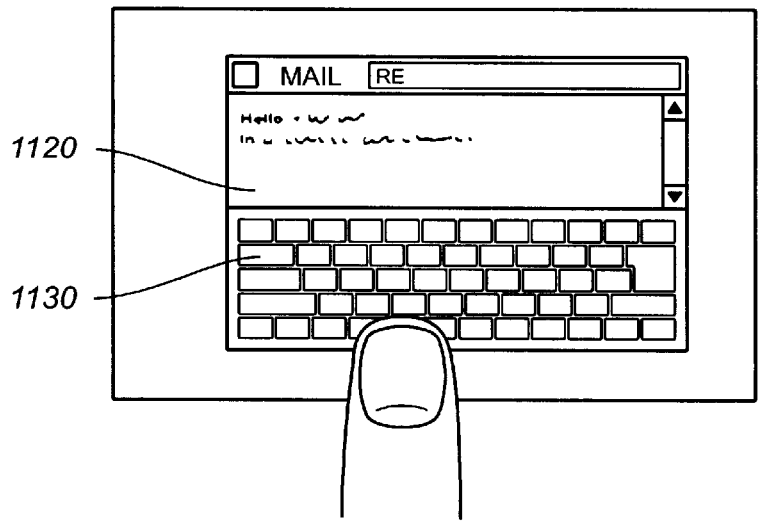
FIG._55C

FIG._56A
CASE 1
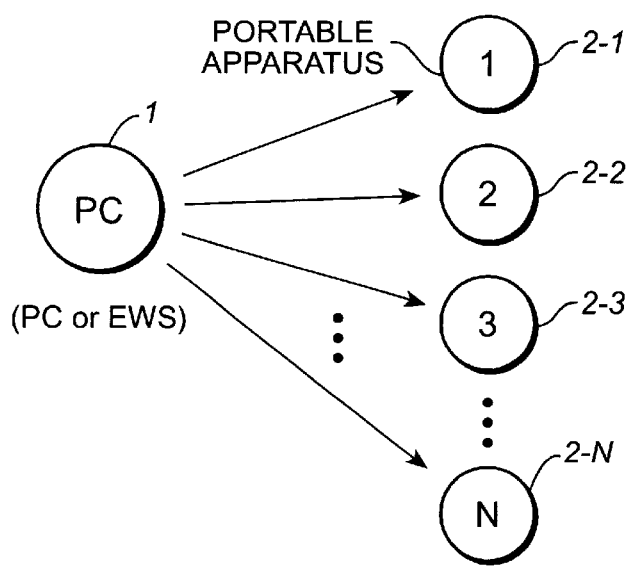
FIG._56B
CASE 2
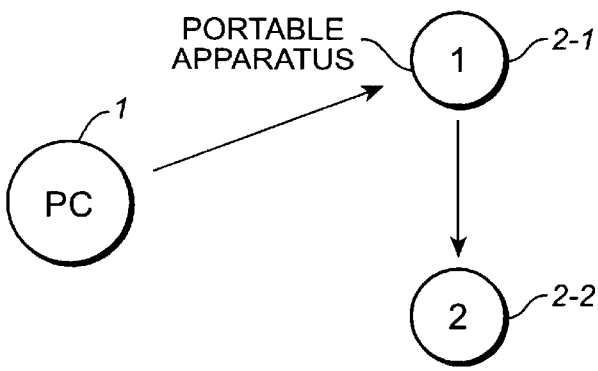
FIG._56C
CASE 3
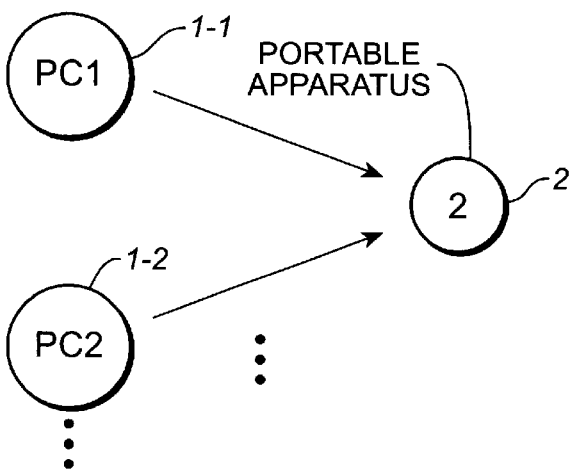

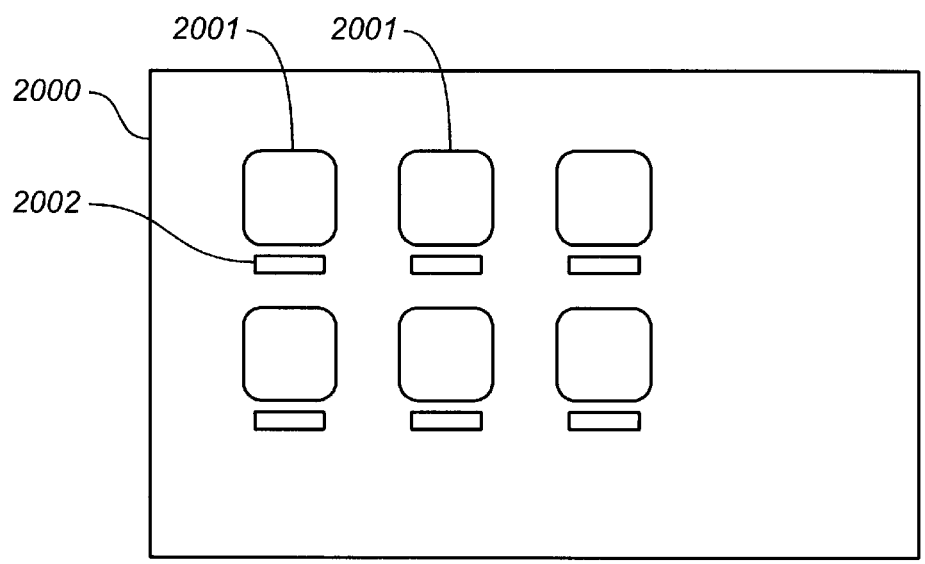
FIG._57A
(PRIOR ART)
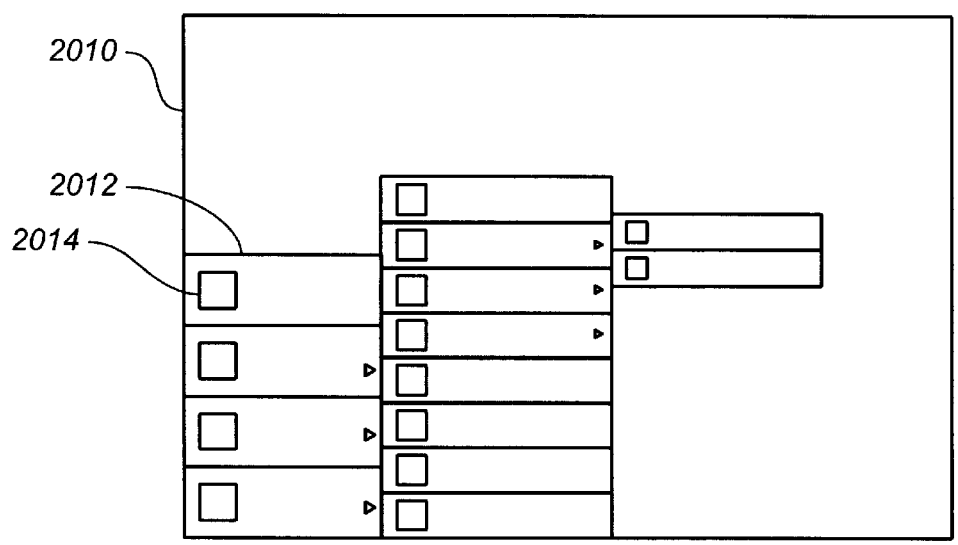
FIG._57B
(PRIOR ART)

DISPLAY DEVICE, PORTABLE INFORMATION PROCESSING APPARATUS, INFORMATION STORAGE MEDIUM, AND ELECTRONIC APPARATUS

BACKGROUND OF THE INVENTION

1. Field of the Invention

The present invention relates to a display device, a portable information processing apparatus, an information storage medium and an electronic apparatus.

2. Description of the Related Art

In the portable apparatus field, a display device called PDA (Personal Digital Assistance) is known as a compact and easy-to-carry information processing apparatus. Attempts are made to network information processing apparatuses including such PDAs, personal computers (PCs), electronic pocketbooks, and wordprocessors. In one application of portable devices, a variety of data is transferred from an information processing apparatus such as personal computer (PC) to a portable device in advance, and the data content in the portable device at a remote location is then updated.

Since the portable device has typically a smaller display screen than an ordinary PC, an image, if contracted in the same ratio, a displayed icon becomes too small for a user to learn what is going on or the function of the icon. If a font is displayed, characters are difficult to see. If the size of characters and fonts is reduced with the resolution of the display directly changed, the user has difficulty to see the display screen.

If an attempt is made to present, on the portable device, the same amount of information as much as that on the PC, an icon size and font size must be reduced. This presents a problem, particularly in portable computers and electronic pocketbooks for their screen size. For example, Japanese letters presented on fonts 24×24 dots or more are comfortable to see. However, the limitation of the display screen size does not accommodate such a font size, and some Chinese letters remain almost illegible.

The conventional devices, disclosed in Japanese Unexamined Patent Publications Nos. 1-173139 and 4-168482, free users from memorizing duty by tagging icons, which are an object in a metaphorical environment, with a descriptive message to clarify detailed meaning thereof.

Referring to FIG. 57A, a plurality of pieces of icon information 2001 for permitting lower level data to be read are typically arranged in m rows×n columns after a variety of application programs are activated on a menu screen 2000. Along with icon information 2001, a character 2002 is presented to describe the function of the icon information 2001, helping a user understand the meaning of the function of the icon information.

Referring to FIG. 57B, in a menu screen 2010, icon information 2014, hierarchically arranged in a plurality of layers and a setting tab 2012 that gives the description of the function of the information and the title of the information perform the same function as that of the icon information.

Since any of the display methods, presented by the above two menu screens, employs an icon tagged with a keyword or a symbol, a user who knows the tagged keyword and symbol finds it handy, but a user who has no prior knowledge of the keyword and symbol has to memorize them first and suffers a drop in work efficiency.

The size of the display of PDA is typically small and sometimes too small for the user to see presented characters and the like comfortably. The user has difficulty learning what function is next activated by any icon selection, and individual icons themselves are too small to be selected.

Such a device imposes a duty of memorizing a new keyword and symbol on a user who has no prior knowledge. Reading additional description inconveniences the user, resulting in a reduction in work efficiency.

The presentation of an icon, disclosed in Japanese Unexamined Patent Publication No. 5-28157, is contemplated. With the presentation of such an ordinary icon, when the user selects one among a plurality of icons displayed, for a desired function, the user is required to determine where to find a desired function referring to the figure of each icon and a name indicative of its function. A skilled user who already memorized the function corresponding to each icon and where a desired icon is placed, can quickly select a desired icon among numerous icons arranged in a matrix. However, a novice user takes time before she or he understands the function of each icon, and experiences difficulty memorizing where the icon of a desired function is placed on the screen and is subject to an erroneous selection.

In database software running on a PC, a keyword is used to retrieve data, and retrieval results and a browsing action (in which the user watches an image or the like, looking for desired data) are combined to pick up desired data.

When a menu screen is classified into a plurality of categories for retrieval, a complex hierarchical structure is formed. To carry out a retrieval in a top layer, a retrieval keyword is designated for retrieval after designating low-level layers of the hierarchical structure. In the type of database with no keyword used, the more complex the categories for organizing and classifying, the more complicated the hierarchical structure becomes, and more time is required for retrieval.

When the database is retrieved using a desired keyword in conventional database software, data is individually selected to look for detailed information. Specifically, in the conventional database software, retrieval results using a retrieval key are presented simply in the order of registration, for example, and the user is required to make a retrieval action again on the retrieval results already obtained.

OBJECTS OF THE INVENTION

Therefore, it is an object of the present invention to overcome the aforementioned problems.

The present invention is intended to resolve these problems. It is an object of the present invention to provide a display device, a portable information processing apparatus, an information storage medium and an electronic apparatus which make the function linked to each icon easy to understand when a user manipulates the icon information on a menu screen, helping the user learn quickly the relationship of a plurality of types of icon information without relying on font characters, and thereby helping a user select icon information easily.

It is also another object to provide a display device, a portable information processing apparatus, an information storage medium and an electronic apparatus which make the function linked to each icon easy to understand when the user manipulates the icon information on a menu screen, helping the user learn quickly the relationship of a plurality of types of icon information without relying on font characters, and thereby helping the user operate efficiently the device and apparatuses by reducing the operation time resulting from the complexity of a hierarchical structure.

SUMMARY OF THE INVENTION

According to a first aspect of the present invention, the display device includes display means for displaying, on a menu screen, a plurality of types of information including first through N-th information having at least different attributes, storage means for storing first through N-th background screen character data for presenting first through N-th background display areas that respectively present icon information corresponding to the first through N-th information, and first through N-th icon information corresponding to the first and N-th information, and control means for performing control to create the first through N-th background display areas on the menu screen on an area by area basis, based on the first through N-th background screen character data, and to display the icon information on an area by area basis.

In the first aspect of the present invention, the icon information corresponding to the plurality of types of information is classified and displayed by attribute on the first through N-th display area (background screen). Glancing at the division of the first through N-th background display areas, the user visually recognizes the function (application) of icon information within each area. Compared with the conventional menu screen which presents simply arranged icon information or icon information in combination with character information, the ease of use is excellent. This arrangement is particularly advantageous when the display screen is small; there is no need for displaying character information for identifying the icon information.

According to a second aspect of the present invention, the display device includes display means for displaying, on a display screen, a plurality of types of information having different attributes, including at least communications information and schedule information, storage means for storing first through third background screen character data which respectively present a first background display area for displaying icon information corresponding to the communications information, a second background display area for displaying the icon information corresponding to the schedule information, a third background display area for arranging and displaying icon information that is used to retrieve the plurality of types of information enjoyed in each of the first and second background display areas and for storing the icon information, control means for performing control to create the first through third background display areas on the display screen on an area by area basis, based on the first through third background screen character data, and to display the icon information on an area by area basis.

In the second aspect of the present invention, the icon information corresponding to the plurality of types of information is classified and displayed by attribute (communication, schedule, database retrieval) on the first through third background display area (background screen). Glancing at the division of the first through third background display areas and background screen, the user visually recognizes the function (application) of icon information within each area. Compared with the conventional menu screen which presents simply arranged icon information or icon information in combination with character information, the ease of use is excellent. This arrangement is particularly advantageous when the display screen is small; there is no need for displaying character information for identifying the icon information.

According to a third aspect of the present invention, the device in the second aspect further includes operating means for inputting the plurality of types of information on the display screen, wherein the control means includes a mode control unit that controls the switching, in response to an input through the operating means, between a first mode in which the first through third background display areas are presented and a second mode in which one of the first through third background display areas is enlarged and presented.

In the third aspect of the present invention, the switching to the second mode enlarges one of the first through third background display areas, helps the user easily recognize which area is used, from its positional relationship within the display screen.

According to a fourth aspect of the present invention, in the display device in the third aspect, the storage means holds fourth background screen character data to present a fourth background display area for presenting icon information corresponding to input and output information that is input and output, wherein the control means performs control to create each of the first through fourth background display areas on the display screen on an area by area basis, based on the first through fourth background screen character data and to display the icon information on an area by area basis.

In the fourth aspect of the present invention, the fourth background display area for the input and output operation is provided in addition to the first background display area displaying the communications information, the second background display area for displaying the schedule, and the third background display area for the database retrieval. This arrangement provides the ease of use to the user.

According to a fifth aspect of the present invention, in the display device in the third aspect, the control means performs control to create and display information having an attribute corresponding to the input to the icon information through the operating means, out of the plurality of types of information, on a screen different from the menu screen.

In the fifth aspect of the present invention, the plurality of types of information corresponding to the icon information are viewed in response to the input through the operating means.

According to a sixth aspect of the present invention, the display device in the third aspect further includes timing means for counting time, wherein the control means performs control to display the icon information in a chronological order, in accordance with time information of the timing means.

In the sixth aspect of the present invention, the icon information displayed in the chronological order permits the user to visually recognize which one of the plurality of types of information is older than another.

According to a seven aspect of the present invention, in the display device in the third aspect, the first background display area is formed on the upper portion of the display screen in which a sky is presented as a background screen by making the first background screen character data a sky metaphor; the second background display area is formed on the middle portion of the display screen in which a ground is presented as a background screen by making the second background screen character data a ground metaphor; and the third background display area is formed on the lower portion of the display screen in which an underground is presented as a background screen by making the third background screen character data an underground metaphor.

In the seventh aspect of the present invention, the first, second and third background display areas are respectively presented in the upper, middle and lower portions of the display screen to form the sky, ground and underground metaphors. The user visually recognizes information relating to each of these metaphors at a glance. Specifically, since one may mentally associate the sky with weather changes, communications information, which is constantly changing, is assigned to the sky metaphor. Since one may mentally associate the underground with reserves of materials, retrievable information as a database is assigned to the underground metaphor. Since one may mentally associate the ground with a breeding ground on which something new may be planted, schedule information is assigned to the ground metaphor. With this arrangement, information is classified by function-related area, and the attribute of information is determined by the background screen. This arrangement is particularly advantageous in the menu screen in which the display screen is small with character information difficult to see.

According to an eighth aspect of the present invention, in the display device in the sixth aspect, the communications information includes electronic mail information transmitted and received, and reception time information about the reception time of the electronic mail information, wherein control means performs control to display the icon information on the first background display area in the order of reception, in accordance with the reception time information.

In the eighth aspect of the present invention, the electronic mails are presented in the order of reception. Without paying any particular attention, the user automatically visually recognizes the files of electronic mail information in a chronological order.

According to a ninth aspect of the present invention, in the display device in the sixth aspect, the icon information includes third icon information that is created and displayed as a single character when the number of pieces of the electronic mail information exceeds a predetermined number, wherein the control means performs control to display the third icon information on the first background display area when the number of pieces of the electronic mail information exceeds the predetermined number.

In the ninth aspect of the present invention, as the number of pieces of electronic mail information increases, the number of pieces of icon information increases accordingly. When the number of pieces of electronic mail information exceeds a predetermined number, for example, 3, the third icon information is constantly presented even the number of pieces of electronic mail information becomes 4 or 5. With this arrangement, the display space of the display means is fully utilized. It is not necessary to prepare the number of pieces of icon information corresponding to the number of pieces of electronic mail information.

According to a tenth aspect of the present invention, in the display device in the ninth aspect, the communications information includes identification information for identifying and classifying the function of the electronic mail according to the content of the electronic mail; the third icon information includes a plurality of pieces of function-based icon information that are classified by function with a view to the content of the electronic mail; and the control means performs control to display the function-based icon information that matches the content of the electronic mail, on the first background display area, in accordance with the identification information.

In the tenth aspect of the present invention, a plurality of pieces of electronic information are classified according to application and are then presented as the icon information.

According to an eleventh aspect of the present invention, in the display device in the fourth aspect, the control means performs control to synthesize and display the icon information on one of the first, second and fourth background display areas, in accordance with an input through the operating means.

In the eleventh aspect of the present invention, the ease of use is even more promoted because the user shifts the desired one among the icon information from one background area to another by the input through the operating means.

According to a twelfth aspect of the present invention, in the display device in the fourth aspect, the storage means holds screen data for forming a background screen of a localized area where the input and output information is displayed, and font data for displaying the input and output information in a hand-written character, wherein the control means performs control to synthesize and display the font data on the screen data, in a layer beneath the icon information, in accordance with the input through the operating means.

In the twelfth aspect of the present invention, the input and output information, such as memo information, employs font data looking like a handwritten letter, presenting a written memo lively on the display screen.

According to a thirteenth aspect of the present invention, the display device in the twelfth aspect further includes a pen input information processing unit for forming the input and output information, wherein the control means performs control to display the input and output information on the display means, in accordance with external input information input through the pen input information processing unit.

In the thirteenth aspect of the present invention, the device includes a business card sized memo tablet as the pen input information processing unit to allow the user to hand-write data in ink.

According to a fourteenth aspect of the present invention, the display device in the third aspect further includes voice input means for inputting voice information included in the plurality of types of information, and voice input control means for controlling the input of the voice information in accordance with the input through the operating means.

According to a fifteenth aspect of the present invention, the display device in the third aspect further including voice output means for outputting the voice information included in the plurality of types of information, and voice output control means for controlling the output of the voice information, in accordance with the input through the operating means.

In the fourteenth and fifteenth aspects of the present invention, the display device, with the voice input means and the voice output means, handles voice information. The user not only recognizes visually the display screen but also audibly recognize the voice information. Since information transfer to the user is carried out by means of both vision and hearing, liveliness of the transferred information is much more increased.

According to a sixteenth aspect of the present invention, in the display device in the fifteenth aspect, the voice information includes voice communications information transmitted and received, and voice size information relating to the size of the voice communications information; the icon information includes a plurality of pieces of sixth icon information having different configurations corresponding to the voice communications information; and the control means performs control to selectively display the plurality of pieces of sixth icon information having the different configurations, in accordance with the voice size information.

In the sixteenth aspect of the present invention, the user easily visually recognizes the amount of information of the voice communications information because it is represented by the configuration of the sixth icon information.

According to a seventeenth aspect of the present invention, in the display device in the fourteenth aspect, the voice information includes voice input information having a schedule input in voice, and designated time information at which a user designates a scheduled execution time of the voice input information, wherein the control means performs control to display the icon information in the order of creation, in accordance with the designated time information.

In the seventeenth aspect of the present invention, the voice input information such as voice memo information is displayed in the order of creation. Without paying any particular attention, the user automatically visually recognizes the contents of files of voice input information in a chronological order. A plurality of pieces of voice information are displayed in a chronological order according to the degree of importance or urgency determined by the designated time information. The icon information for important voice input information is discriminated from other icon information to help the user learn the degree of its importance at a glance.

According to an eighteenth aspect of the present invention, in the display device in the seventeenth aspect, the voice information includes voice size information relating to the size of the voice schedule information; the icon information includes a plurality of pieces of eighth icon information having different configurations corresponding to the voice schedule information; and the control means performs control to selectively display the plurality of pieces of eighth icon information having the different configurations, in accordance with the voice size information.

In the eighteenth aspect of the present invention, the amount of voice schedule information is represented by the configuration of the icon information. The user easily visually recognizes the amount of the information.

According to a nineteenth aspect of the present invention, in the display device in the sixth aspect, the display means includes a fifth background display area for hiding the display screen when the input operation through the operating means is not carried out for a predetermined duration of time, wherein the control means performs control to enlarge and display the fifth background display area in succession to the duration.

In the nineteenth aspect of the present invention, the user can hide the display screen with the fifth background display area if the user does not want the display content to be seen.

According to a twentieth aspect of the present invention, the display device in the nineteenth aspect further includes battery remaining power detector means for detecting a level in a battery, wherein the control means performs control to display the battery level on the fifth background display area, in accordance with the detection result provided by the battery remaining power detector means.

In the twentieth aspect of the present invention, the user visually recognizes the remaining power in a battery.

According to a twenty-first aspect of the present invention, in the display device in the nineteenth aspect, the control means performs control to hide part of the display screen with the fifth background display area while displaying the icon information only, in the remaining area of the display screen.

In the twenty-first aspect of the present invention, the icon information, such as a TODO list only, is left unhidden so that the display device continuously presents minimum required display information while hiding the display screen.

According to a twenty-second aspect of the present invention, the display device in the third aspect further includes battery remaining power detector means for detecting a level in a battery, wherein the control means performs control to display the battery level on the display screen, in accordance with the detection result provided by the battery remaining power detector means.

In the twenty-second aspect of the present invention, the user visually recognizes the remaining power in a battery without switching the mode.

According a twenty-third aspect of the present invention, in the display device in the third aspect, the control means includes a background screen control unit which presents in high-contrast presentation the background display area that is enlarged and displayed when the second mode is use, while presenting in low-contrast presentation the remaining background display area.

In the twenty-third aspect of the present invention, the background display of the area in use, presented in high-contrast presentation, permits the user to recognize, at a glance, which area is in use.

According to a twenty-fourth aspect of the present invention, in the display device in the third aspect, the storage means includes database display information for arranging and displaying retrieval selection character information that is used to retrieve the plurality of types of information according to alphabets, and a retrieval program for retrieving the plurality of types of information using at least a first alphabetical letter of a word, as a keyword for retrieval, wherein the control means performs low-hierarchical layer display control by designating the keyword for retrieval according to the retrieval selection character information in accordance with an input through the operating means, retrieving the plurality of types of information using the retrieval program, and outputting retrieval result information.

Since retrieval is performed using alphabets in the twenty-fourth aspect of the present invention, a plurality of any types of information is retrieved at once, without using a complex hierarchical structure.

According to a twenty-fifth aspect of the present invention, the information storage medium which at least stores information for forming a display image, includes first through third background screen character data which respectively present a first background display area for arranging and displaying the icon information corresponding to communications information, a second background display area for arranging and displaying icon information corresponding to schedule information, a third background display area for arranging and displaying the icon information that is used to retrieve a plurality of types of information enjoyed in each of the first and second display areas; the icon information; and information for performing control to create the first through third display areas on a display screen on an area by area basis, based on the first through third background character data, and to display the icon information on an area by area basis.

In the twenty-fifth aspect of the present invention, the icon information corresponding to the plurality of types of information is classified by attribute (communications, schedule, database retrieval) and is displayed on the first through third background display areas (background screen). Glancing at the division of the first through third background display areas and background screen, the user visually recognizes the function (application) of icon information within each area. Compared with the conventional menu screen which presents simply arranged icon information or icon information in combination with character information, the ease of use is excellent. This arrangement is particularly advantageous when the display screen is small; there is no need for displaying character information for identifying the icon information.

According to a twenty-sixth aspect of the present invention, the information storage medium in the twenty-fifth aspect includes a retrieval program for retrieving the plurality of types of information using at least a first alphabetical letter of a word, as a keyword for retrieval, and information for designating the keyword for retrieval according to retrieval selection character information in accordance with an input through operating means, for retrieving the plurality of types of information using the retrieval program, and for outputting retrieval result information.

In the twenty-sixth aspect of the present invention, there is provided the information storage medium which permits a plurality of any types of information to be retrieved at once using alphabets, without using a complex hierarchical structure.

According to a twenty-seventh aspect of the present invention, the portable information processing apparatus includes a display device recited in any of first through twenty-fourth aspects of the present invention.

In the twenty-seventh aspect of the present invention, significance is imparted, in accordance with their attributes, to divisions between the background display areas in the menu screen and to the arrangement method of and configurations of the icon information so that the user visually recognizes the icon information. The present invention, when implemented in a compact information processing apparatus, helps the user visually recognize the function of the icon information. An easy-to-use information processing apparatus is thus provided.

According to a twenty-eighth aspect of the present invention, the portable information processing apparatus according in the twenty-seventh aspect further includes a wrist attachment which is arranged on the display device and fastens about the wrist of the user.

In the twenty-eighth aspect of the present invention, the present invention finds applications in a compact portable information processing apparatus that is intended to fasten about the wrist of the user.

According to a twenty-ninth aspect of the present invention, the electronic apparatus includes an information storage medium recited in one of the twenty-fifth through twenty-sixth aspects.

In the twenty-ninth aspect of the present invention, the above-described menu screen is created not only on the above compact portable information processing apparatus, but also other general apparatuses including personal computers. The ease of use of these apparatuses is thus promoted.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts:

FIG. 1 is a schematic view showing one example of display screen according to one embodiment of display device of the present invention;

FIG. 2 is a schematic view showing one example of low-level layer menu screen (window) that is presented when an icon on the display screen shown in FIG. 1 is clicked;

FIG. 3 is a schematic view showing one example of low-level layer menu screen (window) that is presented when an icon on the display screen shown in FIG. 1 is clicked;

FIG. 4 is a perspective view showing a portable information processing apparatus of the present invention and a personal computer, in which data synchronization is established in a network composed of the portable information processing apparatus and the personal computer;

FIG. 5 is a block diagram showing the hardware structures of the portable information processing apparatus and personal computer shown in FIG. 4;

FIG. 6 is a front view showing the portable information processing apparatus of the present invention;

FIG. 7 is a schematic view showing a standard screen presented on the display unit of the portable information processing apparatus shown in FIG. 6;

FIG. 8A through FIG. 8F are schematic views showing examples of low-level layer menu screens given in a low-level layer menu of the standard screen of FIG. 7;

FIG. 9A through FIG. 9E are schematic views showing screens presented on the display unit of the portable information processing apparatus of FIG. 6;

FIG. 10 is an explanatory diagram showing a high-level layer menu group, low-level layer menu group, and setup display screens, which are step by step presented on the display device of the present invention under the control of its control system;

FIG. 11 is a functional block diagram showing the software structure of the portable information processing apparatus of the present invention;

FIG. 12 is a functional block diagram showing the software structure of the portable information processing apparatus of the present invention;

FIGS. 13, 13A and 13B form a detailed block diagram of the functional block diagram of FIG. 12;

FIG. 14 is a memory map representing the information layers stored in a memory in the portable information processing apparatus of the present invention;

FIG. 15 is a conceptual diagram showing an electromagnetic signal of data transmitted and received between communications units or between other internal units;

FIG. 16A is an explanatory diagram showing one example of table that defines the relationship between character data stored in a storage unit in the portable information processing apparatus and a function program relating to characters and FIG. 16B is an explanatory diagram showing one example of table that lists the character data stored in the storage unit in the portable information processing apparatus, display locations on a screen, menu formats, and modes;

FIG. 17A is an explanatory diagram showing one example of background screen character data stored in the storage unit in the portable information processing apparatus, and FIG. 17B is an explanatory diagram showing one example of icon character data stored in the storage unit in the portable information processing apparatus;

FIG. 18 is a flow diagram showing a control process executed by the control system;

FIG. 19 is a flow diagram showing a process A in the flow diagram of FIG. 18 in detail;

FIG. 20A is a flow diagram showing a step 3 in the flow diagram of FIG. 18 in detail, and FIG. 20B is a flow diagram showing the step 3 in the flow diagram of FIG. 18 in detail;

FIG. 21A is a flow diagram showing steps 32 and 42 in the flow diagram of FIGS. 20A and 20B in detail, FIG. 21B is a flow diagram showing in detail one example of process to execute the steps 32 and 42 in the flow diagram of FIGS. 20A and 20B, and FIG. 21C is a flow diagram showing in detail one example of process to execute the steps 32 and 42 in the flow diagram of FIGS. 20A and 20B;

FIG. 22 is a flow diagram showing an operational sequence taken by an operational system;

FIG. 23A is a schematic view showing one example of display screen of another embodiment of the present invention, and FIG. 23B is a schematic diagram showing the standard screen of the display unit of the display device of FIG. 23A;

FIG. 24 is an explanatory diagram showing a high-level layer menu group, low-level layer menu group, and setting display screens, which are step by step presented on the display device of FIGS. 23A and 23B under the control of its control system;

FIG. 25A, FIG. 25B and FIG. 25C are schematic views of screens presented on the display unit of the display device of FIGS. 23A and 23B;

FIG. 26A and FIG. 26B are schematic views of screens presented on the display unit of the display device of FIGS. 23A and 23B;

FIG. 27A, FIG. 27B and FIG. 27C are schematic views of screens presented on the display unit of the display device of FIGS. 23A and 23B;

FIG. 28A, FIG. 28B and FIG. 28C are schematic views of screens presented on the display unit of the display device of FIGS. 23A and 23B;

FIG. 29A, FIG. 29B and FIG. 29C are schematic views of screens presented on the display unit of the display device of FIGS. 23A and 23B;

FIG. 30A, FIG. 30B and FIG. 30C are schematic views of screens presented on the display unit of the display device of FIGS. 23A and 23B;

FIG. 31 is a schematic view of screens presented on the display unit of the display device of FIGS. 23A and 23B;

FIG. 32A is a flow diagram showing an operational sequence taken by the operational system in the display device of FIGS. 23A and 23B, FIG. 32B is a flow diagram that is a detail of the step 101 in the flow diagram shown in FIG. 32A, and FIG. 32C is a flow diagram that is a detail of the step 104 in the flow diagram shown FIG. 32A;

FIG. 33A is a schematic view showing one example of display screen according to another embodiment of the display device of the present invention, and FIG. 33B is a schematic diagram showing the standard screen of the display unit of the display device of FIG. 33A;

FIG. 34 is an explanatory diagram showing a high-level layer menu group, low-level layer menu group, and setting display screens, which are step by step presented on the display device of FIGS. 33A and 33B under the control of its control system;

FIG. 35 is a schematic view of screens presented on the display unit of the display device of FIGS. 33A and 33B;

FIG. 36A through FIG. 36D are schematic views of screens presented on the display unit of the display device of FIGS. 33A and 33B;

FIG. 37A through FIG. 37D are schematic views of screens presented on the display unit of the display device of FIGS. 33A and 33B;

FIG. 38 is a schematic view of screens presented on the display unit of the display device of FIGS. 33A and 33B;

FIG. 39A and FIG. 39B are schematic views of screens presented on the display unit of the display device of FIGS. 33A and 33B;

FIG. 40A, FIG. 40B and FIG. 40C are schematic views of screens presented on the display unit of the display device of FIGS. 33A and 33B;

FIG. 41A and FIG. 41B are schematic views of screens presented on the display unit of the display device of FIGS. 33A and 33B;

FIG. 42A, FIG. 42B and FIG. 42C are schematic views of screens presented the display unit of the display device of FIGS. 33A and 33B;

FIG. 43A is a flow diagram showing the operation sequence taken by the operational system in the display device of FIGS. 33A and 33B, FIG. 43B is a flow diagram that is a detail of the step 131 in the flow diagram of FIG. 43A, and FIG. 43C is a flow diagram that is a detail of the step 134 in the flow diagram of FIG. 43A;

FIG. 44 is a schematic view showing the display screen of another embodiment of the display device of the present invention;

FIG. 45 is an explanatory diagram showing a high-level layer menu group, low-level layer menu group, and setting display screens, which are step by step presented on the display device of FIG. 44 under the control of its control system;

FIG. 46A and FIG. 46B are schematic views of screens presented on the display unit of the display device of FIG. 44;

FIG. 47A and FIG. 47B are schematic views of screens presented on the display unit of the display device of FIG. 44;

FIG. 48A through FIG. 48F are schematic views of screens presented on the display unit of the display device of FIG. 44;

FIG. 49A through FIG. 49F are schematic views of screens presented on the display unit of the display device of FIG. 44;

FIG. 50A through FIG. 50F are schematic views of screens presented on the display unit of the display device of FIG. 44;

FIG. 51A through FIG. 51F are schematic views of screens presented on the display unit of the display device of FIG. 44;

FIG. 52A is a schematic view of display screen according to another embodiment of the display device of the present invention, and FIG. 52B and FIG. 52C are schematic views showing screens presented on the display unit of the display device of FIG. 52A;

FIG. 53A through FIG. 53D are schematic views showing screens presented on the display unit of the display device of FIG. 52A;

FIG. 54A, FIG. 54B, and FIG. 54C are schematic views showing screens presented on the display unit of the display device of FIG. 52A;

FIG. 55A, FIG. 55B and FIG. 55C are schematic views showing screens presented on the display unit of the display device of FIG. 52A;

FIG. 56A, FIG. 56B, and FIG. 56C are schematic diagrams showing a network composed of a portable information processing apparatus of the present invention and a personal computer, in which data synchronization is established; and FIG. 57A is a schematic view showing one example of the menu screen in a conventional display device, and FIG. 57B is a schematic view showing another example of the menu screen in the conventional display device.

DESCRIPTION OF THE PREFERRED EMBODIMENTS

Referring to the drawings, the embodiments of display device of the present invention are now discussed.

First Embodiment
General System Structure

FIG. 4 and FIG. 5 show a preferred example of a system in which the present invention is implemented. This system includes at least one user terminal or PDA of wrist-fastened portable apparatus 2 (a first information processing apparatus), and a personal computer (hereinafter referred to as PC) that provides predetermined service (a second information processing apparatus). A network is built to establish communications between PC 1 and the portable apparatus 2. PC 1 is installed at home or in a plant, and the portable apparatus 2 is strapped about the wrist of a user.

PC 1 is a known high-performance computer, and, as shown in FIG. 5, includes internally a timing unit 11 for counting time, a storage unit 12 for storing a variety of data, a display unit 13 for displaying data, an operation unit 14 for manipulating a plurality of types of information displayed on the display unit 13, a communications unit 15 for transmitting and receiving information to and from other information processing apparatus such as the portable apparatus 2, a voice output unit 16 for outputting voice information, a voice input unit 17 for inputting voice information, and CPU 18 for controlling these units.

The storage unit 12 stores software dedicated to the operation of PC 1, a diversity of programs such as dedicated application programs for producing unique screens of the present invention, a Web browser for downloading data to the portable apparatus 2, and other data including protocols.

The software for producing unique screens is preferably formed in a dedicated PC card, independently of the memory area of PC 1.

Data Synchronization

Although the portable apparatus 2 is independently used, it may be also used in synchronization with PC 1 in a system.

To assure data synchronization, a variety of methods are contemplated. For example, formed in PC 1 and the portable apparatus 2 are unshown data update means which compare the data of the portable apparatus 2 with the data of PC 1 to give a command for data update or data synchronization. In this case, the data update means is preferably arranged in each of the communication unit 15 on PC 1 and in the communication unit 25 on the portable apparatus 2 in the block diagram shown in FIG. 5.

In another data synchronization method, PC 1 downloads the data stored in the storage unit 12 to a storage unit 22 in the portable apparatus 2 in response to a request from the portable apparatus 2 at the moment the system is switched on at power on of the portable apparatus 2. When the need for data update arises, the data in the storage unit 12 in PC 1 is rewritten. When the portable apparatus 2 is switched on again later, the portable apparatus 2 is set to the same state based on the updated data.

In this way, when basic data input or data update is carried out in either PC 1 or the portable apparatus 2, the portable apparatus 2 or PC 1 is automatically updated. In this embodiment, the user automatically synchronizes the apparatuses 1 and 2 even if the two apparatuses are separated by a large distance.

When PC 1 edits, on its display unit 13, the content on a display unit 23, an image of the portable apparatus 2 appears on part of the screen of the display unit 13 in PC 1 (FIG. 52). On PC 1, information is cut and pasted on its window so that the portable apparatus 2 captures a desired image. A fifth embodiment will describe this operation in more detail. When a PC card is built in PC 1, the display can advantageously be viewed.

In this system, the size of the display unit 13 on PC 1 is large, while the size of the display unit 23 on the portable apparatus 2 is small. The execution of a simple synchronization causes the display image on the PC 1 side to be simply presented on the portable apparatus 2 in a contracted display image. The following idea is implemented in this embodiment so that the display screens of the display unit 13 and display unit 23 present identical images to help the user naturally feel as if the two apparatuses are the same entity.

Specifically, a unique character pattern, different from that formed on PC 1, is formed on the portable apparatus 2. Regardless of similar images, the portable apparatus 2 presents a diversity of icons to the user in an easy-to-understand fashion. Making the character image for the background and icons identical, a user interface visually recognizable even to a novice user results.

Hardware Structure of the Portable Apparatus

FIG. 4 and FIG. 6 are external views of the portable apparatus 2. The portable apparatus 2 of this embodiment has a compact and light weight design so that it fastens about the wrist of the user. Specifically, the portable apparatus 2 includes a wrist attachment 20 (FIG. 4) fastening about the wrist of the user, a display unit 23 (the display means), connected to the wrist attachment 20 and constructed of an LCD display, for example, and an operation unit 24 (the operating means), surrounding the display unit 23, for operating the display screen in a diversity of operations.

The operation unit 24 includes a slider 24A (a first operation button), a sound recording button 24B (a second operation button), and a track point 24C (a third operation button).

As shown in FIG. 6, arranged on the right-hand side of the display unit 23 is the slider 24A which, as mode selection means, slides in directions represented by arrows A and B. The display unit 23 has, on its left-hand side, the sound recording button 24B for operating the voice input unit, and on its bottom side, the track point (trade mark by IBM) 24C which moves in directions represented by arrows C, D, E and F to move a cursor up, down, to the left and to the right on the display screen. The slider 24A slides once or several times, side to side, in the directions A and B to select one of a communication display mode (notify mode plus memo mode), a schedule display mode (calendar mode), and a database display mode (directory mode).

Referring to FIG. 5, the portable apparatus 2 includes CPU 28 controlling the operation of the portable apparatus 2, and the operation unit 24 and display unit 23 are connected to the bus line of CPU 28. The function of a display control unit illustrated in FIG. 12 and FIG. 13 is realized by the display drive function of CPU 28 and an unshown display interface in the display unit 23.

The storage unit 22 (storage means) is connected to the bus line of CPU 28. Referring to FIG. 14, the storage unit 22 includes a control module 22A for storing a management program and a real data module 22B for storing a variety of data. The real data module 22B will be described later in more detail. The data of the real data module 22B in the storage unit 22 is preferably stored in ROM, RAM or the like. In this case, the ROM includes a data memory that stores character data for icons, character (background image) data for the background screen of the menu, font data, location data that defines the location of each icon in the background image. The ROM also includes a program memory that stores a variety of programs including a program for menu presentation of this embodiment, functional programs that define a variety of functions of units, a boot program for driving CPU 28 to start the operation of the device, and predetermined display programs that are set in a first through fourth display setting units. When the portable apparatus 2 is switched on, CPU 28, under the control of the boot program, accesses the storage unit 12 in PC 1 to read the Web browser, a variety of communications protocols, and data, and to download them into the RAM.

The RAM stores input information, input for screen settings. The functions of the first through fourth display setting units are realized by the display setting function of CPU 28 and the function of an unshown memory interface arranged in the storage unit 22.

Also connected to the bus line of CPU 28 are a timing unit 21 for counting time, a voice input unit 27 (voice input means) and a voice output unit 26 with an unshown microphone.

Referring to the block diagram in FIG. 5, also connected to the bus line of PC 1 is a communications unit 25 performing communications with PC 1. The communications unit 25 includes an infrared communications (IRDA) section 25D for performing infrared communications, a radio communications section 25C for performing radio communications, a modem 25B connected to each of these units and having a modem function, a telephone 25E, and communications section 25A connected to the modem 25B and including the telephone 25E itself as a serial interface. The communications section 25A is connected to CPU 28. The infrared communications section (IRDA) 25D includes an infrared transmitter (port). The modem 25B is constructed as a soft modem through which CPU 28 receives serial bit strings. The modem 25B includes an infrared interface, and the process by the modem 25B and communications section 25A is carried out by CPU 28. With the above arrangement, the portable apparatus 2 has the capability of infrared communication and of transmission and reception of electronic mails.

CPU 28 connects to notification means 29B for notifying the user of information. The notification means 29B may be vibration generation means for drawing the user's attention with a stepwise increasing vibration, odor generation means for generating a stepwise increasing odor, tone changing means for changing the tone of an alarm in a stepwise fashion, light emitting means for emitting a light with its strength stepwise adjustable, discharge generation means for giving to the user a mild electric shock that is stepwise adjustable. CPU 28 also connects to battery power detector means 29A that detects the remaining power in a battery (power supply means).

Unshown detector means for detecting the angle of the display with respect to the horizontal may be optionally connected to CPU 28. CPU 28 behaves as a position switch control unit that turns on the power to the device in accordance with the detection result given by the detector means when the detected angle falls within a predetermined angle range, and turns off the power to the device when the detected angle is out of the predetermined angle range. In this way, by tilting the display device by a predetermined angle, the power is turned on and off. While the user does not watch the display screen of the display device, the power is turned off, stopping unnecessary presentation operations and saving power.

Display Screen of PC

One of the features of the present invention is that each icon presented on the display screen, having a plurality of types of functions, is pasted and presented along the same time axis. Since the display unit of the portable apparatus is smaller than the display unit of PC, the time axis on the portable apparatus is naturally shorter. Minimum required icons only can be displayed.

Referring to FIG. 1, the display screen of the display unit 13 is roughly divided into three layers: communications display areas 30, 40, schedule display area 50 (action), and database display area 60. The communications display area 30 is an area notify area for transitioning to a notify mode at a low-level layer in succession to the notification of information through the reception of an electronic mail or the like, and the communications display area 40 is a memory area for transitioning to a memo mode at a low-level layer for reading the content of a memo or the like. In the schedule display area 50, the schedule display mode and calendar mode for presenting the user's schedule are operative. The database display area 60 serves as an area in which the directory mode and database display mode at low-level layers for classifying the list and address book of senders of the electronic mails are opened.

In the communications display area 30, the sky metaphor is presented as the background screen. In the schedule display area 50, the ground metaphor is presented as the background screen. In the database display area 60, the underground metaphor is presented as the background screen. The communications display areas 30 and 40 display a plurality of carrier pigeon icons 31 lining up on an electric wire and having different shapes and colors, bird house icons 32, flower icons 41, and vase icons 42.

The carrier pigeon icon 31 is displayed as the metaphor for the electronic mail. When it is clicked by the operation unit 24, the content of the electronic mail is viewed. When the electronic mail is opened, a menu screen 34 at a low-level layer appears as shown in FIG. 2. The menu screen 34 is viewed by clicking "Recognize" tab 33B that is a pull-down menu under "Synfo" tab 33A shown in FIG. 2. The "Synchronize" tab is used for data synchronization.

The carrier pigeon icons 31 are chronologically arranged along the electric wire in the order of reception of the electronic mails on the time axis. The carrier pigeon icons 31 have different functions according to their configurations and colors. For example, a black carrier pigeon icon 31D signifies that the corresponding electronic mail needs urgent attention, and a white carrier pigeon icon 31C signifies that the corresponding electronic mail is important.

The bird house icons 32 have the function of classifying and storing the viewed electronic mails according to their content. Each bird house icon 32 stores a plurality of electronic mails. In this embodiment, a bird house icon 32A for work and a bird house icon 32B for personal use are available so that the user organizes and manages a plurality of electronic mails. In this way, a plurality of function-based icon information classified by function with a view to the content of the electronic mails are available. When the number of received electronic mails exceeds a predetermined number, namely, when the number of carrier pigeon icons 31 exceeds the predetermined number, the electronic mails may be stored in a single character bird house icon 32 (third icon information, for example).

The flower icon 41 has the function of storing information relating to a memo input through a hand writing with a pen. By clicking the flower icon 41, a post-it tab 43 on which a memo is written appears on the display screen. The post-it tab 43 is freely dragged to any location on the display area using the operation unit 24 regardless of the display areas. If the content of the memo is a time schedule, it may be pasted on a desired point on the time axis on the schedule display area 50. If the memo is unrelated to time and is a telephone number, for example, the post-it tab 43 is directly pasted on the sky of the display screen. By clicking the post-it tab 43 again, the screen reverts back to the original flower icon 41. The hand-writing character input in the post-it tab 43 is carried out by inputting a memo on a memo window 35 in a "post-it create menu" shown in FIG. 3. "Store post-it information" is selected and the post-it tab 43 may be dragged and pasted to a desired location.

The vase icons 42 are classified by function in accordance with the content of memos. A single vase icon 42 stores a plurality of flower icons, namely, information of the memos. Available in this embodiment are a New vase icon 42A, labeled "New", which stores a plurality of memos having relatively recently input information, a To-do-it list vase icon 42B which stores a plurality of memos having information that need to be processed in the future, and an Urgent vase icon 42C which stores information that needs to be handled urgently.

The number of flowers in the vase icon 42 represents the number of memos. In this display, the number of memos is grouped into one, two, and three and more, and three characters are prepared. When three memos or more are stored, the display unit 23 displays icons of "three flowers" even if the actual number of memos is 10. By limiting the number of character patterns, the memory capacity is saved and fast processing is permitted.

The schedule display area 50 displays the time axis extending to one direction on the display screen, and a schedule list 51 is positioned at its corresponding time. The post-it tab 43 is pasted, straddling the schedule display area 50 and the communications display area 30.

The database display area 60 is provided with input tabs for each database, clients 61, vendors 62, and personal 63. By clicking any of them, the tab is pulled to its respective low-level layer menus.

Display Screen of the Portable Apparatus

FIG. 7 shows one example of the display unit 23 in the portable apparatus 2. As shown in FIG. 6, the display unit 23 presents the time and date display on its default screen as a screen saver in addition to the three metaphors of sky, ground, and underground which are also presented on the display screen of PC 1.

With the slider 24A operated, a standard screen shown in FIG. 7 appears. The standard screen is divided into three areas (communications display areas 70 and 80, a schedule display area 90, and a database display area 100 shown in FIG. 7) having the same attributes as those of the three areas (the communications display areas 30 and 40, the schedule display area 50, and database display area 60 shown in FIG. 1) presented on the display screen on PC 1. By putting one of the three areas into a closeup view, the mode of that area is called.

In this example, each area has its own metaphor of the scene of the nature of the Earth. Specifically, the upper portion of the display unit 23 is the communications display areas 70 and 80 that display information coming in from or via PC 1. The background screen is set to represent the image of the sky, because one may tend to mentally associate the sky with a sudden weather change, which metaphorically matches a sudden incoming message in communication. The communications display area 70 is an area notify area for transitioning to a notify mode at a low-level layer in succession to the notification of information through the reception of an electronic mail or the like, and the communications display area 80 is a memory area for transitioning to a memo mode at a low-level layer for reading the content of a memo or the like.

Arranged in the middle portion of the display unit 23 is the schedule display area 50 in which the schedule display mode and calendar mode for presenting the user's schedule are operative. Since one may mentally associate the ground with a land over which people move around with the land surface compared with time, the background screen is set to represent the image of the ground.

Arranged in the bottom portion of the display unit 23 is the database display mode 100 in which the directory mode and database display mode at low-level layers for classifying the list and address book of senders of the electronic mails are opened. Since one may mentally associate the underground with something stable, the background screen is set to represent the image of the ground.

The area in use and the screen to be activated are enlarged and displayed. The area in use is presented in a high-contrast image, and the other areas are presented in a low-contrast image.

Referring to FIG. 8A and FIG. 8C, in the display unit 23, a plurality of icons of a diversity of animation characters (metaphors) matching the scene of the nature are assigned to the functions of programs, like the display screen on PC 1 as shown in FIG. 1. Specifically, carrier pigeons 73A displayed with the sky as the background in FIG. 8A represent electronic mails, flower icons 81A, 81B, and 82 shown in FIG. 8C represent voice memos and hand-written memos, a butterfly icon 110 shown in FIG. 9C represents a cursor. These icons 73A, 81A, 81B, and 82 have the same attributes as those of icons shown on the display screen on PC 1.

On PC 1, the character for each icon is high-definition bit-map data, and is also labeled with character information. On the portable apparatus 2, the character for each icon is relatively low-definition bit-map data, and more simplified than those on PC 1, and no character information is presented on screen. In this way, the portable apparatus 2 presents the icons of characters distinctly even if its display screen is as small as the display screen of a wristwatch. This feature preferably serves the purpose of compact design. A relatively small amount of bit-map data for the character data works, permitting the memory capacity of the portable apparatus 2 to be reduced, increasing available memory area in the control module at high-level addresses and at low-level addresses excluding the real data module in the storage unit 22, making use of memory for other information, and even contributing to high-speed processing.

When a function is assigned to an icon, a character of a carrier pigeon 73A, for example, is used. The user thus visually recognizes the function assigned to the icon at a glance. The function assigned to the icon by the operation unit may be changed as appropriate depending on the content of the screen.

Detail of the Modes

The hierarchical structure thus constructed is summarized in FIG. 10. As shown, in the apparatus, the standard screen is switched to one of the three modes (communications display mode, schedule (action) display mode (calendar mode), database display mode (directory mode)), or one of the four modes if the communications display mode is divided into two modes, notify mode and memo mode, using the slider 24A.

The communications display ares 70 and 80 arrange and display the carrier pigeons 73A, indicative of a variety of electronic mails received by the portable apparatus 2, in the order of reception.

As shown in FIG. 8A, the communications display areas 70 and 80 are enlarged and presented over the other areas using the slider 24A shown in FIG. 6. When a carrier pigeon 73A is clicked, the title of an electronic mail, namely, a window 74, is displayed. The window 74 includes the figure of the sender or the photograph of the sender's face 74A, the reception time 74d, the name of the sender 74b, and the icon 74c indicating that this is an electronic mail. Further operation permits the content of the electronic mail 75 to be displayed. The photograph of the sender's face 74a is automatically converted to the figure as necessary (text data to figure). In this way, a plurality of data is automatically converted to desired media.

When an electronic mail is received by the portable apparatus 2, the voice output unit notifies, in voice, the user of the arrival of the mail, while the display unit 23 displays the digest of the electronic mail and notification screen 74 on the standard screen with interruption priority.

The arrival of the electronic mail is reported to the user using voice, and other means such as tone of sound, vibration, odor, light, and electric shock may also be used. In such a case, tone change control means, vibration control means, odor control means, light quantity control means, color light control means, electric control means and their respective output means may be employed. The strength of notification may be varied depending on the operating conditions of the apparatus.

The carrier pigeon 73 has a configuration and color that are assigned thereto according to its function. For example, a black carrier pigeon signifies that the electronic mail needs urgent attention, and a white carrier pigeon 73C signifies that the electronic mail is important. A parrot icon 73B signifies a voice mail.

Referring to FIG. 8D, the title of a memo, namely, a window 83 indicating the time at which the memo was input is presented when a flower icon 82 is clicked. Further operation causes a window 84 of post-it format having a hand-written memo thereon to appear as shown in FIG. 8C. It is noted that the clicking of the flower icon 82 shifts the location of the pigeon icon to the top portion of the display screen.

The number of flower petals signifies the file size of the memo, namely, the amount of information of the memo, and the more the number of flower petals, the larger the amount of information becomes. Flower icons 81A and 81B having different configurations signify voice memos. In this embodiment, the amount of data, the degree of importance, the degree of urgency and the like are represented by the size, color, configuration, movement and flashing of icons. The icons are thus associated with significance, and are changed in accordance with the nature of data.

The schedule display area 50 is switched from one mode to another, each having its own time axis on a scale of hour, day, week or month. When the slider 24A is manipulated to switch to the schedule (action) display mode, the schedule display area 91A is expanded over the other areas as shown in FIG. 9A with the communications display areas 70 and 80 and database display area 100 contracted.

In the schedule display mode 90, the time axis on a scale of hour is displayed on the bottom portion of the screen. A schedule icon 92 for outputting a list of schedules in accordance with the time axis is pasted and displayed. The schedule icon 92 is accompanied by fonts indicative of the summary of its content.

The time axis 93A has a shaded open/reserved schedule display area 93A, and the background screen of the open/reserved schedule display area 93A is colored so that the user immediately recognizes at a glance what time the next plan comes. In this way, created or received display data is organized and managed on the time axis on the display screen. Without the need for a complex hierarchical structure, the display data is retrieved by time as a key. By shifting the data intentionally to certain time axis, it can be used as a schedule.

If a display screen 95 indicative of the past is colored with respect to the present time as a border line, the user will visually recognize how many hours there are from the present time to a scheduled time, and whether any schedule was over. In this embodiment, the display of the time axis and the color difference between past and future (or white and black in reverse presentation) helps the user to identify the difference immediately. The position of the present time is represented by a different color border. The user immediately discriminates between past, future and present events. The time axis on a scale of hour is accompanied by date.

The schedule display mode 90 presents four modes on the schedule display area: 5-hour view 91B (FIG. 9B) on a 5-hour scale for displaying a 5-hour schedule, a day view 91A (FIG. 9A) for a calendar on a day scale, a week view 91C (FIG. 9C) for displaying a calendar on a week scale, and a month view 91D (FIG. 9D) for displaying a calendar on a month scale.

In the week view 91C displaying one week schedule, a schedule icons 92 include two types: icons 92A shown in black and hatched icons 92B. The two types of icons help the user discriminate the contents of schedule.

The track point 24C is used to move the cursor 110. With the cursor 110 moving, the display screen of calendar is scrolled back and forth in the direction into the past or into the future. Along with the scrolling action, the operation unit 24 expands or contracts (zooms) the time axis to adjust time scale on the time axis as shown in FIG. 9B.

The display content is expanded or contracted along with the scale of the time axis. The displayed range is automatically varied in step with the scale of the time axis in its zooming (5-hour, 12-hour, and one-week schedule). As the time axis is expanded or contracted, small-size data accompanying each schedule can be seen (as shown in FIG. 9B when expanded) or cannot be seen (as shown in FIG. 9D when contracted). Even when contracted, the user roughly estimates how busy the user is, referring to the compactness of the schedule chart. The scale adjustment of the time axis is carried out at each unit of time (at each of the layers of month, week, day, hour). Optionally, means may be provided to color a selected particular date or to change the luminance of the selected particular date. Since the time axis moves with time, the chronological relationship of an event of interest to the present time is distinctly recognizable.

As shown in FIG. 9C, the cursor 110 is represented by the butterfly metaphor so that the cursor 110 is visually strongly recognized. The cursor 110 is preferably designed to flutter about when an input comes in through the operation unit 24. To this end, based on a random number from an unshown random number generator, the present position and movement pattern of the butterfly on the screen are computed for the butterfly to move irregularly. The state of the cursor 110 is changed during movement. For example, the display of the cursor 110 flashes on and off during movement. The cursor 110 changes according the nature of data, for example enhancing itself by its movement or flashing. Conversely, the butterfly may flutter about as in a screen saver when there is no input through the operation unit 24.

The database display area 100 displays alphabet fonts, for example, ABCD . . . . The user selects the name and address of a desired person, a company name, and the like using alphabets.

When the alphabet D is selected as shown in FIG. 8E, part of the group of data, a first letter of which is the D, is displayed on a window 102. When the window 102 is opened, the database display mode 100 is expanded and displayed over the other areas with the communications display areas 70 and 80 and schedule display area 90 contracted.

By manipulating the operation unit 24, a personal data display screen 103 presents a list of information relating to Dale, for example, a telephone number or fax number of Dale's employer's office, as shown in FIG. 8F.

If no mode is presented, namely, if there is no input through the operation unit 24 for a fixed period of time, the display unit 23 presents a default screen as a screen saver. As necessary, the communications display area may be closed, or may be presented in black as if the eyelid were closed.

Software Structure of the Portable Apparatus

FIG. 12 is a block diagram of the portable apparatus that implements the above-described hierarchical structure. As shown, the display control system for setting the modes includes the operation unit 24, voice input unit 27, first through fourth display setting units 210A–210D, display control unit 260, display unit 23, voice output unit 26, and voice output control unit 270 (voice output control means). The operation unit 24 is connected to the first through fourth display setting units 210A–210D and outputs to them information for the selection of screens on the display unit 23 and for the setting of a variety of information. In this embodiment, the operation unit 24 is composed of the track point 24C and its associated interface. When the track point 24C is moved up, down, to the left, or to the right, the cursor moves accordingly on the screen under display controlling to be described later. By clicking the cursor, any menu presented on screen is selected.

A detail of the first through fourth display setting units 210A–210D is now discussed referring to FIG. 12.

The first display setting unit 210A sets display information that is the default screen subsequent to power on wherein the font data indicative of time is added onto the background screen with a particular metaphor presented thereon. By manipulating the slider 24A, the apparatus goes to the standard screen.

The second display setting unit 210B sets, as the display information, a group of high-level menus composed of four areas. In this embodiment, available are the four modes of "notify", "memo", "calendar" and "directory". The four modes are displayed as shown in FIG. 7, namely, in the order from top to bottom, the notify mode 70 on the top portion of the display, the memo mode 80 on the upper side of the middle portion of the display, the calendar mode 90 on the lower side of the middle portion of the display, and the directory mode 100 on the bottom portion of the display. The group of four modes is presented on the standard screen subsequent to the default screen at power on. When one of the four modes is selected by manipulating the slider 24A, the display area of the selected mode is expanded and displayed.

By manipulating the track point 24C, the cursor is moved on the standard screen to select one of the four modes. The selected information is issued from the second display setting unit 210B to the third and fourth display setting units 210C and 210D.

Displayed in an icon display column are a diversity of icons including icons 73A, 81, and 83 in the notify mode and memo mode on the standard screen. Displayed on the calendar mode is the time axis on a scale of time. If there is any plan on the time axis, the background of an open/reserved schedule display color area is colored. In the directory mode, first letters which are used to retrieve the database are arranged in alphabetical order A, B, C, D, E . . . in an alphabetical font display column. A single icon or a single letter is selected from these icons, letters A, B, . . . by moving the cursor on the screen with the track point 24C. The selected information is issued from the second display setting unit 210B to the third and fourth display setting units 210C and 210D.

The third display setting unit 210C sets, as the display information, a plurality of low-level menus, if exist below the high-level menu such as the icon and character that are selected and output by the second display setting unit 210B. FIG. 8 and FIG. 9 show one example of low-level menu group. For example, when the carrier pigeons 73A are selected in the second display setting unit 210B, the third display setting unit 210C sets, as the display information, the electronic mail column 75 (FIG. 8B) for the low-level menu group. These low-level menu groups are displayed on a window that is opened on the standard screen on the display unit 23 in response to the driving by a display drive unit.

By manipulating the track point 24C further, the cursor is moved on each mode screen to select low-level menus in each mode screen. The selected information is issued from the third display setting unit 210C to the fourth display setting unit 210D.

In response to the output from the second (third) display setting unit 210B (210C), the fourth display setting unit 210D sets, as the display information, the display screen corresponding to the selected high-level menu (if not associated with its low-level menu) or the low-level menu, or display setting screen.

When the fourth display setting unit 210D sets the screen, the display drive unit displays a lower level menu screen on the display unit 23 instead of the mode screen.

Specifically, when the third display setting unit 210C selects, in the calendar mode, the 5-hour view 91A followed by the clicking of the schedule icon 92, the content of the corresponding schedule is displayed.

When the third display setting unit 210C presents a name list display screen 102 (FIG. 8E) in the directory mode, the fourth display setting unit 210D can present a personal data display screen 1103 (FIG. 8F).

A variety of information corresponding to each selected menu item may be input using a track ball. Information set by the manipulation of the track ball is superimposed on the setting screen shown on the display unit 23 so that the user may verify the information input and set.

If there are a plurality of low-level menus, fifth, sixth, . . . , display setting units may be formed.

Display Setting Unit

Referring to FIG. 3, a detail of each display setting unit 210 is discussed. As shown, the display setting unit 210 includes a data processing unit 230 for processing the body of data, chiefly, in accordance with timing information from the timing unit 21 and communications information from the communications unit 25, UI processing unit 240 for generating the background image and character data for icons on the display screen, based on the data from the data processing unit 230 and operation input from the operation unit 24, for setting the display screen itself, and for processing the user interface, the storage unit 22 for storing the data processed by the data processing unit 230 and the data processed by the UI processing unit 240. The data processing unit 230 and UI processing unit 240 communicate with each other in connection with the inputs from the operation unit 24.

The data processing unit 230 includes processing sections in accordance with the functions of a diversity of applications, such as a mail processing section 230A for processing the data of a mail, a memo processing section 230B for processing the data of a memo, a database data processing section 230C for processing the data of a database, and a voice memo processing section 230D for processing the data of a voice memo.

The types of information to be processed by the data processing unit 230 include the communications information from the communications unit 25, the timing information from the timing unit 21, and the input and output information based on the operation of the operation unit 24. The communications information includes, for example, electronic mail information transmitted and received through the communications unit 25, and reception time information concerning the reception time of the electronic mail contained in a header accompanying the electronic mail. The reception time information and the electronic mail information are paired in a set as the communications information and are stored in a data management unit 220 in the storage unit 22. When the communications information is voice information, the voice communications information includes reception time information of the voice mail information, contained in a header accompanying the voice mail information.

The input and output information is a set of information including the schedule information containing a schedule, designated time information, which is contained in a first header of the header section of the schedule information and at which the user designates scheduled execution time of the schedule of the schedule information, and operation input time information which is contained in a second header of the header section of the schedule information and is input by the user in accordance with the timing unit 21. The set of input and output information is stored in the data management unit 220 in the storage unit 22. When the input and output information is voice information, the voice input information includes voice memo information containing a voice memo, and input time information, which is contained in the header section of the voice memo information and at which the user input the voice memo information.

The UI processing unit 240 includes content analyzing unit 242 for analyzing the content of data, accompanying the data body processed by the data processing unit 230 and including reception time, file size, and the number of files in the header section, an update processing unit 244 for updating the display screen in response to the timing information from the timing unit 21 and the operation input from the operation unit 24, a background screen character data control unit 250A for creating the background screen, an icon character data control unit 250B for creating icon information, a font data control unit 250C for creating character data, and an image synthesizing unit 252 containing state hold section for synthesizing data from one of the data control units 250A–250C.

The content analyzing unit 242 has analysis functions for a variety of data, including a header analyzing section 242A for analyzing the contents of a plurality of headers 1, 2, . . . in the header section, a file size analyzing section 242B for analyzing the content of the file size, a file count analyzing section 242C for analyzing the number of files. The header analyzing section 242A functions as a header analyzing section for the reception time when the header section contains the reception time information, and functions as a header analyzing section for the designated time when the header section contains the designated time information.

In response to a control signal from an operation input control unit 280, a background screen character data control unit 222A (metaphorical environment creating means) receives the process result from the data processing unit 230, and creates a background screen using metaphors (character data) that imitate scenes and events the user may encounter in daily life in the real world, and outputs the background screen to the display unit 23.

An icon display character data control unit 222B receives the analysis result from the content analyzing unit 242 and issues a command for an update in the operational state of the display screen to the image synthesizing unit 252 in accordance with the data (for selecting a function among a group of prepared functions) from the storage unit 22. For example, when the header section contains the reception time information, the icon display character data control unit 222B displays its icon display character data in a data storage unit 222, onto the display screen on the display unit 23 in the order of reception, based on the analysis result (of comparison of reception times) from the header analyzing section 242A. When the header section contains the designated time information, the icon display character data control unit 222B displays its icon display character data in the data storage unit 222, onto the display screen on the display unit 23 in the order of scheduled times, based on the analysis result (of comparison of scheduled times) from the header analyzing section 242A.

The electronic mail information, for example, includes text data that is the body of data, and accompanying data that accompanies the text data and is contained in the header section of the electronic mail. The accompanying data includes the reception time and file size, for example. The content analyzing unit 242 determines whether accompanying data is present, while extracting the accompanying data, for example, the reception time data if it is present. The header analyzing section 242A (for the reception time analysis) and the file size analyzing section 242B (for the amount of data analysis) analyze the accompanying data referring to characteristic extensions such as TXT, GRP graphics, Exls, because the file of the accompanying data is contained in the header section.

The icon display character data control unit 222B extracts information in this way. If the mail needs urgent attention, the icon display character data control unit 222B picks out the corresponding character and reflects it in an object.

The image synthesizing unit 252, containing the state hold section, holds the present operational state, and outputs it to the display unit 23 via the display control unit 260.

The storage unit 22 includes the data management unit 220 for storing the data processed through the data processing unit 230, and the data storage unit 222 for storing the data processed through the UI processing unit 240.

The data management unit 220 includes a mail data memory 220A for managing the data that process an address book, a memo data memory 220B for managing the data of memos, a voice memo data memory 220C for managing the data of voice memos, . . . .

The data storage unit 222 includes a background screen character memory 222A for storing a plurality of background character data (time axis, sky metaphor), an icon character memory 222B for storing icon character data for a plurality of icon information, and a font data memory 222C for storing a plurality of font data. The background screen character memory 222A stores a display image of a metaphor such as a sky metaphor in which the scene of the sky is shown.

The data storage unit 222 in the storage unit 22 includes a metaphor rule accumulator besides the background screen character memory, icon character memory and the font data memory. The metaphor rule accumulator accumulates a metaphor rule that states the handling rule of metaphor, such as the range of movement of characters and display method in an operating environment, for example, of the sky metaphor constructed of characters representing the scene of the sky.

The operation input control unit 280 includes a variety of control sections for different functions, such as an input control section 280A (voice input control means) for controlling the transmission of the voice input information from the voice input unit 27 to the data processing unit 230 in accordance with an operation input from the operation unit 24, a key input assignment control section 280B for controlling the correspondence of a plurality of operation buttons 24A, 24B, 24C, . . . to the icon information and cursor on the display unit 23, a data input control section 280C for causing the input information such as a hand-written character input, other than the voice input information, to correspond to the font on the display unit 23, a screen hierarchy control section 280D for switching the hierarchical layer of the display screen (between high-level one and low-level one) to select one layer for presentation, a mode switching control section 280E for controlling the switching between modes on the display screen, a scale control section 280F for expanding or contracting the entire display screen or a particular area of the display screen (unit time intervals on the time axis are expanded or contracted and the size of the icon information is expanded or contracted along the scaling of the time axis), a scroll control section 280G for scrolling the display screen, and an icon movement control section 280H for controlling the movement of the icon information on the display screen. In response to the operation input from the operation unit, the mode switching control section 280E functions in a first mode for displaying the background display areas or in a second mode for enlarging and displaying one of the background display areas.

The data input control section 280C in the operation input control unit 280 has the function for detecting the position of input coordinates on the display unit 23 in response to the operation input, and outputs coordinates position data to the UI processing unit 240 depending on the operational state of the display screen.

Upon receiving the current state data from the image synthesizing unit 252, the display control unit 260 reads a required display image to construct a display screen and outputs it to the display unit 23.

The data management unit 220 is first storage means while the data storage unit 222 is second storage means.

In the data management unit 220, a plurality of types of information having different attributes, such as mail data (communications information) and memo data (input and output information) are classified by attribute and then stored in the mail data memory 220A, memo data memory 220B and voice memo data memory 220C. Besides display data, each memory stores a plurality of attribute information for identifying the type of a plurality of types of information, including, for example, an extension dedicated a mail data file, an extension dedicated to a memo data file, an extension dedicated to a voice memo data file. These display data are accompanied by a plurality of time information for a plurality of information. Besides time counted by the timing unit 21, the time information includes transfer time information transferred via the communications unit.

The plurality of types of information include first through N-th information having different attributes, for example, the communications information (electronic mail information and voice mail information) and the input and output information (schedule information, memo information, and voice memo information). The "attribute information" refers to such information as an electronic mail file, a memo file, a schedule file, and a voice memo file, for identifying the type of information among a plurality of types of information. One example of such attribute information is an extension for identifying the file format of a file system. The present invention is not limited to this.

The icon character memory 222B in the data storage unit 222 stores a plurality of types of icon information corresponding to a plurality of attribute information. The background screen character memory 222A stores time axis display data for displaying the time axis, background display data for displaying the time axis display area as a background display image, background screen coloring data for coloring the background of the time axis display area, time axis coloring data for coloring a time area corresponding to the time axis of the icon information, and first through N-th background screen character data for displaying first through N-th display areas that display the icon information corresponding respectively to the first through N-th information.

The time axis display data includes first-layer time axis data for displaying a first layer that is graduated in hours, second-layer time axis data for displaying a second layer that is graduated in days, third-layer time axis data for displaying a third layer that is graduated in weeks, and fourth-layer time axis data for display a fourth layer that is graduated in months.

The display setting unit 210 selects the icon information corresponding to the attribute of the plurality of types of information in accordance with the attribute information, and arranges and displays the selected icon information on the display screen at corresponding time on the time axis in accordance with the time information of the plurality of types of information. A background screen creating unit is constructed of the background screen character data control unit 250A, as a background screen control unit, and the image synthesizing unit 252.

The first through N-th background screen character data include first and third background screen character data for presenting, respectively, a first display area for displaying the icon information corresponding to the communications information, a second display area for displaying the icon information corresponding to the schedule information, a third display area for arranging and displaying the icon information that is used to retrieve the plurality of types of information displayed in the first and second display areas, and fourth background screen character data for presenting a fourth display area for displaying the icon information corresponding to the input and output information.

Identification information for identifying and classifying the electronic mails by function (for work, something new, personal use) may be contained in the communications information so that it is freely transferred or may be stored in the storage unit.

The data management unit 220 stores information for creating the first through third background display areas on an area by area basis on the display screen in accordance with the first through third background screen character data to display the icon information on an area by area basis, database display information for arranging and displaying retrieval selection character information for retrieving the plurality of types of information using alphabets, retrieval program information for performing retrieval using at least a first letter of alphabets as a keyword, and information for retrieving the plurality of types of information using the retrieval program and for outputting retrieval result information.

When the plurality of types of information are electronic mail information transmitted and received through the communications unit 25, the header section of the electronic mail information contains the reception time information indicating the reception time. The control means 210 displays the icon information in the order of reception on the display screen in accordance with the reception time information.

When the plurality of types of information are memo information input through an operation input action, the header section of the memo information contains the input time information input through the operation input action. The control means 210 displays the icon information on the display screen in the order of creation in accordance with the input time information.

When the plurality of types of information are a TODO list, the header section contains the designated time information at which the user designates the scheduled execution time. The control means 210 displays the icon information on the display screen in chronological order of in accordance with the designated time information.

When the plurality of types of information are voice communications information (voice mail information) transmitted and received, the header section contains voice size information concerning the size of voice mail information. When the plurality of types of information are voice input information (voice memo information) having a schedule input in voice, the header section contains designated time information that designates a scheduled execution time for voice input information. The header section may also store other diversity of information.

In this way, the display device includes the first storage means, the second storage means, the display means, and the control means.

Display Process on the Menu Screen

Referring to FIG. 8A, there is shown one example of display screen. The background screen is expressed as the sky metaphor. The object in the background screen is constructed of the carrier pigeons 73A for urging the user to start an application program. The content analyzing unit 242 analyses the information, as the accompanying data, attached to the header section of the electronic mail, such as of the reception time and file size. In accordance with the reception time, file size and the like, the character data control unit 250 performs icon display processing on icons having different configurations and colors in consideration of the order of reception, typically indicating urgency, and the file size, based on the reception time and file size.

The user manipulates these objects by performing a selection operation (pointing action) using the operation unit 24.

When the carrier pigeon 73A is selected, the corresponding application (electronic mail related program) is initiated, and a display window (low-level menus and low-level command screen) of application is displayed.

When the user selects the carrier pigeon 73A with the operational environment (sky metaphor screen) presented on the display unit 23, the operation input control unit 280 detects the input coordinates corresponding to the display unit 23, and data (request to start the application) corresponding to the state of the present screen (that the carrier pigeon 73A is presented at a pointed location) is created. The data processing unit 230 receives the data via the character data control unit 250, selectively performs a corresponding process among application programs (the electronic mail related program), and outputs the process result (for example, the completion of the startup of the application).

The character data control unit 250 receives the process result from the data processing unit 230, and decides a corresponding screen display state by receiving the rule (concerning the startup of the application) stored in the metaphor rule accumulator (a font is synthesized and presented on the background screen by the font data control unit). The image synthesizing unit 252 updates the operational state in response to this command, and outputs a new operational state to the display control unit 260. In accordance with the new operational state, the display control unit 260 reads a required display image (application startup screen and the like), creates a display screen, and outputs it to the display unit 23. As a result of the selection of the carrier pigeon 73A by the user, the application startup screen is presented.

While the application is running, input to the application is carried out by a list selection on the display screen using the cursor or by an object selection using a soft button. Thereafter, a command is input for any processing by selecting an object on the display screen. When the execution of the application is completed, the window is closed, and the apparatus reverts back to the sky metaphor screen presented prior to the startup. The display screen thus presents a detail of the content of data and operational state in this way, helping the user visually recognize the selection of the application and the process by the application.

The operation unit 24 creates data (for example, an input to the application) in accordance with the new operational state received. The data is also received by the data processing unit 230, which in turn processes it as input data during the execution of the application. As a result, the font data control unit 250C calls font data corresponding to it, and the image synthesizing unit 252 updates its operational state (the display screen, for example), and updates the display on the display unit 23 via the display control unit 260.

When the user gives an input to end the application, the image synthesizing unit 252 also updates its operational state, the window is closed, and the apparatus reverts back to the sky metaphor screen (standard screen). The display control unit 260 receives the operational state updated by the image synthesizing unit 252, updates the character (including image update and movement) and outputs the update to the display unit 23. In this way, the operational state is visually presented to the user.

The sky metaphor provides an integrated operating environment, helping the user visually recognize the process of the application. The user thus easily understands the display content and the operation of the apparatus with daily common knowledge.

For example, to input a message onto a post-it 84 as shown in FIG. 8C, data is written in ink on another device such as a memo tablet, and is stored in a text file. The text file is transferred to the portable apparatus 2 via the communications unit 25, and is stored in the storage unit 22 using the data processing unit 230. Using the UI processing unit 240, the background screen character data control unit 250A creates the post-it display area 84, and the background screen character data control unit 222A synthesizes font data corresponding to the text data and displays it onto the post-it display area 84. The drawing on the tablet is stored in a BMD (bit-map data) format, for example. The information written on the tablet may be compactly drawn multiple lines drawing.

For example, to scroll the screen, the scroll control section 280G updates the update processing unit 244 in response to the operation of the operation unit 24, causing the display unit 23 to rewrite sequentially the display screen. With the background screen immobilized and with the present time set to be one hour earlier, the display screen may be redrawn. Specifically, the entire screen is once flushed, before a background screen is presented again. Data one hour earlier is created and a variety of characters are synthesized. The screen is moved in one direction, and the update process by the update processing unit 244 is repeated. In this operation, it is preferred that only the new portion of the display area to appear arising from the scrolling action is created. Specifically, the following display algorithm is preferred: the state of the common portion of the display area prior to and subsequent to the scroll motion is maintained; and subsequent to the scrolling action, the maintained screen is redrawn, and the newly added display area only is written.

When the color of the background screen with time schedule for an event is changed, the start and end times of the event need to be analyzed. Specifically, the start time and end time are attached to the data body as the accompanying data. The start time and scheduled time in combination may be attached to the data body as the accompanying data. Since a mail typically contains, in the form of a plurality of headers, a variety of data such as a list of participants, besides the degree of importance, the title and times of the event are concurrently displayed. In this way, the user recognizes how busy the user himself or herself is.

To expand or contract the display screen, the scale control section 280F and update processing unit 244 prepare a plurality of character patterns expanded or contracted, and update the display screen in response to the operation input from the operation unit.

Referring to FIG. 16 and FIG. 17, a variety of data tables for presenting menus are discussed in connection with the display process of the default screen presented at the power on and the standard screen.

FIG. 16B is a menu data table (Table 2), which includes menu name data for identifying each menu data, menu format data for pointing to the format of a menu to be displayed, background screen character data pointers BI1–BI7, . . . for indicating addresses in which the background screen character data shown in FIG. 17A is stored as the background for the menus, and position data indicating the location of the each icon in X and Y coordinates on the screen. Preferably, the menu data table also stores low-level layer menu number data indicating menus present in a next low-level layer, and icon number data indicating an icon presented on the menu.

The menu defined by the menu data table is the standard screen and the low-level modes below the menu. Icons corresponding to the functions of a schedular of this embodiment are displayed on a desk menu.

FIG. 16A shows an icon data table (Table 1) listing a plurality of icon data. The icon data table includes function name data listing the function name of each icon for identifying icon data, character data pointers DI1–DI11, . . . for pointing to addresses in which the character data for each icon shown in FIG. 17B is stored, and function program pointers for pointing to addresses in which are stored function programs F1–F9 shown in FIG. 14 that define the function corresponding to each icon.

The data tables for displaying the menus have been discussed. The display process is now briefly discussed.

When the menu format of a menu is an entire screen referring to the menu data table (Table 2 in FIG. 16B), the background screen character data (FIG. 17A) pointed by the background screen character data pointers BI1–BI7 is displayed over the entire screen. When the menu format is a pop-up menu, the window outline of the pop-up window is presented, and the background screen character data pointed by the pointers is displayed in the window. Referring to the icon to be synthesized in the menu table data (Table 2) and the icon position data, and referring to the character data (FIG. 17B) pointed by the character data pointers DI1–DI11 of the icon data corresponding to the icon, in the icon data table (Table 1), the icon to be displayed is assembled, and the assembled icon is arranged on screen in accordance with the position data (X1,Y1) in the menu data table.

When the icon is selected, a corresponding function program (F1–F9 in FIG. 14) is activated referring to the function program pointers F1–F8, . . . of the icon.

Mail Processing Unit

The mail processing section 230A in the data processing unit 230 includes unshown mail input and output means, mail transmission and reception control means, and destination list management means. The mail input and output means includes a mail creating unit for creating a new mail, a transmission operation unit for transmitting a mail, and a mail editing unit for modifying the destination list of mail. The mail transmission and reception control means includes a mail transmission unit for transmitting the mail in accordance with the destination list, and a mail reception unit for notifying the user that the mail is received. The destination list management means includes a destination list initializing unit for initializing the destination list, a destination list adding unit for adding a new destination to the list, and a destination list delete unit for deleting a destination.

In the PC, the display screen of the electronic mail system is constructed as shown in FIG. 2. The display screen window 34 is provided with columns for name 24a, title 34b, company name 34c, address of company 34d, office telephone number 34e, office fax number 34f, home telephone number 34g, home electronic mail address 34h, and comments 34i.

Data Structure

To present the above window, the mail data memory 220A in the data management unit 220 in the storage unit 22 stores data handled by programs. Its data structure is now discussed. FIG. 14 shows the hierarchical structure of the data stored in the mail data memory 220A.

The storage unit 22 includes the control module 22A for storing the management program, the data storage unit 222 for storing application programs F1–F9 including an electronic mail related program F1, a variety of tables including above Tables 1 and 2, character data 222A and 222B, and font data 220C, and the data management unit 220.

When the storage unit 22 forms an information storage medium of the present invention at least for storing information required to create a display screen, a variety of information at least shown in FIG. 14 is sufficient.

In this case, a plurality of pieces of attribute information for identifying the type of information among a plurality of types of information, and a plurality of pieces of time information concerning the plurality of types of information are stored in the header sections. A plurality of types of icon information corresponding to the plurality of pieces of attribute information are stored as the icon character data 222B and the time axis display data for displaying the time axis is stored as the background screen character data 222A. Stored as the management program 22A is information for controlling the display on the display screen so that the icon information corresponding to the attribute of the plurality of types of information is selected in accordance with the attribute information and so that the selected icon information is arranged at the corresponding time on the time axis.

The data management unit 220 includes the mail data memory 220A, memo data memory 220B, voice memo data memory 220C and so on.

The mail data memory 220A includes a plurality of files 1, 2, . . . , and each file includes a header section of 220A-1, 220A-2, 220A-3, . . . , and a real data section 220A-15 containing the content of a mail. The header section 220A includes a header 1 (220A-1) bearing reception time information, a header 2 (220A-2) bearing file size information, and a header 3 (220A-3) bearing name (ID) information.

The mail data memory 220A is formed for each node in the display window shown in FIG. 2, and is arranged in the storage unit 22. Specifically, the mail data memory 220A is constructed of entries for the file size, the time and date of reception, the name (ID), the bit-map data for the photograph (figure) of the sender's face, the position of the photograph of the face on screen, the size of the photograph of the face, the time and date of mail opening, the time and date of transmission, the position of the mail display window on screen, the size of the mail display window, the position of the time display in the lower column of the mail display window, the size of the time display area, the size of time display character, the size of character (font) of the mail content, the real data (data body) for the mail content, the senders' list, the list of destination information (address book, destination address, and the like), attributes, a pointer to an icon, and comments. In this embodiment, these pieces of accompanying information other than the real data (data body) are respectively assigned to the header 1, header 2, . . . , and the header analyzing section 242A analyzes the contents of these pieces of accompanying information.

The variety of tables preferably include a (mail display screen) window management table, a destination list management table, and the like.

The name (ID) is the identifier for each user, and is typically the user's name or nickname. The destination address is the address to which a mail is transmitted. In the electronic mail, the electronic mail address is intended to designate a storage location in the storage unit, and the user accesses the storage location to monitor the electronic mail arrival status to the user. The time and date of mail opening is provided by a real time clock in the timing unit 21, and is the ones at which the user viewed the received mail for the first time. The time and date of transmission are those at which the received mail was transmitted (transferred or returned) according to the predetermined destination list. The attributes include a flag indicating whether the recipient, who is a node corresponding to a data set, is able to edit the destination list, or a flag indicating whether the recipient is present or absent. Set in the coordinates and sizes are coordinates of character strings and icons, shown in the node corresponding to the data set, within the display window and the sizes of the character strings and icons. Set in the pointer to the icon is a pointer pointing to an area that stores the image of an icon (image information and character data) indicating the node corresponding to the data set shown in the display window. An input comment is set in the comments. The number of entries may be variable.

The window management table is a collection of data sets for displaying a group of windows on the display screen, and is stored in the storage unit. The window management table includes items for a window name, the coordinates of the window, and the width and height of the window expressed in the number of pixels, and includes a collection of data sets corresponding to items of a message display window and an address book display window.

The mail data memory 220A holds the destination list management table. The destination list management table contains a variety of information about all registered users, and the variety of information held is viewed in a list from the window. This table has items for names and destination addresses, and is constructed of a collection of data sets corresponding to the above items concerning the registered users.

Operation of the Portable Apparatus

FIG. 18 is a flow diagram showing the operation of the portable apparatus. When the portable apparatus is switched on for startup, CPU, under the control of a boot program stored in the storage unit, accesses the PC via the communications unit, and reads an OS, a protocol, and other required data stored in the storage unit.

The portable apparatus 2 presents the default screen shown in FIG. 6, for example. When the portable apparatus 2 goes to the standard screen, the icons to which functions are assigned based on the data are displayed in the display area as the characters. The user quickly visually recognizes each function. An easy-to-use portable apparatus is thus provided. In this embodiment, the displayed characters are a still image. Alternatively, the characters may be displayed as a moving image.

At power on, the default screen is presented (step S1). In response to the operation in the operation unit (S2), the standard screen is presented (S3). The presentation of the standard screen is carried out based on the display information from the first display setting unit 210A shown in FIG. 12. Specifically, CPU 28 shown in FIG. 2 calls the display information, corresponding to the standard screen, stored in the storage unit 22, and then transfers the display information to the display unit 23.

The standard screen is shown in FIG. 7, and permits one of three divided high-level menus to be selected.

In step S3 where the standard screen is presented, in more detail, the processes illustrated in flow diagrams in FIG. 20A and 20B are carried out. When any operation input comes in, the screen needs to be updated. A determination is made of whether the standard screen needs updating (S30). A background display process for updating the background screen is performed (S32). Since the background display process is the one for creating the standard screen, the background screen character data BI1–BI7, . . . shown in FIG. 17A are pasted on a particular location to control the displaying.

If the answer to the test "mail present?" is "YES" (S33), a window shown in FIG. 8A is presented on the display screen to notify of the information (S34). Since the notification is performed only when a mail arrives at the portable apparatus, a determination is made of whether it is an initial (first) display (S34a). The photograph of the mail sender and topics are displayed temporarily for a predetermined duration of time, for example, for 1 second, and the display then is automatically removed (S34b).

The mail is analyzed (S35). The data, namely, the content of the mail coming in through communications, is processed (S35a). The data is stored in the mail data memory 220A in the data management unit 220 in the storage unit 22. Referring to an electromagnetic wave in FIG. 15, the incoming data includes a plurality of headers (220A-1, ..., 220A-N), and a variety of information (for example, the name of mail sender, the time and date of reception) contained in the headers (220A-1, ... 220A-N) are read by the header analyzing section 242A. Since the file size information also accompanies these, file size analysis is also carried out (S35*c*).

The mail sender's name and the like are also analyzed during the analysis of the header sections, though the analysis process for them is not detailed here.

The background screen character data control unit and icon character data control unit shown in FIG. 13 select, for example, the bit-map image of pigeon icons from among a plurality of characters constructed of the bit-map image stored in the storage unit, and synthesize and display the pigeon icons on the background screen (S36).

A determination is made of whether there is further mail (S37). When there is a further mail, steps S34–S36 are repeated. When there is no mails any more, a standby state is entered until an update comes in (steps S30 and S31 are cycled through). The program waits until a next key input takes place. When these steps are repeated until no mails are present, the pigeon icons line up side by side on the display screen.

In S35, the degree of urgency is defined by the reception time. For example, the rule that a red pigeon icon is pasted for a high degree of urgency while an ordinary pigeon icon is pasted for a low degree of urgency may be established. The header analyzing unit imparts a low degree of urgency to a mail that came in prior to certain past time before the present time and imparts a high degree of urgency to a mail that came in subsequent to the certain past time. In accordance with the analysis result, the character data control unit synthesizes the icon of the desired character on the display screen.

The header section contains the information of the time at which the electronic mail was written. Based on the information, pigeon icons are pasted in chronological order at the desired location on the time axis.

Like the electronic mail, a determination is made of whether the standard screen needs updating (S41) in memo. A background display process for updating the background screen is performed (S42).

If the answer to the test "memo present?" is "YES" (S43), a post-it window shown in FIG. 1 is presented on the display screen (S44).

A determination block "what type of memo?" may be contained in S43.

The content analysis, like the one in step S35, is carried out (S45). Specifically, the information about the time at which the memo was written is contained in the header section, and the post-it is pasted at a desired position on the time axis. If the data includes text data, the font data control unit extracts the font data corresponding to it from the font data memory and the data processing unit and outputs the font data to the image synthesizing unit. The font data memory holds font data such as 1234 ..., ABCDE..., and the font data control units collects the font data one by one from there and pastes it on the post-it, thereby outputting character information (S46). The font memory stores not only Mincho fonts and Gothic fonts but also a variety of fonts looking like a hand-written letter.

A determination is made of whether further memos are present (S47). When there is a further memo, steps S44–S46 are repeated. When there is no mails any more, a standby state is entered until an update comes in (steps S40 and S41 are cycled through). When these steps are repeated until no mails are present any more, the post-its are arranged side by side on the display screen as shown in FIG. 1.

To synthesize and display a diversity of icons for different types of information, such as memo icons, schedule icons, and voice memo icon, the same procedure works. No further discussion is provided for this process.

In accordance with the file size analysis, the icon character data control unit selects a flower icon having a large number of petals for a file equal to or greater than a threshold size and selects a flower icon having a small number of petals for a file smaller than the threshold size. Icons having a large number of petals and icons having a small number of petals are thus synthesized and displayed on the display screen.

The time axis is presented on the standard screen in the background display processes in steps S32 and S44 in this embodiment. Referring to a flow diagram in FIG. 24A, the control flow for creating the time axis is discussed.

When screen updating, such as scrolling, expansion, contraction, and mode change, is performed (S50), the display area (display scale) in a standard size presented on the display screen is determined (S51), and the time axis is synthesized and displayed at the standard size on the background screen (S52). The present time is checked (S53), and times labeling one end and the other end of the time axis on the display screen and the location of an arrow indicating the present time are determined, based on the display scale and the present time (S54). The background screen corresponding to the past time from the present time is colored and displayed (S55). The timing unit causes the present time to update every moment. In step with the present time, the display of the time axis is updated to keep pace with the time elapse counted by the timing unit. Along with the time elapse, the information of the time axis and the plurality of types of information are moved step by step on the display screen, appealing to the vision of the user.

The time axis in this embodiment is constructed of a series of rectangular cells, each cell representing unit time. Any cell loaded with a schedule is colored. As shown in FIG. 21B, characters are synthesized and displayed at the corresponding time on the time axis (S60), as described in connection with the background display process in steps S32 and S44, and the user instantly recognizes the schedule referring to the color of the areas corresponding to cells and open/reserved area (S61).

Returning to FIG. 18, the standard screen is presented. When an operation input from the operation unit comes in to return to the previous screen, the default screen is entered (S4). If no operation input comes in, the standby state is entered and maintained until another input comes in.

When the operation unit performs a mode switching (S6), the mode switching control section 280E shown in FIG. 13 presents the background screen in each mode (S7). The mode switching operation is executed by sliding the operation unit (slider) up and down. The display process of the standard screen (S3) is different, only in the background screen character, from the operation in step S2 (more specifically, S30–S37, and S40–S47 described in FIG. 20A and FIG. 20B, respectively), but the synthesis and display of the other icons and the time axis in step S2 are substantially identical to those in step S3, and no detailed discussion is provided.

When an operation input from the operation unit comes in to return to the previous screen, the standard screen is entered (S8). If no input comes in, the standby state is entered and maintained until another operation input comes in.

When the operation unit activates a scrolling operation (S10), the scroll control section 280G shown in FIG. 13 displays the background screen subsequent to the scrolling operation (S11). The scrolling operation is performed by manipulating the operation unit to move the cursor on the display. Here again, the display process of the standard screen (S3) is different, only in the background screen character, from the operation in step S2 (more specifically, S30–S37, and S40–S47 described in FIG. 20A and FIG. 20B, respectively), but the synthesis and display of the other icons and the time axis in step S2 are substantially identical to those in step S3, and no detailed discussion is provided.

When an operation input from the operation unit comes in to return to the previous screen, each mode screen is entered (S12). If no input comes in, the standby state is entered and maintained until another operation input comes in.

When the operation input activates display expansion and contraction (S14), the scale control section 280F shown in FIG. 13 displays the background screen subsequent to an expansion or contraction operation (S15). This zoom operation is performed by manipulating a designated operation unit. Here again, the display process of the standard screen (S3) is different, only in the size of background screen character and icon character, from the operation in step S2 (more specifically, S30–S37, and S40–S47 described in FIG. 20A and FIG. 20B, respectively), but the synthesis and display of the other icons and the time axis in step S2 are substantially identical to those in step S3, and no detailed discussion is provided. The program remains in the standby until any key input comes in. When a key input is detected, a determination is made of whether the key input is the one for releasing the zoom operation.

When an operation input from the operation unit comes in to return to the previous screen, a screen subsequent to the scroll operation is entered (S16). If no input comes in, the standby state is entered and maintained until another operation input comes in. When another display update operation input comes in, one of the above operations (S5, S4, S13, S17) is carried out.

When no display update operation input comes in, a process A (S18) is performed. In the process A, a diversity of icons are displayed on each screen as shown in FIG. 19, and the user determines whether any desired icon is selected (S19).

The selection of an icon is performed by manipulating the operation unit to move the cursor to any one of the icons and to click the icon. This operation results in "YES" in S19 in FIG. 19. The information of an icon selected by the operation of the operation unit is output from the second display setting unit 210B to the third display setting unit 210C, and fourth display setting unit 210D. Upon receiving the information, the third display setting unit 210C determines whether a plurality of low-level menu groups are present under the selected icon (S20). When the third display setting unit 210C determines that a plurality of low-level menu groups are present under the selected icon, the low-level menu groups are presented in each mode screen. In this presentation, the third display setting unit 210C opens a window in each mode screen and juxtaposes low-level menus in the window. For example, when a "red pigeon icon" is selected in step S19 among the icons of the high-level menu groups shown in FIG. 10, a low-level menu group corresponding to this icon, namely, "electronic mail display screen 1" is presented (S21).

The selection of a low-level menu is performed using the operation unit in the same way as the icon is selected. When the operation of the operation unit selects one of the low-level menus, the answer to the test in S23 is "YES". The information of the selected menu is output from the third display setting unit 210C to the fourth display setting unit 210D, and the process goes to S24. When the answer to the test in S20 is "NO", the process also goes to S24. The "NO" answer to the test in step S20 means that the selected object has no low-level menu groups. In this case, based on the output from the second display setting unit 210B, the fourth display setting unit 210D determines that a setup screen corresponding to the selected icon is present, and performs S24 and subsequent steps. Optionally, the third display setting unit 210C gives, to the fourth display setting unit 210D, an output indicating that there are no corresponding low-level menus.

Through steps S19–S24, one icon item is determined, and the fourth display setting unit 210D executes S25 and subsequent steps. The fourth display setting unit 210D presents a setup screen corresponding to the determined icon item on the display unit. To enter a diversity of inputs, the cursor displayed on the setup screen is operated for movement and click operations through the data input control section 280C in response to the operation of the operation unit. When the operation unit enters an input, the answer to the test in S25 is "YES", and the input information is displayed in the setup screen (S26). When the input operation is completed by an action to be described later, the answer to the test in S27 is "YES". The process returns to S3, S7, S11 or S15, presenting the standard screen again. The setup screen displays other low-level menus contained in the same class. When other low-level menus are selected on the setup screen, the answer to the test in S28 is "YES", and the process returns to S21. The setup screen corresponding to the selected low-level menu is thus presented. When the answers to the tests in S27 and S28 are "NO", steps S25–S27 are repeated.

The hierarchy control section 280D controls the high-level menus and low-level menus in the first through fourth display setting units 210A–210D in accordance with the input from the operation unit 24.

To move the icon to a desired location, the icon movement control section 280H controls the movement of the icon in accordance with the input from the operation unit 24. Based on the icon movement control, the icon character data control unit 250B in the UI processing unit 240 determines a desired icon and the pasting location of the icon and output them to the display unit 23.

To enter a voice input, the voice input unit 27 inputs a voice in accordance with the operation of the operation unit 24. The voice input control section 280A transfers the voice information to the data management unit 220. At the designated time, the voice output control unit 270 retrieves the voice information stored, and output it to the voice output unit 26 while displaying a desired display on the display unit 23 via the display control unit 260.

In this embodiment, in the calendar display mode included in the schedule display mode, the butterfly cursor is used, and the butterfly cursor flutters while the cursor is moving. This arrangement helps the user visually recognize the cursor in the background screen that displays a calendar constructed of a plurality of calendar cells. As one of display processes for this arrangement, the process shown in FIG. 22 is preferred.

Referring to FIG. 22, a determination is made of whether the command of displaying the cursor is present (S90). When there is no command, the standby state is entered and maintained until another command is entered. When there is the command for displaying the cursor, the character data control unit synthesizes and displays the character data for the butterfly stored in the storage unit 22, at coordinates pointed by the cursor (S91).

A determination is made of whether there is a movement operation of the butterfly cursor (S92). When there is no movement operation of the butterfly cursor, the process ends. When there is the movement operation, step S93 takes place. In S93, a plurality of butterfly character data that are formed in a stepwise fashion are alternately displayed to make the butterfly icon look like fluttering, and the butterfly icon is thus moved in accordance with random coordinates of the cursor generated by the unshown random number generator.

A determination is made of whether the cursor movement operation ends (S94). When the cursor movement operation is still in progress, S93 is repeated. When the cursor movement operation ends, the precess also ends.

How to use PC 1 and the portable apparatus 2 is now discussed. With a menu screen presented, the user manipulates each icon to which the respective function is assigned. When the icon item is selected, "communications mode" from among the high-level menu group shown in FIG. 10 is selected in S6 shown in FIG. 18. When the "red pigeon icon" is then selected, an "electronic mail display screen" is presented on screen in S21 subsequent to S19. Viewing this setup screen, the user enters data relating electronic mail using the operation unit 24. FIG. 2 shows one example of the setup screen. As shown, a column of data items are displayed on the setup menu screen 34.

By setting the cursor (condition setting bar) in position using the operation unit 24, the cursor is placed on a desired position. To modify the condition, the cursor has to be moved. In the same manner, a variety of inputs are entered in PC 1 and the portable apparatus 2.

When the input operation is completed, "File" on a pull-down menu column on screen may be selected on PC 1 using the cursor to select a low-level menu for storage. The data entered is automatically set as data set item data, and is transferred to the PC side.

When the data input in this way is transmitted from the portable apparatus 2 to PC 1, PC 1 checks it against its database, and presents its screen on the operation unit 24 of the portable apparatus 2. In this way, the user inputs and views a variety of schedules from the portable apparatus 2.

The software structures shown in FIG. 12 and FIG. 13 and the memory map shown in FIG. 14 are not limited to the portable apparatus 2 and find applications in other information processing apparatuses, PCs, and EWSs.

Second Embodiment

Referring now to FIG. 23–FIG. 32, a second embodiment of the present invention is discussed. The discussion of components of the second embodiment identical to those of the first embodiment are omitted here. The display screen of the second embodiment is shown in FIG. 23A and FIG. 23B.

A portable apparatus 300 includes an operation unit 301 having an generally elliptical configuration. The operation unit 301 includes a cursor button 301A (turning input device), a tab switch 301B, an optional button 301C, and a sound recording button 301D.

The cursor button 301A permits three modes of control movement in FIG. 23B, namely, a rotary movement in which the cursor button 301A is turned about a vertical axis Y in the direction of θ, a up movement in which the cursor button 301A is moved upward in the direction of arrow P after being pressed in the direction of arrow O, and a down movement in which the cursor button 301A is moved downward in the direction of arrow Q after being pressed in the direction of the arrow O.

The tab switch 301B is designed to be lifted up and down in perpendicular to the page of FIG. 23B.

FIG. 23A shows the state of a default screen 310 (default view) at power on. The default screen 310 includes a day-of-the-week display area 310A, presented on the top portion of a display unit 302, for displaying the today's date of the week, a time display area 310B, presented on the middle portion of the display unit 302, for displaying the present time, and a date display area 310C, presented on the bottom portion of the display unit 302, for display the today's date.

At power on, the default screen 310 is presented on the display unit 302 as shown in FIG. 23A. In response to the operation of the tab switch 301B, a schedule display mode 320A is presented as a standard screen as shown in FIG. 23B.

The schedule display mode 320A includes a date display area 330 on the top portion of the display screen, a schedule display area 340, as a calendar, with vertical lines indicating a predetermined time axis, a time axis display area 350A for displaying unit time of the schedule display area 340, and an icon display area 360 on the bottom portion of the display screen.

Arranged on the lower edge of the date display area 330 is a black bar 334 with an arrow indicating the present time on the schedule display area 340. The black bar 334 functions as a cursor.

With a vertical line 344 pointed by the black bar 334, as a border, the past time zone on the background screen is colored in gray, for example, as a background screen coloring display area 342.

The schedule display area 340 presents a schedule icon 346 at a desired scheduled time. By manipulating the schedule icon 346, the schedule of a low-level menu is viewed.

The time axis display area 350A has an open/reserved schedule coloring display area 352 that is colored on the time axis corresponding to the schedule icon 346. Referring to FIG. 23B, the schedule icon 346 extends from 9:00 o'clock to 12:00 o'clock and the open/reserved schedule coloring display area 352 is colored from 9:00 o'clock to 12:00 o'clock so that the user recognizes the schedule at a glance. In this way, the user easily views the current scheduled events.

The icon display area 360 displays a microphone icon 362 that indicates that a voice memo is registered, and an envelope icon 364 that indicates that a message is received in electronic mail. By manipulating these icons, like the schedule icon 346, the voice memo and the electronic mail at the low-level menu are heard or viewed.

By pressing the tab switch 301B, the time axis of the schedule display mode 320A is switched to one of a 6-hour mode, a 12-hour mode, a week mode, and a month mode. In each mode, a zoom-in operation (for an expanded display) is possible. Lifting the tab switch 301B permits a zoom-out (for a contracted display). FIG. 23B shows the 6-hour mode, FIG. 26A shows the 12-hour mode, and FIG. 26B shows the week mode.

Moving downward the cursor button 301A switches the screen from the schedule display mode to a memo mode as shown in FIG. 27A. Specifically, moving downward the cursor button 301A causes the date display area 330 to jump down to the icon display area 360 as shown in FIG. 27B. By turning the cursor button 301A, the cursor is moved to a desired icon. When the tab switch 301B is pressed with the cursor on the microphone icon 362A, the content of a voice memo is heard through the voice output unit.

To assembly the recorded information in the schedule display area 340, the tab switch 301B is lifted to cause the microphone icon to move upward until the microphone icon touches the black bar 334 as shown in FIG. 27C. By moving upward the cursor button 301A as shown in FIG. 28A, the date display area 330 shifts upward as shown in FIG. 28B. By turning the cursor button 301A, the microphone icon 362A is shifted to a desired time, 6:00 p.m. for example, as shown in FIG. 28C. Pressing the tab switch 301B causes the microphone icon 362A to part away from the cursor and to be pasted on the schedule display area 340. This completes the assembly of a schedule into the time axis.

As shown in FIG. 29A, pressing the optional button 301C once switches to another mode. Pressing the optional button 301C again cause the apparatus to revert back to normal mode (schedule display mode).

As shown in FIG. 29B, pressing the optional button 301C calls a database mode. In the database mode, four categories are available: "Clients", "Vendors", "Personal", and "Setting". The setting mode permits time adjustment and a variety of other adjustments.

Using the cursor button 301A, the black bar (cursor) is moved horizontally to select any category. Referring to FIG. 29C, "Clients" list is selected using the tab switch 301B. The screen shown in FIG. 30A appears. Turning the cursor button 301A causes a selection bar to move horizontally to select an initial, for example, K.

Referring to FIG. 30B, an imaginary cursor movable upward and downward appears beside the name list. By moving upward or downward the cursor button 301A, a desired name is selected. When the cursor reaches the edge of the display unit 302, the screen is automatically scrolled.

By operating the tab switch 301B, information conveyed by the names shown in FIG. 30C is viewed. By moving the cursor button 301A upward or downward, the imaginary cursor is moved upward or downward for scrolling. The user thus finds desired information.

When an electronic mail is received, a notification window is presented as shown in FIG. 25C. The notification window displays the photograph of the sender's face, the name of the sender, and the time of transmission.

If the mail is not urgent, no notification is performed. The envelope icon 364 is automatically pasted. The user may view the content of the mail later by selecting the envelope icon 364.

To record a voice memo, the sound recording button 301D is operated. Voice memo is recorded within the period during which the display screen shown in FIG. 31 is continuously displayed.

In the schedule display mode shown in FIG. 23B, turning the cursor button 301A permits the screen to scroll in the same direction as the time axis. Suppose that an operation unit is manipulated on a wrist-strapped type portable apparatus, such as a wristwatch, fastened about the wrist. If the user attempts to update the display screen, to move the cursor, or to scroll the display screen on the conventional operation unit on the wristwatch, designating a location on the display screen or scrolling the display screen are not always successful depending on the direction of mounting and the size of the operation unit. In this embodiment, the user enjoys ease of use of the apparatus because the operation unit is turned in the same direction as the direction of scroll.

In the conventional apparatus, a pointing device movable in all directions, such as a mouse or a track point, gives unstable output, fluctuating its cursor. Since the cursor is movable in one direction only in this embodiment, the movement of the cursor is stable and accurate. In addition, the rotary movement of the button about the axis permits the cursor to move reliably and quickly taking advantage of the centrifugal force and inertia of the button during its rotation. Therefore, the rotary motion commands the cursor to move accurately and quickly in a horizontal direction. Since the screen reacts readily and correspondingly to the operation input, an easy-to-understand interface results.

This embodiment offers the function of displaying out-of-display-outline data (catch net metaphor). A memo (or object) pasted on the time axis moves along with the time axis as time passes by. Even if the time at which the memo is pasted goes beyond the outline of the display, any required stays presented, not disappearing from within the display.

To this end, an area dedicated to catch net is arranged on the left-hand side portion that indicates the past of the display unit 302, and data past the range of the time axis is pasted there. The catch net area displays, on the time axis display area, icon information that disappeared from the display screen with time.

The display process of catch net area is performed in accordance with a flow diagram shown in FIG. 21C.

Along with the update process of the time axis, a determination is made of whether an icon has entered the catch net area (S70). When icons has entered the catch net area, icons are displayed in the catch net area in a stacked manner without paying attention to the time axis (S71). When no icons have entered the catch net area, the icon presentation is performed along the ordinary time axis. Icons in the catch net area are deleted from the display screen within the catch net area K hours after the scheduled start time of a schedule icon (namely, when the difference between the scheduled input time and the present time exceeds K hours) (S72). In this way, any icon is deleted K hours later.

FIG. 24 shows the hierarchical structure of the display screen described above. The operation unit switches between the database display mode and the schedule mode.

FIG. 25A through FIG. 25C show the display screens when the screen is scrolled while the zoom operation is performed at the same time. To perform the scrolling operation, the cursor button 301A, the operation unit having an generally elliptical configuration, is turned (S100) as shown in FIG. 32A. Through the process A (S101), the direction of turning of the cursor button 301A is determined.

Specifically, in the process A in S101, a determination is made of whether the direction of turning of the cursor button 301A is clockwise or counterclockwise (S110). When it is turned counterclockwise, the amount of, namely, angular travel of counterclockwise turning, and the number of turns are detected (S111a). The amount of scroll on the display screen corresponding to the detected amount of turning is computed based on an amount-of-turn to amount-of-scroll conversion table stored in the storage unit (S112a). The display control unit performs a display screen movement process, namely, an update process of the display screen (S113a). In this way, a display screen scroll process (S102) is reached.

In the update process of the display screen during the scrolling, if a lateral shift X by the scrolling is shorter than the horizontal size X1 of the display screen, preferably, the old display area X1-X that needs no update is maintained and the newly presented area X only is added. This arrangement permits faster process speed during scrolling.

If the button is clockwise turned in S110, process steps stated in S111b–S113b are performed in the same way as in S111a–S113a. In S112b, an amount-of-turn to amount-of-scroll conversion table dedicated to clockwise turning is used, but alternatively, the conversion table for counterclockwise turning may be commonly used as the one for clockwise rotation.

The display process for scrolling is performed (S102). A determination is made of whether the cursor button 301A stops turning (S103) and a process B is then performed (S104).

The cursor button 301A as the operation unit in this embodiment performs not only scroll process of the display screen when turned, but also expands or contracts the display area and shifts vertically up or down the black bar (cursor) when lifted or pressed. For these operations, the process B is executed.

In the process B in S104, when a pressing action or lifting action is exerted on the cursor button 301A (S120), a determination is made of whether the lifting action or pressing action is made (S121). When no action is made, the process B ends. When the lifting action is made, the display process is performed to expand the display area on the lower portion (S122). When the pressing action is made, the display process is performed to expand the upper portion (S124). To quit the expansion operation, the process B is terminated. To continue the expansion operation, S121 and subsequent steps are repeated (S125).

According to the second embodiment, the display data, created or received, is organized and managed at the point of creation or reception on the time axis on the display screen. The display data is easily searched and retrieved using time as a key without the need for a complex hierarchical structure.

By moving intentionally the data to the time axis, the display screen serves as a list and schedule. Since the time axis moves with time, the chronological relationship of an event of interest to the present time is distinctly recognizable.

The display of the time axis and the color difference between past and future (or white and black in reverse presentation) helps the user to identify the difference immediately. The position of the present time is represented by a different color border. The user immediately discriminates between past, future and present events.

The scale adjustment (zoom) is carried out in each of the layers of time (month, week, day, hour). The display content is expanded or contracted along with the scale of the time axis. The displayed range is automatically varied in step with the scale of the time axis in its zooming (5-hour, 12-hour, and one-week schedule).

As the time axis is expanded or contracted, small-size data accompanying each schedule can be seen (when expanded) or cannot be seen (when contracted). Even when contracted, the user roughly estimates how busy the user is, referring to the compactness of the schedule chart.

In the above embodiment, the control relationship between the rotary input unit and the scrolling is determined by a table that causes the display screen to move by a several centimeters in response to three turns of the rotary input device. Angular travel detection means may be connected to CPU. Angular travel-lateral travel conversion table that defines the relationship between an angular travel of the rotary device and the lateral travel of the screen may be stored in the storage unit. In this case, CPU may function as angular travel-lateral travel conversion control means.

Third Embodiment

Referring now to FIG. 33 through FIG. 43, a third embodiment of the present invention is discussed. Components identical to those used in the first and second embodiments are designated with the same reference numerals, and the discussion about them is not repeated here. The display screen of the third embodiment is shown in FIG. 36A and FIG. 36B.

As shown, a portable apparatus 500 in this embodiment includes an operation unit 501. The operation unit 501 includes a crown 501A (rotary input device), a zoom-in button 501B above the crown 501A, a zoom-out button 501C below the crown 501A, a function button 501D below a display unit, and a sound recording button 501E.

The crown 501A has two modes of control movement as shown in FIG. 36A: a rotary movement in which the crown 501A is turned in the direction designated by arrow R or S, and push-in and pull-out movement in which the crown 501A is pushed in or pulled out in the direction of T. The rotary movement permits a cursor to move vertically up and down (U, V). When the cursor reaches the upper edge or lower edge of the screen, the screen is scrolled upward in the direction of U or downward in the direction V.

The zoom-in button 501B switches between a 5-hour mode, a 12-hour mode, a week mode, a month mode and a year mode in the schedule display mode. To return to the previous mode, the zoom-out button 501C is operated. The zoom-out button 501C is used to select an icon, and to display a low-level menu. When the zoom-in button 501B and the zoom-out button 501C are concurrently pressed in any screen, the 5-hour schedule display mode displaying the present time is called.

In the week schedule display mode, an electronic mail icon 560 and a voice memo icon 550 only are placed on the time axis with no detailed schedule presented. To look for the time band with a desired schedule, the cursor is placed on the week to which the user zooms in, in the month schedule display mode as shown in FIG. 36D, and the zoom-in button 501B is pressed to expand the screen. As shown in FIG. 36C, the cursor is used to select the week schedule display mode and finds the desired schedule.

Referring to FIG. 33B, the schedule display mode 510 as the standard screen is divided into, from the left-hand side, a schedule date display area 512, a time axis display area 520, a schedule display area 530, and a present time display area 516. In the time axis and schedule, the top side of the screen represents the future while the bottom side of the screen represents the past. The border line represents the present time, and the background screen below the border line is presented in gray, for example.

The display unit 503 displays, on its bottom portion, the voice memo icon 550 and the stacked electronic mail icons 560, and, on its top portion, TODO icons 536A–536D, and on its middle portion, a schedule icon 534.

Since the TODO icons 536 are the items the user are supposed to do in the future, they are displayed on the top right corner of the screen. The size of the TODO icon 536 denotes its importance or urgency. These icons are arranged from left to right with the left one oldest.

The feature of the display screen is that, as the scheduled time draws near, the icon information, for example, the display of the schedule icon 534 and the TODO icons 536A shown in FIG. 33B is enlarged. The longer the length of recording time, the larger the size of the voice memo icon 550A so that the user is reminded even by the size of the icon only.

The electronic mail icons 560 are stacked with partly superimposed, from bottom up, so that many mail icons are displayed. In this way, the user visually roughly learns the number of electronic mails from the stack. The number of stacked icons in excess of a certain number is simply treated as a large number.

When the TODO icon 536 is selected and opened, the display screen shown in FIG. 39A appears. Pushing in and pulling out the crown 501A, followed by the pressing of the zoom-in button 501B, selects "DONE" 538A or "NOTYET" 538B. Means may be provided so that a check mark 589 shown in FIG. 39B appears followed by an explosion of the window (dialog) on screen when the DONE tab 538A is selected. The effect of explosion may give the user a sense of accomplishment.

Since the voice memo icon 550 is the one that was created in the past, it is displayed on the bottom right corner of the screen.

When the zoom-in button 501B is operated to select the voice memo icon 550 with its window opened, the time and date (of recording) of a memo and the bar graph indicating the length of recording time are displayed as shown in FIG. 40A. A glace at these data will remind the user of the memo without reproducing it.

Displayed below these data are icons for processes "discard" 552A, "reproduction" 552B and "move to time axis" 552C for the memo.

By pushing in and pulling out the crown 501A, a desired icon is reversed in video, and the zoom-in button 501B having a select function is pressed to select the corresponding process. When no process is performed, the zoom-out button 501C having a cancel function is pressed to close the window.

When the "move to time axis" 552C is selected, the voice memo icon 550A is captured by the cursor, thereby flashing. Turning the crown 501A drags the icon to a desired time, and pushing in the crown 501A pastes the icon onto the time axis.

When the zoom-in button 501B is then pressed, the window appears. After checking the time and date to be set, and selecting notification means among the tone of an alarm, beep sound, and vibration, the voice memo icon 550C is placed on the schedule (FIG. 40B).

The notification means includes a first notification unit for notifying of situations surrounding the user, a second notification unit for notifying of the content of information, and a third notification unit for notifying of the degree of importance and urgency of information. One of these units is selectively used. For example, when the user is asleep, the icon flashes modestly; during a conference, the arrival of a mail is notified of by vibration rather than by sound; and the arrival of a mail is notified of by the name of the user in voice. Other notification means may include a tone change unit for notifying by a tone, a voice change unit, a vibration generation unit, an odor generation unit, a light emitting unit and an electricity generation unit for providing an electric shock.

To record a voice memo, the sound recording button 501E is pressed. The window shown in FIG. 42A is opened, making the apparatus stand ready. The user now can record sound. When a voice is detected, "RECORD" screen 622 flashes as shown in FIG. 42B, showing a indication that the voice recording is in progress with a bar indicating a recording time length. When the user stops speaking, the voice recording automatically ends, and a next low-level window 624 is opened.

The window 624 displays the time and date of recording, and the length of time of recording as shown in FIG. 42C. One of "erase" 626C, "replay" 626B, "move to time axis" 626A is selected by pushing in and pulling out the crown 501A and by pressing the zoom-in button 501B. Pressing the zoom-out button 501C causes the screen to revert back to the schedule display screen.

When an electronic mail arrives at a desktop computer, a notebook computer, or a server, the portable apparatus 2 is also notified so. Specifically, as shown in FIG. 41A, the electronic mail icon 560 automatically appears and flashes at the position corresponding to the present time. The operation of the zoom-in button 501B displays a low-level menu window 561 such as "URGENT" 561B and a mail having a title like "R.S.V.P.". Displayed in the window 561 are the photograph of the sender's face 561A and a summary 561C of the message.

When the zoom-in button 501B is pressed in this state, a low-level menu screen 562 appears as shown in FIG. 41B. The screen 562 displays on its upper portion the reception time, the date, and the name of the sender. Arranged below them are icons for "already opened" 563B and "move to time axis" 563A which are selected for the process to be performed on this mail. The icon "move to time axis" is used to notify the user when the corresponding time has come.

These icons are pasted freely on the time axis to be assembled into the flow of time schedule. In the example shown in FIG. 40C, the voice memo icon 550B is pasted beside the time axis.

In this embodiment, the voice memo icon 550 and the electronic mail icon 560 are placed on the time axis as the time of input and time of reception, respectively. If icons are past their own corresponding times, they are collected on the screen below the schedule display area through the catch net metaphor function.

FIG. 38 shows a sleep mode that is the default screen at power on. In the sleep mode, when no operation input is entered through the operation unit for a constant period of time, an area displaying the present time 518 (fifth display area) expands, covering the entire screen like an eyelid. An indication of the power level in a battery is added to this area. Even if the screen is entirely closed, the schedule display area of two hours long may be continuously presented. In the latter case, the schedule is monitored without switching to the standard screen. With the sleep mode, the screen is set to be dark so that no other person may see it. The schedule display area may be set to be dark for security reasons. However, icons are continuously displayed to monitor the schedule. The bar graph on the left-hand side indicates a charge level of the battery.

Like a screen saver, the screen is switched to the schedule display module shown in FIG. 36B by operating a switch. When no input comes in through the operation unit, the screen returns to the sleep mode.

Scroll

Turning the crown scrolls the screen as shown in FIG. 38. The speed of turning of the crown is consistent with the speed of scroll.

To perform the scroll process, the crown is turned (S130) as shown in FIG. 43A. The direction of the turning is determined through a process A (S131).

In the process A in S131, a determination is made of whether the direction of turning of the crown is upward or downward (S140). When the crown turns upward, the amount of turning, namely, angular travel of rotation and the number of rotations are detected (S141a). The travel of scroll on the display screen corresponding to the detected amount of turning is computed based on the amount-of-rotation to amount-of-scroll conversion table stored in the storage unit (S142a). In accordance with the computed amount of scroll, the display control unit performs the display movement process, namely, the display update process (S143a). A display screen scroll process (S132) is thus reached.

In the update process of the display screen during the scrolling, if an upward shift Y by the scrolling is shorter than the vertical size Y1 of the display screen, preferably, the old display area Y1-Y that needs no update is maintained and the newly presented area Y only is added. This arrangement permits faster process speed during scrolling. If the screen is scrolled downward in S140, process steps stated in S141b–S143b are performed in the same way as in S141a–S143a. In S142b, an amount-of-turning to amount-of-scroll conversion table dedicated to downward scrolling is used, but alternatively, the conversion table for upward scrolling may be commonly used as the one for downward scrolling.

The display process for scrolling is performed (S132). A determination is made of whether the crown 501A stops turning (S133) and a process B is then performed (S134).

The crown 501A activates not only the scroll operation when turned, but also moves the cursor to the left or to the right when pushed in or pulled out. To this end, the process B is performed.

Referring to FIG. 43C, in the process B in S134, a determination is made of whether the crown 501A is pushed in or pulled out (S150). When the crown 501A is not operated, the process B ends. When the crown 501A is operated, the axial travel of the crown 501A is computed (S151). Based on the axial travel of the crown 501A, the travel of the cursor to be shifted is computed using a table (S153). In this way, the cursor shift process is performed (S153). The display process for cursor clicking and cursor dragging is performed (S154) to determine whether the shift of the cursor is further required (S155). If a further shifting is required in S155, the process from S150 is repeated. If no further shifting in S155 is required, the process B ends.

In the course of scrolling, the scale of the schedule is switched between 5-hour, 12-hour, 1-week, and 1-month scales as shown in FIG. 36A–FIG. 36D. For this reason, depending on the scale, the time axis, and the balance of areas indicating scheduled events change. In particular, the width of the time axis (width of time axis display area 520) are reduced in size from G1, to G2, to G3, to G4. The width of the open/reserved schedule coloring display area 522 is reduced from H1 to H2, and the schedule date display area 512 is expanded from F1 to F2, to F3, to F4. The user thus immediately visually recognizes the time scale. The number of display fonts and font size of the title of each event are changed based on the time scale in use.

If first information that is a schedule item at low-level is stored in the portable apparatus and has associative information such as an address, the first information is automatically recognized and linked with the associative information. The title of the associative information is displayed on the column of the schedule item.

Database

When the function button 501D is operated to switch to a database mode, a database menu screen 572 is presented as shown in FIG. 37A. The database menu screen 572 displays five categories of information of "PEOPLE" 572A, "OFFICE" 572B, "PROJECT" 572C, "SYNCHRONIZE" 572D, and "REFERENCE" 572E. Turning the crown 501A highlights a desired category in reverse video ("OFFICE" 572B in FIG. 37A), and pulling out the crown 501A selects it to go to a low-level layer. Referring to FIG. 37B, there appears an initial selection screen 584 which is lower in layer than the right-hand portion of the screen and has a list of names arranged in alphabetical order. Shifted to the left-hand portion of the screen is a menu selection area 582 displaying the categories at the high-level layer.

In the initial selection screen 584, turning the crown 501A highlights a desired initial in reverse video ("G" in FIG. 37B), and pulling out the crown 501A selects it to go to a low-level layer.

The following method is preferred to create the display screen as shown in FIG. 37B. An area within which the cursor is movable is a significant screen and an area on which the cursor is not movable is an insignificant screen; and as shown in FIG. 37B, the screen other than the initial selection area 584 is presented as a background screen. The initial selection area 584 is updated in response to the scroll operation by the operation unit. As the crown is turned, A, B, C, D, . . . , G, and then H, . . . appear. The selected letter G only is enlarged.

The next screen, subsequent to the selection of the letter G, is updated, and then selected and contracted to the left as shown in FIG. 37C. The menu selection area 582 is not rewritten, while other areas are rewritten. Since the data is prearranged in the hierarchical order, steps required to sort and extract data arranged in a random fashion are eliminated, simplifying the control process. To this end, the data is preferably arranged in alphabetical order.

In the layer shown in FIG. 37C, there appears a name selection screen 590 which gives a list of names arranged in alphabetical order.

In the name selection screen 590, the menu selection area 582 and initial selection area 584 are further contracted toward the left. Turning the crown 501A with the name selection screen 590 presented highlights a desired name in reverse video, and pulling out the crown 501A selects it. Referring to FIG. 37D, there appears a personal data display screen 600 at a lowest level layer.

In the personal data display screen 600, the menu selection area 582, initial selection are 584 and name selection area 596 are further contracted toward the left. The personal data display area 608 in the personal data display screen 600 displays the photograph 610 of the person, name 612A, telephone number 612B, and address 612C.

In this embodiment, the category "PEOPLE" 572A has the database menu screen 572, initial selection screen 580, name selection screen 590, and personal data display screen 600 in the high to low hierarchical order.

The layers appear in the low to high hierarchical order from right to left on screen. Referring to FIG. 37B–FIG. 37D, the width of the menu selection area 582 is reduced from L1 to L2 to L3 as the screen shifts to low-level layer. The width of the initial selection area 584 is also reduced from M1 to M2 to M3 as the screen shifts to lower layer. In this way, the layered data is horizontally arranged and items in each layer are vertically arranged. To move from one layer to another, the crown 501A is pressed. The selection of an item in the same layer is performed by turning the crown 501A.

Since all high-level layers above the layer currently presented are displayed on screen in any layer screen, the user easily understands the hierarchical structure of the data and can easily shift to another layer of data. The direction of the hierarchical structure of data is the same as the direction of selection for hierarchical layer in terms of operational consistency, an easy-to-understand interface results.

In the above embodiment, the control relationship between the rotary input unit and the scrolling is determined by a table that causes the display screen to move by a several centimeters in response to three turns of the rotary input device. Angular travel detection means, lateral travel detection means, angular velocity detection means or the like may be connected to CPU. Stored in the storage unit is an angular travel to vertical shift conversion table that defines the relationship between an angular travel of the rotary device and the vertical shift of the screen, a crown axial travel to cursor shift conversion table that defines the relationship between an axial travel of the crown and a shift of the cursor, or an angular velocity to expansion/contraction conversion table that defines the relationship between an angular velocity of the crown and the expansion/contraction. CPU may function as angular travel-vertical shift conversion control means, crown axial travel to cursor shift conversion control means, and angular velocity to expansion/contraction conversion control means.

As the degree of importance or urgency of information increases, the corresponding icon becomes large in size. As scheduled time draws near, the corresponding icon also becomes large in size. The longer the voice memo, the corresponding icon becomes larger. The user is reminded of the content of the voice memo glancing at the icon size only.

Fourth Embodiment

Referring now to FIG. 44 through FIG. 51, a fourth embodiment of the display device of the present invention is discussed. Components identical to those used in the first through third embodiments are designated with the same reference numerals, and the detailed discussion about them is not repeated here. The display screen of the fourth embodiment is shown in FIG. 44.

A portable apparatus 700 of this embodiment is a business-card size portable apparatus that receives a hand-written pen input. In its hardware structure, the fourth embodiment is different from the first through third embodiments. In addition to the construction shown in the block diagram in FIG. 5, the fourth embodiment includes an pen input operation unit. Furthermore, CPU includes recognition means for recognizing pen input characters and drawings, and performs a variety of processes, based on the recognition result of the recognition means. Besides the RAM and ROM, the storage unit includes a non-volatile memory detachably installed on the portable apparatus, a PCMCIA card, and an ID card dedicated to this portable apparatus. The portable apparatus can receive text data through the operation unit.

The display unit includes an active-matrix liquid-crystal panel having an image display function and an electrostatic induction tablet function, a coordinates detection circuit for detecting the coordinates of a pen tip of a pen input operation unit on a display panel in response to a signal from the pen input operation unit, and a control circuit for controlling an image display operation and coordinates detection operation.

The pen input operation unit has a high input impedance probe electrode, coupled with a row electrode and a column electrode on a display panel via a stray capacity, for detecting an area. In response to a scanning pulse applied to the row electrode or a scanning pulse applied to the column electrode, a voltage is induced on the probe electrode. The coordinates detection circuit detects the timing of generation of the voltage induced at the probe electrode of the pen input operation unit, based on a coordinates detecting timing signal from the control circuit, and detects the coordinates of the pen tip.

The portable apparatus further includes command checking means for checking the content of a process menu pointed by the pen input operation unit among the menus presented by the display unit and the recognition means for recognizing the pen input characters and drawings. The portable apparatus selects between performing the process provided by the command checking means and performing a variety of processes in response to the recognition result.

When the pen input operation unit has no cable connection to the portable apparatus, the pen input operation unit preferably includes an information collector, a coded information generator, a buffer memory, a position detector, a signal generating code information transmitter for transmitting coded information and position command signal based on the input from the user. Such a single pen-like coordinates pointing device preferably has a hand-writing capability and bar-code input capability. The display unit preferably includes a sense matrix unit, a position detector (pointed coordinates sense unit), a coded information extraction unit, and a detected position processing unit.

The portable apparatus 700 of this embodiment has an operation unit 702 including a pen input operation unit 703 and operation buttons 0–9.

Referring to FIG. 44, there is shown a layout of a standard screen. As shown, a display unit 706 provides thereon a date display area 710 for displaying the present time and date on the top portion of the screen, an electronic mail area 720, a schedule display area 730, and a database display area 740.

The date display area 710 displays the date as "AM 10:05 59 Thursday October 12" 701. The electronic mail area 720 is spaced from the time axis to give the impression that the mail came from a far location. The electronic mail area 720 includes a transmitted mail box icon 721, the number of the transmitted mails, a ready-to-transmit mail box icon 722, the number of ready-to-transmit mails, a received mail box icon 723, the number of received mails, and an opened mail box icon 724 and the number of opened mails.

The schedule display area 730 displays a time axis display area 733 in a perspective landscape metaphor with a schedule in the form of building icons 736 and 737 on the right-hand area and with a TODO list in the form of a billboard 738 on the left-hand area.

The time axis display area 733 extends into the future with its near end close to the present time and its far end signifying a more distant future. The time axis imitates a road viewed from above, with objects surrounding the road, setting GUI. In this embodiment, the road represents the time axis, the buildings represent the schedule, the billboard represents the TODO list, and the manhole represents the memo. Along with the time axis display area 733, an open/reserved schedule background display area 734 is formed to indicate a scheduled event in color, and a background screen coloring display area 732 is formed to indicate the past area, in color, with respect to the present time.

The time axis represented by the road offers perspective feel. An object positioned relatively at a far distance (future) is small. As a scheduled time draws near, the object becomes distinct and large permitting the user to recognize roughly the content of the icon.

The buildings are displayed on the right-hand side of the road (time axis), and the TODO list is displayed in the form of the buildings. Available as a field of view change button are steering icons 744 and 745. Operating them calls a function mode in which the user looks in a different direction.

The building icons 736 and 737 are a plurality of types of three-dimensional animation icons having different configurations and attributes. The types of the buildings represent types of scheduled events different in nature. In this embodiment, the building 736 signifies an official event while the home 737 signifies a private one.

The billboards 738, fixed on a point of the road, include a billboard icon 738A with feet signifying time related data, and a footless billboard icon 738B floating in air and unrelated to time. The time axis display area 733 shows, on its past portion, a manhole icon 739 where a memo is written. The past portion of the time axis display area 733 is darkened for easy recognition.

The scrolling makes the road appear in perspective with the schedule based on a varying scale between a large scale and a small scale (day and week) so that far object is reduced and is seen in a bird's eye view. As the scrolling presents the time axis on a large scale, and contracts the screen, the view point of three-dimensional view is elevated. Presented is a bird's eye view mode 850 shown in FIG. 46A which is the display screen as if it were shown in a bird's eye view. A time axis display area 852 has the unit of day, and a schedule display area 854 displays small icons. The lengths of small icons in perpendicular to the length of the time axis shows how busy the corresponding day is.

To create the above display screen, characters are prepared with their bit map changing with time, while the type of building is determined by the type of information. The road may be replaced with numbers when no fine control is carried out.

In the presentation of the bird's eye view, preferably, the position of each icon is determined by the start time and time length information of the schedule, and characters are selected by the length of the schedule and are pasted along the time axis.

For example, if many characters are present every ten minutes, the types of icons are preferably limited. For example, when the character is a cubic building icon, the character contains the right face and left face of the cube as a figure, and lines are drawn between the right face and left face in accordance with the start time and end time so that the building icon is formed of dot data.

The database display area 740 on the bottom portion of the display unit 706 is the user's own database, and includes a telephone directory icon 741, an icon 743 for scrolling the time axis into the future, an icon 742 for scrolling the time axis into the past, a steering icon 744 for steering to the front of the building icon 736 in a two-dimensional display, and a steering icon 745 for steering to the front of the billboard icon 738.

Scale switching buttons 704A, 704B, and 704C on the card side permit the scale intervals to switch to month, week, and day, respectively. The scale intervals of day may provide a closeup image viewed from an altitude near the ground, the scale intervals of week provide a closeup image viewed from an altitude of a bird's eye, and the scale intervals of month provide a closeup image viewed from an artificial satellite.

FIG. 51D shows the display on the scale intervals of month. Different from the displays on the scale intervals of day and week, the top portion of the display unit represents time near the present time while the bottom portion represents the future. The bar graph signifies the total amount of schedule on each day.

Referring to FIG. 51E, continuously touching the pen to the scroll icon scrolls the time axis and lifting the pen off stops scrolling.

Referring to FIG. 51F, an 14 November area (844) is double-touched, and the scale intervals of time axis is switched to day. Referring to FIG. 50A, the building 736 is double-touched, and the content of the schedule is displayed as shown in FIG. 50B. To modify the schedule on November 14, the building on the time axis is dragged to the position of a desired time as shown FIG. 50C.

Referring to FIG. 51A, the listed received mail is double-touched to open it. An opened window displays a list of senders and titles. When a desired mail is touched, a low-level window is displayed as shown in FIG. 51B.

Referring to FIG. 51C, a time display area on the top portion of the display unit is touched to return to a time axis display mode presenting the present time.

To close simply the display, a top-left closed box is double-touched.

Referring to FIG. 50D, touching the pen input operation unit 703 to any key on a keyboard opens a memo input screen in a memo mode as shown in FIG. 50E. A input format selection icon 786 for schedule is selected and double-touched by the pen input operation unit 703 from a variety of icons (on a title bar in the memo screen) on the top portion of the memo input screen shown in FIG. 50E.

A schedule display screen 790 appears as shown in FIG. 50F. In the schedule display screen 790, time is set by touching the pen input operation unit 703 on the scale intervals within the screen. When a name is input, and if it has associative data within a database, an icon indicating the associative data appears in succession to the name.

An alarm yes/no icon 796 sets or disables an alarm. Double-touching any of building icons 794A–794D to select it.

When an input screen is closed to input the schedule, a building icon 736 indicating the schedule is automatically pasted onto the time axis.

To create an electronic mail, a memo input screen 780 in the memo mode is opened as shown in FIG. 49B. A mail input format selection icon 782 is selected and double-touched by the pen input operation unit 703 among a variety of icons (on the title bar in the memo screen) on the top portion of the memo input screen 780 shown in FIG. 49B.

Referring to FIG. 49C, an electronic mail display screen 800 is displayed. In the electronic mail display screen 800, inputting is performed through the keyboard. When a name is input, the corresponding electronic mail address is automatically retrieved and displayed in the electronic mail display screen 800. Using the keyboard, an electronic mail is created. The electronic mail display screen 800 is closed by touching the pen input operation unit 703 to a closed box icon 802 to the left of the title bar on the top portion of the window of the electronic mail display screen 800.

When the electronic mail is created and closed, that electronic mail is accumulated in a ready-to-transmit mail box icon 722. When the card of the portable apparatus is connected to the telephone line, the mail is automatically transmitted.

To create an item to do in the future (TODO list), the pen input operation unit 703 is touched to the keyboard as shown in FIG. 49D. As shown in FIG. 49E, the memo input screen 780 in the memo mode is opened. An input format selection icon 784 for TODO list is selected and double-touched by the pen input operation unit 703 from a variety of icons (on the title bar on the memo screen) on the top portion of the window of the memo input screen 780 shown in FIG. 49D. When a reply button is touched, the display changes to a reply mail create screen.

Referring to FIG. 49F, a TODO list display screen 810 is displayed. Hand-written characters as ink data are input using the pen input operation unit 703 in a hand-writing area 812 in the TODO list display screen 810.

Referring to FIG. 49F, "BUY WINE" is hand-written. In this case, display characters are displayed using hand-writing font data rather than Mincho fonts or Gothic fonts. When text data is input using the keyboard, the hand-writing area 812 displays font data in Mincho fonts or Gothic fonts, though they are not shown here.

When the characters are input to the hand-writing area 812, that area is pasted onto the time axis as is.

The TODO lists include a TODO list anchored onto the time axis and a TODO list not anchored onto the time axis. Whe any time is designated, a billboard icon with feet, which is to be anchored onto the time axis, is pasted on the time axis. The one which is not anchored to the time axis is a footless billboard floating at any position on the time axis.

The billboard icons typically disappear with time. When the TODO list anchored onto the time axis is not deleted, the billboard icon stays on the lower edge of the screen until a delete operation is carried out. When some billboards stay on the lower edge, the icons are stacked one on another and displayed.

To delete the billboard icon 738B, the billboard icon 738B indicating the TODO list is checked with the pen input operation unit 703 and is then automatically deleted as shown in FIG. 48A.

To search and retrieve the database, a database box icon 741 is double-touched by the pen input operation unit 703, and the display goes to a database display screen for retrieval, as shown in FIG. 48B.

Referring to FIG. 48C, first letters of a name, for example, ya, are input using the keyboard into a retrieval word input tab 752 in a retrieval mode screen 750 and a binocular icon 754 is touched by the pen input operation unit 703. A retrieval starts. After the retrieval, retrieved data is displayed.

Referring to FIG. 48D, a data list display screen 760 shows the data. Among the data, a selection tab 762 of desired data is double-touched by the pen input operation unit 703, and detailed data is displayed in a data display screen 770 as shown in FIG. 48E.

To create a memo, the keyboard is touched by the pen input operation unit 703 as shown in FIG. 48F. Referring to FIG. 47A, the memo input screen 780 in the memo mode is opened. Hand-written characters as ink data are input into the memo input screen 780 using the pen input operation unit 703 as shown in FIG. 47A.

Referring to FIG. 47A, "TAXI ¥120" is hand-written. In this case, display characters are displayed using hand-writing font data rather than Mincho fonts or Gothic fonts. When text data is input using the keyboard, the memo input screen 780 displays font data in Mincho fonts or Gothic fonts, though they are not shown here.

When the closed box icon is touched by the pen input operation unit 703, the memo input screen 780 is closed. The manhole icon 739 is pasted onto the time axis where the memo is created. Double-touching the manhole icon 739 presents a memo content display screen.

Fifth Embodiment

Referring now to FIG. 52 through FIG. 55, a fifth embodiment of the display device of the present invention is discussed. Components identical to those used in the first through third embodiment are designated with the same reference numerals and their detailed discussion is not repeated here. The display screen of the fifth embodiment is shown in FIG. 55C.

FIG. 52A shows a display screen 1002 currently presented, as a window, on a display screen 1000 of the PC side. Now, let the PC access another server on the Internet to display literatures, photographs and their titles, and the display image is captured into the storage unit in the portable apparatus. A camera tool is selected using software relating to the display device (PIM software) on the PC, and an area of interest is designated and an area to be captured is selected. The image is then captured into a memo in the memo mode in the display device.

Referring to FIG. 52B, the image may be included into a TODO list in a TODO list mode.

Since the PC and the portable apparatus achieve data synchronization for already designated information only, the portable apparatus synchronizes with PIM software body, memo on PIM, and downloaded electronic mails. An image displayed on the display screen of the PC is directly data-synchronized with the portable apparatus. If the user carries the portable apparatus only, it handles the PIM software body, the memo on PIM, and the downloaded mails in the same way as the PC.

FIG. 52C shows a detail of the display screen of the portable apparatus. Different from the fourth embodiment, the portable apparatus employs road signs as a metaphor for a time axis 1112 with date. The height of each building icon represents the amount of schedule; this is also different from the fourth embodiment.

Referring to FIG. 54A, the image captured into the TODO list is shown as a billboard 1118 in modes prior to and subsequent to a change of direction. The captured image may be used as character data of an icon for the TODO list.

Referring to FIG. 54C, when information notification is set up beforehand, the portable apparatus outputs voice information such as a melody from a voice output unit at a desired time and a pop-up menu 1142 showing a summary of schedule is displayed along with a building icon 1140 loaded with a schedule. The notification to the user is carried out using both the voice information and the on-screen information.

FIG. 54B shows the display screen on which a TODO list is written. As shown, a TODO list mode 1110 is opened and the window of a character input interface 1130 presenting an on-screen keyboard image is also opened. By selecting any keyboard tab in the character input interface 1130 with the pen input operation unit or a finger, characters are written in the TODO list 1110.

Referring to FIG. 55A, there is shown a note display mode 1150. In the note display mode 1150, the order of items is changed or a new item is added. The item order change is performed using the touch of a finger or the touch of the pen input operation unit. The addition of a new item is performed by the character input interface 1130 having the on-screen keyboard on which the touch of the finger or the touch of the pen input operation unit provides a pen input.

Referring to FIG. 55B, there is shown a balloon icon 1116. When the balloon icon 1116 is touched, an electronic mail is opened and its low-level display screen indicating the mail content is displayed, as shown in FIG. 55C. The character input interface 1130 is used in the electronic mail display screen 1120 shown in FIG. 55C to create and edit a reply mail.

The created mail may be sent to the desired destination. To send the mail, the card of the portable apparatus is connected to a modem or a docking station for extension with a battery therewithin, for connection with the telephone line. As shown in FIG. 53A, by moving the on-screen balloon icon 1116 representing the electronic mail to a post icon 1114, a transmission is possible. The apparatus is then automatically connected to the telephone line. When the transmission is completed, the apparatus is automatically disconnected from the line.

FIG. 53B shows a screen in which received mails are displayed as a plurality of balloon icons 1116 floating in air above the road.

Referring to FIG. 53C, the electronic mail display screen 1120 displays the content of the electronic mail after any of the balloon icons 1116 is clicked. As shown, the electronic mail with a schedule gives an icon 1122 for schedule check. When the icon 1122 is selected, a schedule display mode for the scheduled date is presented as a low-level menu.

Referring to FIG. 53D, an electronic mail is sent with a schedule attached thereto. When a schedule OK button is pressed, a schedule item is automatically selected, and a reply electronic mail screen is opened at the same time. The mail is sent by clicking the post icon 1114.

Although the apparatuses and method of the present invention have been discussed in connection with preferred embodiments, many variations and modifications will be apparent to those skilled in the art without departing from the spirit and scope of the present invention. For example, the portable apparatus including the display device of the present invention may be used in a network as illustrated in the concepts shown in FIG. 56A–FIG. 56C. In each of the cases shown, the PC communicates with the portable apparatuses 2-1, 2-2, . . . to establish a network.

In the above discussion, the portable apparatus is worn on the wrist. The present invention is not limited to this, and the portable apparatus finds many other applications. The present invention is not limited to the layout of keys in the portable apparatus in the above preferred embodiments. A different number of keys, other than the one described above, may be used.

In the above discussion, an LCD display is used for the display unit. The present invention is not limited to this. The display unit may be any other types of displays including a CRT with small depth dimensions, a small TV with a LCD shutter, and a plasma display. The image presented on the display unit is not limited to a three-dimensional one.

Icon character may be changed from a pigeon to another animal on the display unit of the PC. In such a case, the icon character is also presented in the form of the same animal on the display unit of the portable apparatus as well so that synchronization is established between the portable apparatus and the PC. The PC simply downloads icon information having the corresponding view of that animal along with other information.

The PC 1 may connect to the Internet, LAN, WAN, and another server on the Internet so that the portable apparatus 2 may access another server on the Internet via PC 1. The portable apparatus 2 may share information with another portable apparatus via PC 1.

In the above discussion, the first information processing apparatus is the PC and the second information processing apparatus is the display device of the present invention. The first information processing apparatus may be PDA, MCC, or a server. The second information processing apparatus may be a workstation, a mainframe, or a wordprocessor.

The apparatus having the display screen discussed in connection with the fourth and fifth embodiments may be provided with a wrist attachment.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A display device comprising display means for displaying, on a display screen, a plurality of types of information having different attributes, including at least communications information and schedule information;

storage means for storing first through third background screen character data which respectively present a first background display area for displaying icon information corresponding to said communications information, a second background display area for displaying said icon information corresponding to said schedule information, a third background display area for arranging and displaying said icon information that is used to retrieve said plurality of types of information enjoyed in each of said first and second background display areas and for storing said icon information;

control means for performing control to create said first through third background display areas on said display screen on an area by area basis, based on said first through third background screen character data, and to display said icon information on an area by area basis.

2. A display device according to claim 1, further comprising operating means for inputting said plurality of types of information on said display screen, wherein said control means comprises a mode control unit that performs control to switch, in response to an input through said operating means, between a first mode in which said first through third background display areas are presented and a second mode in which one of said first through third background display areas is enlarged and presented.

3. A display device according to claim 2, wherein said storage means holds fourth background screen character data to present a fourth background display area for displaying icon information corresponding to input and output information that is input and output, and wherein said control means performs control to create each of said first through fourth background display areas on said display screen on an area by area basis, based on said first through fourth background screen character data and to display said icon information on an area by area basis.

4. A display device according to claim 3, wherein said control means performs control to synthesize and display said icon information on one of said first, second and fourth background display areas, in accordance with an input through said operating means.

5. A display device according to claim 3, wherein said storage means holds screen data for forming a background screen of a localized area where said input and output information is displayed, and font data for displaying said input and output information in a hand-written character and, wherein said control means performs control to create and display said font data on said screen data, in a layer beneath said icon information, in accordance with the input through said operating means.

6. A display device according to claim 5, further comprising a pen input information processing unit for forming said input and output information, wherein said control means performs control to display said input and output information on said display means, in accordance with external input information input through said pen input information processing unit.

7. A display device according to claim 2, wherein said control means performs control to synthesize and display information having an attribute responsive to the operation of said operating means executed for said icon information, out of said plurality of types of information, on a display screen different from said menu screen.

8. A display device according to claim 2, further comprising timing means for counting time,
wherein said control means performs control to display said icon information in a chronological order, in accordance with time information of said timing means.

9. A display device according to claim 8, wherein said communications information comprises electronic mail information transmitted and received, and reception time information about the reception time of the electronic mail information, and
wherein control means performs control to display said icon information on said first background display area in the order of reception, in accordance with said reception time information.

10. A display device according to claim 8, wherein said icon information comprises third icon information that is created and displayed as a single character when the number of pieces of said electronic mail information exceeds a predetermined number, and
wherein said control means performs control to display said third icon information on said first background display area when the number of pieces of said electronic mail information exceeds said predetermined number.

11. A display device according to claim 10, wherein said communications information comprises identification information for identifying and classifying the function of said electronic mail according to the content of said electronic mail;
said third icon information comprises a plurality of pieces of function-based icon information that are classified by function with a view to the content of said electronic mail; and
said control means performs control to display said function-based icon information that matches the content of said electronic mail, on said first background display area, in accordance with said identification information.

12. A display device according to claim 8, wherein said display means comprises a fifth background display area for hiding said display screen when the input operation through said operating means is not carried out for a predetermined duration of time; and
said control means performs control to enlarge and present said fifth background display area in succession to said duration.

13. A display device according to claim 12, further comprising battery remaining power detector means for detecting a level in a battery,
wherein said control means performs control to display the battery level on said fifth background display area, in accordance with the detection result provided by said battery remaining power detector means.

14. A display device according to claim 12, wherein said control means performs control to hide part of said display screen with said fifth background display area while displaying said icon information only, in the remaining area of said display screen.

15. A display device according to claim 2, further comprising voice input means for inputting voice information included in said plurality of types of information and,
voice input control means for controlling the input of said voice information in accordance with the input through said operating means.

16. A display device according to claim 15, wherein said voice information comprises voice input information having a schedule input in voice, and designated time information at which a user designates a scheduled execution time of said voice input information, and
wherein said control means performs control to display said icon information in the order of creation, in accordance with said designated time information.

17. A display device according to claim 16, wherein said voice information comprises voice size information relating to the size of said voice schedule information;
said icon information comprises a plurality of pieces of eighth icon information having different configurations corresponding to said voice schedule information; and
said control means performs control to selectively display said plurality of pieces of eighth icon information having the different configurations, in accordance with said voice size information.

18. A display device according to claim 2, further comprising voice output means for outputting said voice information included in said plurality of types of information, and
voice output control means for controlling the output of said voice information in accordance with the input through said operating means.

19. A display device according to claim 18, wherein said voice information comprises voice communications information transmitted and received, and voice size information relating to the size of said voice communications information;
said icon information comprises a plurality of pieces of sixth icon information having different configurations corresponding to said voice communications information; and
said control means performs control to selectively display said sixth icon information having the different configurations, in accordance with said voice size information.

20. A display device according to claim 2, further comprising battery remaining power detector means for detecting a level in a battery,
wherein said control means performs control to display the battery level on said display screen, in accordance with the detection result provided by said battery remaining power detector means.

21. A display device according to claim 2, wherein said control means comprises a background screen control unit which presents in high-contrast presentation the background display area that is enlarged and displayed when said second mode is use, while presenting in low-contrast presentation the remaining background display area.

22. A display device according to claim 2, wherein said storage means comprises database display information for arranging and displaying retrieval selection character information that is used to retrieve said plurality of types of information according to alphabets, and a retrieval program for retrieving said plurality of types of information using at least a first alphabetical letter of a word, as a keyword for retrieval, and wherein said control means performs low-hierarchical layer display control by designating said keyword for retrieval according to said retrieval selection character information in accordance with an input through said operating means, retrieving said plurality of types of information using said retrieval program, and outputting retrieval result information.

23. A display device according to claim 1, wherein said first background display area is formed on the upper portion of said display screen in which a sky is presented as a background screen by making said first background screen character data a sky metaphor;

said second background display area is formed on the middle portion of said display screen in which a ground is presented as a background screen by making said second background screen character data a ground metaphor; and said third background display area is formed on the lower portion of said display screen in which an underground is presented as a background screen by making said third background screen character data an underground metaphor.

24. A portable information processing apparatus comprising a display device according to one of claims 1 through 22.

25. A portable information processing apparatus according to claim 24, further comprising a wrist attachment which is arranged on said display device and fastens about the wrist of a user.

26. An information storage medium at least for storing information for forming a display image, said storage medium comprising:

first through third background screen character data which respectively present a first background display area for arranging and displaying icon information corresponding to communications information, a second background display area for arranging and displaying said icon information corresponding to schedule information, a third background display area for arranging and displaying said icon information that is used to retrieve a plurality of types of information enjoyed in each of said first and second display areas;

information for storing said icon information; and information for performing control to create said first through third background display areas on a display screen on an area by area basis, based on said first through third background character data, and to display said icon information on an area by area basis.

27. An information storage medium according to claim 26, comprising a retrieval program for retrieving said plurality of types of information using at least a first alphabetical letter of a word, as a keyword for retrieval, and information for designating said keyword for retrieval according to retrieval selection character information in accordance with an input through operating means, for retrieving said plurality of types of information using said retrieval program, and for outputting retrieval result information.

28. An electronic apparatus comprising an information storage medium according to one of claims 26 and 27.

* * * * *